(12) United States Patent  
Katsuyama

(10) Patent No.: US 10,814,641 B2  
(45) Date of Patent: Oct. 27, 2020

(54) IMAGE PROCESSING APPARATUS AND METHOD, DITHER MASK SET, AND IMAGE RECORDING APPARATUS

(71) Applicant: FUJIFILM Corporation, Tokyo (JP)

(72) Inventor: Kimito Katsuyama, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/598,977

(22) Filed: Oct. 10, 2019

(65) Prior Publication Data

US 2020/0039235 A1 Feb. 6, 2020

Related U.S. Application Data

(63) Continuation of application No. PCT/JP2018/014556, filed on Apr. 5, 2018.

(30) Foreign Application Priority Data

Jun. 21, 2017 (JP) ................. 2017-121361

(51) Int. Cl.
*B41J 2/21* (2006.01)
*B41J 2/15* (2006.01)
(Continued)

(52) U.S. Cl.
CPC ............... *B41J 2/2132* (2013.01); *B41J 2/15* (2013.01); *B41J 2/465* (2013.01); *B41J 2/512* (2013.01)

(58) Field of Classification Search
CPC ... B41J 2/2132; B41J 2/15; B41J 2/465; B41J 2/512; B41J 2/2103
See application file for complete search history.

(56) References Cited

U.S. PATENT DOCUMENTS

2005/0007416 A1 1/2005 Takekoshi et al.
2008/0225081 A1 9/2008 Couwenhoven et al.
(Continued)

FOREIGN PATENT DOCUMENTS

JP 2004-338312 A 12/2004
JP 2005-088467 A 4/2005
(Continued)

OTHER PUBLICATIONS

International Search Report issued in PCT/JP2018/014556; dated May 22, 2018.
(Continued)

*Primary Examiner* — Juanita D Jackson
(74) *Attorney, Agent, or Firm* — Studebaker & Brackett PC

(57) ABSTRACT

Provided are an image processing apparatus, an image processing method, a dither mask set, and an image recording apparatus capable of suppressing occurrence of banding and color unevenness without productivity decrease. Halftone processing is performed with respect to image data of a first color, in a range of a part of a recording duty, using a dither mask that realizes a first nozzle jetting rate in which a nozzle jetting rate of an end part nozzle is suppressed to be smaller than a nozzle jetting rate of a central nozzle. Further, halftone processing is performed with respect to image data of a second color different from the first color, using a dither mask that realizes a second nozzle jetting rate having smaller difference between the nozzle jetting rate of the end part nozzle and the nozzle jetting rate of the central nozzle than that in the first nozzle jetting rate.

24 Claims, 32 Drawing Sheets

(51) Int. Cl.
*B41J 2/465* (2006.01)
*B41J 2/51* (2006.01)

(56) References Cited

U.S. PATENT DOCUMENTS

2010/0177137 A1    7/2010  Kakutani
2018/0079220 A1*   3/2018  Kakutani ............... B41J 2/2103

FOREIGN PATENT DOCUMENTS

| | | |
|---|---|---|
| JP | 2005-246877 A | 9/2005 |
| JP | 2008-143149 A | 6/2008 |
| JP | 2009-160876 A | 7/2009 |
| JP | 2010-162770 A | 7/2010 |
| JP | 2013-233699 A | 11/2013 |

OTHER PUBLICATIONS

International Preliminary Report on Patentability and Written Opinion issued in PCT/JP2018/014556; dated Dec. 24, 2019.

* cited by examiner

| 1.00 | 0.00 | 1.00 | 0.00 | 1.00 | 0.00 | 1.00 | 0.00 | 1.00 | 0.00 |
|------|------|------|------|------|------|------|------|------|------|
| 0.85 | 1.00 | 0.85 | 1.00 | 0.85 | 1.00 | 0.85 | 1.00 | 0.85 | 1.00 |
| 1.00 | 0.08 | 1.00 | 0.08 | 1.00 | 0.08 | 1.00 | 0.08 | 1.00 | 0.08 |
| 0.77 | 1.00 | 0.77 | 1.00 | 0.77 | 1.00 | 0.77 | 1.00 | 0.77 | 1.00 |
| 1.00 | 0.15 | 1.00 | 0.15 | 1.00 | 0.15 | 1.00 | 0.15 | 1.00 | 0.15 |
| 0.69 | 1.00 | 0.69 | 1.00 | 0.69 | 1.00 | 0.69 | 1.00 | 0.69 | 1.00 |
| 1.00 | 0.23 | 1.00 | 0.23 | 1.00 | 0.23 | 1.00 | 0.23 | 1.00 | 0.23 |
| 0.62 | 1.00 | 0.62 | 1.00 | 0.62 | 1.00 | 0.62 | 1.00 | 0.62 | 1.00 |
| 1.00 | 0.31 | 1.00 | 0.31 | 1.00 | 0.31 | 1.00 | 0.31 | 1.00 | 0.31 |
| 0.54 | 1.00 | 0.54 | 1.00 | 0.54 | 1.00 | 0.54 | 1.00 | 0.54 | 1.00 |

JETTING RATE PATTERN

FIG. 13

| 1.00 | 0.00 | 1.00 | 0.00 | 1.00 | 0.00 | 1.00 | 0.00 | 1.00 | 0.00 |
|------|------|------|------|------|------|------|------|------|------|
| 0.72 | 1.00 | 0.72 | 1.00 | 0.72 | 1.00 | 0.72 | 1.00 | 0.72 | 1.00 |
| 1.00 | 0.01 | 1.00 | 0.01 | 1.00 | 0.01 | 1.00 | 0.01 | 1.00 | 0.01 |
| 0.59 | 1.00 | 0.59 | 1.00 | 0.59 | 1.00 | 0.59 | 1.00 | 0.59 | 1.00 |
| 1.00 | 0.02 | 1.00 | 0.02 | 1.00 | 0.02 | 1.00 | 0.02 | 1.00 | 0.02 |
| 0.48 | 1.00 | 0.48 | 1.00 | 0.48 | 1.00 | 0.48 | 1.00 | 0.48 | 1.00 |
| 1.00 | 0.05 | 1.00 | 0.05 | 1.00 | 0.05 | 1.00 | 0.05 | 1.00 | 0.05 |
| 0.38 | 1.00 | 0.38 | 1.00 | 0.38 | 1.00 | 0.38 | 1.00 | 0.38 | 1.00 |
| 1.00 | 0.10 | 1.00 | 0.10 | 1.00 | 0.10 | 1.00 | 0.10 | 1.00 | 0.10 |
| 0.29 | 1.00 | 0.29 | 1.00 | 0.29 | 1.00 | 0.29 | 1.00 | 0.29 | 1.00 |

OVERLAP PROBABILITY PATTERN

FIG. 14

| 0.72 | 0.72 | 0.72 | 0.72 | 0.72 | 0.72 | 0.72 | 0.72 | 0.72 | 0.72 |
|---|---|---|---|---|---|---|---|---|---|
| 0.72 | 0.72 | 0.72 | 0.72 | 0.72 | 0.72 | 0.72 | 0.72 | 0.72 | 0.72 |
| 0.72 | 0.72 | 0.72 | 0.72 | 0.72 | 0.72 | 0.72 | 0.72 | 0.72 | 0.72 |
| 0.72 | 0.72 | 0.72 | 0.72 | 0.72 | 0.72 | 0.72 | 0.72 | 0.72 | 0.72 |
| 0.72 | 0.72 | 0.72 | 0.72 | 0.72 | 0.72 | 0.72 | 0.72 | 0.72 | 0.72 |
| 0.72 | 0.72 | 0.72 | 0.72 | 0.72 | 0.72 | 0.72 | 0.72 | 0.72 | 0.72 |
| 0.72 | 0.72 | 0.72 | 0.72 | 0.72 | 0.72 | 0.72 | 0.72 | 0.72 | 0.72 |
| 0.72 | 0.72 | 0.72 | 0.72 | 0.72 | 0.72 | 0.72 | 0.72 | 0.72 | 0.72 |
| 0.72 | 0.72 | 0.72 | 0.72 | 0.72 | 0.72 | 0.72 | 0.72 | 0.72 | 0.72 |
| 0.72 | 0.72 | 0.72 | 0.72 | 0.72 | 0.72 | 0.72 | 0.72 | 0.72 | 0.72 |

JETTING RATE PATTERN

FIG. 15

| 0.52 | 0.52 | 0.52 | 0.52 | 0.52 | 0.52 | 0.52 | 0.52 | 0.52 | 0.52 |
|---|---|---|---|---|---|---|---|---|---|
| 0.52 | 0.52 | 0.52 | 0.52 | 0.52 | 0.52 | 0.52 | 0.52 | 0.52 | 0.52 |
| 0.52 | 0.52 | 0.52 | 0.52 | 0.52 | 0.52 | 0.52 | 0.52 | 0.52 | 0.52 |
| 0.52 | 0.52 | 0.52 | 0.52 | 0.52 | 0.52 | 0.52 | 0.52 | 0.52 | 0.52 |
| 0.52 | 0.52 | 0.52 | 0.52 | 0.52 | 0.52 | 0.52 | 0.52 | 0.52 | 0.52 |
| 0.52 | 0.52 | 0.52 | 0.52 | 0.52 | 0.52 | 0.52 | 0.52 | 0.52 | 0.52 |
| 0.52 | 0.52 | 0.52 | 0.52 | 0.52 | 0.52 | 0.52 | 0.52 | 0.52 | 0.52 |
| 0.52 | 0.52 | 0.52 | 0.52 | 0.52 | 0.52 | 0.52 | 0.52 | 0.52 | 0.52 |
| 0.52 | 0.52 | 0.52 | 0.52 | 0.52 | 0.52 | 0.52 | 0.52 | 0.52 | 0.52 |
| 0.52 | 0.52 | 0.52 | 0.52 | 0.52 | 0.52 | 0.52 | 0.52 | 0.52 | 0.52 |

OVERLAP PROBABILITY PATTERN

FIG. 16

| 0.00 | 0.00 | 0.00 | 0.00 | 0.00 | 0.00 | 0.00 | 0.00 | 0.00 | 0.00 |
|---|---|---|---|---|---|---|---|---|---|
| 0.85 | 0.85 | 0.85 | 0.85 | 0.85 | 0.85 | 0.85 | 0.85 | 0.85 | 0.85 |
| 0.08 | 0.08 | 0.08 | 0.08 | 0.08 | 0.08 | 0.08 | 0.08 | 0.08 | 0.08 |
| 0.77 | 0.77 | 0.77 | 0.77 | 0.77 | 0.77 | 0.77 | 0.77 | 0.77 | 0.77 |
| 0.15 | 0.15 | 0.15 | 0.15 | 0.15 | 0.15 | 0.15 | 0.15 | 0.15 | 0.15 |
| 0.69 | 0.69 | 0.69 | 0.69 | 0.69 | 0.69 | 0.69 | 0.69 | 0.69 | 0.69 |
| 0.23 | 0.23 | 0.23 | 0.23 | 0.23 | 0.23 | 0.23 | 0.23 | 0.23 | 0.23 |
| 0.62 | 0.62 | 0.62 | 0.62 | 0.62 | 0.62 | 0.62 | 0.62 | 0.62 | 0.62 |
| 0.31 | 0.31 | 0.31 | 0.31 | 0.31 | 0.31 | 0.31 | 0.31 | 0.31 | 0.31 |
| 0.54 | 0.54 | 0.54 | 0.54 | 0.54 | 0.54 | 0.54 | 0.54 | 0.54 | 0.54 |

OVERLAP PROBABILITY PATTERN IN CASE OF BEING SHIFTED BY ONE PIXEL IN MAIN SCAN DIRECTION

FIG. 17

| 0.85 | 0.00 | 0.85 | 0.00 | 0.85 | 0.00 | 0.85 | 0.00 | 0.85 | 0.00 |
|---|---|---|---|---|---|---|---|---|---|
| 0.85 | 0.08 | 0.85 | 0.08 | 0.85 | 0.08 | 0.85 | 0.08 | 0.85 | 0.08 |
| 0.77 | 0.08 | 0.77 | 0.08 | 0.77 | 0.08 | 0.77 | 0.08 | 0.77 | 0.08 |
| 0.77 | 0.15 | 0.77 | 0.15 | 0.77 | 0.15 | 0.77 | 0.15 | 0.77 | 0.15 |
| 0.69 | 0.15 | 0.69 | 0.15 | 0.69 | 0.15 | 0.69 | 0.15 | 0.69 | 0.15 |
| 0.69 | 0.23 | 0.69 | 0.23 | 0.69 | 0.23 | 0.69 | 0.23 | 0.69 | 0.23 |
| 0.62 | 0.23 | 0.62 | 0.23 | 0.62 | 0.23 | 0.62 | 0.23 | 0.62 | 0.23 |
| 0.62 | 0.31 | 0.62 | 0.31 | 0.62 | 0.31 | 0.62 | 0.31 | 0.62 | 0.31 |
| 0.54 | 0.31 | 0.54 | 0.31 | 0.54 | 0.31 | 0.54 | 0.31 | 0.54 | 0.31 |
| 0.54 | 0.38 | 0.54 | 0.38 | 0.54 | 0.38 | 0.54 | 0.38 | 0.54 | 0.38 |

OVERLAP PROBABILITY PATTERN IN CASE OF BEING SHIFTED BY ONE PIXEL IN SUB SCAN DIRECTION

| 0.84 | 0.42 | 0.84 | 0.42 | 0.84 | 0.42 | 0.84 | 0.42 | 0.84 | 0.42 |
|---|---|---|---|---|---|---|---|---|---|
| 0.77 | 0.84 | 0.77 | 0.84 | 0.77 | 0.84 | 0.77 | 0.84 | 0.77 | 0.84 |
| 0.84 | 0.45 | 0.84 | 0.45 | 0.84 | 0.45 | 0.84 | 0.45 | 0.84 | 0.45 |
| 0.74 | 0.84 | 0.74 | 0.84 | 0.74 | 0.84 | 0.74 | 0.84 | 0.74 | 0.84 |
| 0.84 | 0.48 | 0.84 | 0.48 | 0.84 | 0.48 | 0.84 | 0.48 | 0.84 | 0.48 |
| 0.71 | 0.84 | 0.71 | 0.84 | 0.71 | 0.84 | 0.71 | 0.84 | 0.71 | 0.84 |
| 0.84 | 0.52 | 0.84 | 0.52 | 0.84 | 0.52 | 0.84 | 0.52 | 0.84 | 0.52 |
| 0.68 | 0.84 | 0.68 | 0.84 | 0.68 | 0.84 | 0.68 | 0.84 | 0.68 | 0.84 |
| 0.84 | 0.55 | 0.84 | 0.55 | 0.84 | 0.55 | 0.84 | 0.55 | 0.84 | 0.55 |
| 0.64 | 0.84 | 0.64 | 0.84 | 0.64 | 0.84 | 0.64 | 0.84 | 0.64 | 0.84 |

JETTING RATE PATTERN

FIG. 23

| 0.71 | 0.18 | 0.71 | 0.18 | 0.71 | 0.18 | 0.71 | 0.18 | 0.71 | 0.18 |
|---|---|---|---|---|---|---|---|---|---|
| 0.59 | 0.71 | 0.59 | 0.71 | 0.59 | 0.71 | 0.59 | 0.71 | 0.59 | 0.71 |
| 0.71 | 0.20 | 0.71 | 0.20 | 0.71 | 0.20 | 0.71 | 0.20 | 0.71 | 0.20 |
| 0.55 | 0.71 | 0.55 | 0.71 | 0.55 | 0.71 | 0.55 | 0.71 | 0.55 | 0.71 |
| 0.71 | 0.23 | 0.71 | 0.23 | 0.71 | 0.23 | 0.71 | 0.23 | 0.71 | 0.23 |
| 0.50 | 0.71 | 0.50 | 0.71 | 0.50 | 0.71 | 0.50 | 0.71 | 0.50 | 0.71 |
| 0.71 | 0.27 | 0.71 | 0.27 | 0.71 | 0.27 | 0.71 | 0.27 | 0.71 | 0.27 |
| 0.46 | 0.71 | 0.46 | 0.71 | 0.46 | 0.71 | 0.46 | 0.71 | 0.46 | 0.71 |
| 0.71 | 0.30 | 0.71 | 0.30 | 0.71 | 0.30 | 0.71 | 0.30 | 0.71 | 0.30 |
| 0.41 | 0.71 | 0.41 | 0.71 | 0.41 | 0.71 | 0.41 | 0.71 | 0.41 | 0.71 |

OVERLAP PROBABILITY PATTERN

FIG. 24

| 0.35 | 0.35 | 0.35 | 0.35 | 0.35 | 0.35 | 0.35 | 0.35 | 0.35 | 0.35 |
|---|---|---|---|---|---|---|---|---|---|
| 0.65 | 0.65 | 0.65 | 0.65 | 0.65 | 0.65 | 0.65 | 0.65 | 0.65 | 0.65 |
| 0.38 | 0.38 | 0.38 | 0.38 | 0.38 | 0.38 | 0.38 | 0.38 | 0.38 | 0.38 |
| 0.62 | 0.62 | 0.62 | 0.62 | 0.62 | 0.62 | 0.62 | 0.62 | 0.62 | 0.62 |
| 0.40 | 0.40 | 0.40 | 0.40 | 0.40 | 0.40 | 0.40 | 0.40 | 0.40 | 0.40 |
| 0.60 | 0.60 | 0.60 | 0.60 | 0.60 | 0.60 | 0.60 | 0.60 | 0.60 | 0.60 |
| 0.44 | 0.44 | 0.44 | 0.44 | 0.44 | 0.44 | 0.44 | 0.44 | 0.44 | 0.44 |
| 0.57 | 0.57 | 0.57 | 0.57 | 0.57 | 0.57 | 0.57 | 0.57 | 0.57 | 0.57 |
| 0.46 | 0.46 | 0.46 | 0.46 | 0.46 | 0.46 | 0.46 | 0.46 | 0.46 | 0.46 |
| 0.54 | 0.54 | 0.54 | 0.54 | 0.54 | 0.54 | 0.54 | 0.54 | 0.54 | 0.54 |

OVERLAP PROBABILITY PATTERN IN CASE OF BEING SHIFTED BY ONE PIXEL IN MAIN SCAN DIRECTION

| 0.65 | 0.35 | 0.65 | 0.35 | 0.65 | 0.35 | 0.65 | 0.35 | 0.65 | 0.35 |
|------|------|------|------|------|------|------|------|------|------|
| 0.65 | 0.38 | 0.65 | 0.38 | 0.65 | 0.38 | 0.65 | 0.38 | 0.65 | 0.38 |
| 0.62 | 0.38 | 0.62 | 0.38 | 0.62 | 0.38 | 0.62 | 0.38 | 0.62 | 0.38 |
| 0.62 | 0.40 | 0.62 | 0.40 | 0.62 | 0.40 | 0.62 | 0.40 | 0.62 | 0.40 |
| 0.60 | 0.40 | 0.60 | 0.40 | 0.60 | 0.40 | 0.60 | 0.40 | 0.60 | 0.40 |
| 0.60 | 0.44 | 0.60 | 0.44 | 0.60 | 0.44 | 0.60 | 0.44 | 0.60 | 0.44 |
| 0.57 | 0.44 | 0.57 | 0.44 | 0.57 | 0.44 | 0.57 | 0.44 | 0.57 | 0.44 |
| 0.57 | 0.46 | 0.57 | 0.46 | 0.57 | 0.46 | 0.57 | 0.46 | 0.57 | 0.46 |
| 0.54 | 0.46 | 0.54 | 0.46 | 0.54 | 0.46 | 0.54 | 0.46 | 0.54 | 0.46 |
| 0.54 | 0.49 | 0.54 | 0.49 | 0.54 | 0.49 | 0.54 | 0.49 | 0.54 | 0.49 |

OVERLAP PROBABILITY PATTERN IN CASE OF BEING SHIFTED BY ONE PIXEL IN SUB SCAN DIRECTION

FIG. 27

| 0.84 | 0.00 | 0.84 | 0.00 | 0.84 | 0.00 | 0.84 | 0.00 | 0.84 | 0.00 |
|------|------|------|------|------|------|------|------|------|------|
| 0.65 | 0.84 | 0.65 | 0.84 | 0.65 | 0.84 | 0.65 | 0.84 | 0.65 | 0.84 |
| 0.84 | 0.04 | 0.84 | 0.04 | 0.84 | 0.04 | 0.84 | 0.04 | 0.84 | 0.04 |
| 0.57 | 0.84 | 0.57 | 0.84 | 0.57 | 0.84 | 0.57 | 0.84 | 0.57 | 0.84 |
| 0.84 | 0.07 | 0.84 | 0.07 | 0.84 | 0.07 | 0.84 | 0.07 | 0.84 | 0.07 |
| 0.49 | 0.84 | 0.49 | 0.84 | 0.49 | 0.84 | 0.49 | 0.84 | 0.49 | 0.84 |
| 0.84 | 0.12 | 0.84 | 0.12 | 0.84 | 0.12 | 0.84 | 0.12 | 0.84 | 0.12 |
| 0.42 | 0.84 | 0.42 | 0.84 | 0.42 | 0.84 | 0.42 | 0.84 | 0.42 | 0.84 |
| 0.84 | 0.17 | 0.84 | 0.17 | 0.84 | 0.17 | 0.84 | 0.17 | 0.84 | 0.17 |
| 0.35 | 0.84 | 0.35 | 0.84 | 0.35 | 0.84 | 0.35 | 0.84 | 0.35 | 0.84 |

OVERLAP PROBABILITY PATTERN

FIG. 28

| 0.42 | 0.00 | 0.42 | 0.00 | 0.42 | 0.00 | 0.42 | 0.00 | 0.42 | 0.00 |
|------|------|------|------|------|------|------|------|------|------|
| 0.71 | 0.77 | 0.71 | 0.77 | 0.71 | 0.77 | 0.71 | 0.77 | 0.71 | 0.77 |
| 0.45 | 0.07 | 0.45 | 0.07 | 0.45 | 0.07 | 0.45 | 0.07 | 0.45 | 0.07 |
| 0.65 | 0.74 | 0.65 | 0.74 | 0.65 | 0.74 | 0.65 | 0.74 | 0.65 | 0.74 |
| 0.48 | 0.13 | 0.48 | 0.13 | 0.48 | 0.13 | 0.48 | 0.13 | 0.48 | 0.13 |
| 0.58 | 0.71 | 0.58 | 0.71 | 0.58 | 0.71 | 0.58 | 0.71 | 0.58 | 0.71 |
| 0.52 | 0.19 | 0.52 | 0.19 | 0.52 | 0.19 | 0.52 | 0.19 | 0.52 | 0.19 |
| 0.52 | 0.68 | 0.52 | 0.68 | 0.52 | 0.68 | 0.52 | 0.68 | 0.52 | 0.68 |
| 0.55 | 0.26 | 0.55 | 0.26 | 0.55 | 0.26 | 0.55 | 0.26 | 0.55 | 0.26 |
| 0.45 | 0.64 | 0.45 | 0.64 | 0.45 | 0.64 | 0.45 | 0.64 | 0.45 | 0.64 |

OVERLAP PROBABILITY PATTERN IN CASE OF BEING SHIFTED BY ONE PIXEL IN MAIN SCAN DIRECTION

| 0.77 | 0.00 | 0.77 | 0.00 | 0.77 | 0.00 | 0.77 | 0.00 | 0.77 | 0.00 |
|------|------|------|------|------|------|------|------|------|------|
| 0.71 | 0.45 | 0.71 | 0.45 | 0.71 | 0.45 | 0.71 | 0.45 | 0.71 | 0.45 |
| 0.74 | 0.07 | 0.74 | 0.07 | 0.74 | 0.07 | 0.74 | 0.07 | 0.74 | 0.07 |
| 0.65 | 0.48 | 0.65 | 0.48 | 0.65 | 0.48 | 0.65 | 0.48 | 0.65 | 0.48 |
| 0.71 | 0.13 | 0.71 | 0.13 | 0.71 | 0.13 | 0.71 | 0.13 | 0.71 | 0.13 |
| 0.58 | 0.52 | 0.58 | 0.52 | 0.58 | 0.52 | 0.58 | 0.52 | 0.58 | 0.52 |
| 0.68 | 0.19 | 0.68 | 0.19 | 0.68 | 0.19 | 0.68 | 0.19 | 0.68 | 0.19 |
| 0.52 | 0.55 | 0.52 | 0.55 | 0.52 | 0.55 | 0.52 | 0.55 | 0.52 | 0.55 |
| 0.64 | 0.26 | 0.64 | 0.26 | 0.64 | 0.26 | 0.64 | 0.26 | 0.64 | 0.26 |
| 0.45 | 0.58 | 0.45 | 0.58 | 0.45 | 0.58 | 0.45 | 0.58 | 0.45 | 0.58 |

OVERLAP PROBABILITY PATTERN IN CASE OF BEING SHIFTED BY ONE PIXEL IN SUB SCAN DIRECTION

PIXEL POSITION IN SUB SCAN DIRECTION

FIG. 39

| NUMBER OF LEFT NOZZLES | NUMBER OF RIGHT NOZZLES | JETTING RATE OF LEFT NOZZLE | JETTING RATE OF RIGHT NOZZLE | NUMBER OF LEFT NOZZLE PRIORITY PIXELS | NUMBER OF RIGHT NOZZLE PRIORITY PIXELS |
|---|---|---|---|---|---|
| 25 | 0 | 1.0000 | 0.0000 | 50.00 | 0.00 |
| 38 | 13 | 1.0000 | 1.0000 | 42.31 | 50.00 |
| 26 | 1 | 1.0000 | 0.0769 | 50.00 | 3.85 |
| 39 | 14 | 1.0000 | 1.0000 | 38.46 | 50.00 |
| 27 | 2 | 1.0000 | 0.1538 | 50.00 | 7.69 |
| 40 | 15 | 1.0000 | 1.0000 | 34.62 | 50.00 |
| 28 | 3 | 1.0000 | 0.2308 | 50.00 | 11.54 |
| 41 | 16 | 1.0000 | 1.0000 | 30.77 | 50.00 |
| 29 | 4 | 1.0000 | 0.3077 | 50.00 | 15.39 |
| 42 | 17 | 1.0000 | 1.0000 | 26.93 | 50.00 |
| 30 | 5 | 1.0000 | 0.3846 | 50.00 | 19.23 |
| 43 | 18 | 1.0000 | 1.0000 | 23.08 | 50.00 |
| 31 | 6 | 1.0000 | 0.4615 | 50.00 | 23.08 |
| 44 | 19 | 1.0000 | 1.0000 | 19.23 | 50.00 |
| 32 | 7 | 1.0000 | 0.5385 | 50.00 | 26.93 |
| 45 | 20 | 1.0000 | 1.0000 | 15.39 | 50.00 |
| 33 | 8 | 1.0000 | 0.6154 | 50.00 | 30.77 |
| 46 | 21 | 1.0000 | 1.0000 | 11.54 | 50.00 | ns

IMAGE PROCESSING APPARATUS AND METHOD, DITHER MASK SET, AND IMAGE RECORDING APPARATUS

CROSS-REFERENCE TO RELATED APPLICATIONS

This application is a Continuation of PCT International Application No. PCT/JP2018/014556 filed on Apr. 5, 2018, which claims priority under 35 U.S.C § 119(a) to Japanese Patent Application No. 2017-121361 filed on Jun. 21, 2017. Each of the above application(s) is hereby expressly incorporated by reference, in its entirety, into the present application.

BACKGROUND OF THE INVENTION

1. Field of the Invention

The present invention relates to an image processing apparatus, an image processing method, a dither mask set, and an image recording apparatus, and more particularly, to a halftone processing technique suitable for an ink jet control in a serial-type ink jet printer that records an image while relatively moving a recording head having a nozzle row with respect to a recording medium.

2. Description of the Related Art

The serial-type ink jet printer repeats a main scan operation of jetting ink from nozzles of a recording head while moving the recording head in a main scan direction to perform recording and a sub scan operation that is a medium feeding operation of intermittently transporting the recording medium in a sub scan direction, to thereby record an image on the recording medium.

In such an image recording method, a behavior of landed droplets, that is, a behavior of dots on the recording medium is changed due to a recording position error of each dot onto the recording medium from each nozzle of the recording head or a jetting amount error of each nozzle, or a dot recording order, a recording timing, or the like. As the dot behavior on the recording medium is changed, concentration unevenness called "banding", such as occurrence of a change in a recording concentration at a repetitive cycle of each printing path or a noticeable boundary of each printing path is generated. In a case where the banding is generated, there is a problem in that a printing image quality is lowered.

With respect to such a problem, for example, JP2005-088467A and JP2009-160876A disclose methods for controlling usage rates of respective nozzles using a mask pattern in allocating a halftone processing result to respective scans and respective nozzles. The usage rate of the nozzle represents a frequency at which droplets are jetted from a nozzle for recording a dot, and may be understood as a nozzle usage frequency or a jetting rate.

JP2010-162770A discloses a serial-type ink jet printer that performs halftone processing by a systematic dither method using a dither mask to control a usage rate of each nozzle.

In the printer disclosed in JP2010-162770A, a threshold of a dither mask is set so that nozzle usage rates of at least one of nozzle groups respectively disposed at both end parts of a nozzle row of a recording head are smaller than nozzle usage rates of a medium nozzle group disposed between both the end nozzle groups, and thus, suppression of banding is achieved. JP2010-162770A discloses a method for generating a dither mask that sets a dot density of pixels recorded by both the end nozzle groups in the nozzle row to be lower than a dot density of pixels recorded by the medium nozzle group, in order to suppress banding.

The "printing head" disclosed in JP2010-162770A is a term corresponding to a "recording head" in the present specification. Further, the "nozzle usage rate" in JP2010-162770A is a term corresponding to a "nozzle jetting rate" in the present specification. Further, the "medium nozzle group" in JP2010-162770A is a term corresponding to a "central nozzle" in the present specification.

SUMMARY OF THE INVENTION

As in the methods disclosed in JP2005-088467A and JP2009-160876A, a method for controlling the jetting rate of each nozzle using a mask pattern that allocates the halftone processing result to each scan and each nozzle results in decrease in printing speed, that is, decrease in productivity. A premise of the technique capable of controlling which scan and nozzle perform recording for each pixel using the mask pattern is that the pixel can be recorded by any scan and nozzle, and thus, extra scanning is necessary as such, which results in decrease in productivity.

On the other hand, as in the method disclosed in JP2010-162770A, in the case of a method for controlling recording by reflecting a jetting rate of each nozzle in a dither mask of halftone processing, the above-described problem of the productivity decrease can be eliminated. In other words, in a case where the jetting rate of each nozzle is reflected in the halftone processing itself and a halftone processing result in which the jetting rate of each nozzle is reflected is obtained to control recording, one scan and one nozzle capable of performing recording for each pixel are determined in advance, and thus, no extra scanning is necessary, which does not cause the productivity decrease.

In the method disclosed in JP2010-162770A, the dither mask is generated in which the usage rates of the end nozzle group in the nozzle row are smaller than the usage rates of the central (medium) nozzle group. By performing halftone processing using the dither mask generated by the method described in JP2010-162770A, a dot pattern in which the usage rates are non-uniform between the end nozzle group and the central nozzle group in the nozzle row is generated.

As disclosed in JP2010-162770A, since the method for reflecting the jetting rate of each nozzle in the halftone processing result is a method for controlling the ratio of pixels to be actually recorded among recordable pixels that are predetermined for each scan and each nozzle, there is no problem of the productivity decrease.

On the other hand, in the case of the method for controlling recording by reflecting the jetting rate of each nozzle in the halftone processing, in a case the jetting rate of each nozzle in the nozzle row is unevenly biased, the probability of dot-on in each pixel is unevenly biased in accordance with the non-uniform jetting rate. Further, as a result of the uneven dot disposition of each color, the overlap probability of dots of respective colors is also biased, which results in color unevenness. Specific details of the problem of such color unevenness and consideration of the cause will be described later.

The present invention has been made in consideration of the above-mentioned problems, and an object of the invention is to provide an image processing apparatus, an image processing method, a dither mask set, and an image recording apparatus capable of suppressing occurrence of banding and occurrence of color unevenness without decrease in productivity.

In order to solve the problems, the following aspects of the invention are provided.

According to a first aspect of the invention, there is provided an image processing apparatus that generates dot data indicating a disposition pattern of dots for each color for recording an image on a recording medium, while relatively moving a recording head having a nozzle row in which a plurality of nozzles that jet, for each of a plurality of colors of ink, each ink are arranged in a sub scan direction, in a main scan direction perpendicular to the sub scan direction and the sub scan direction with respect to a recording medium, comprising: a halftone processing unit that performs halftone processing with respect to image data of a first color among the plurality of colors, in a range of at least a part of a recording duty, using a dither mask that realizes a first nozzle jetting rate in which a nozzle jetting rate of an end part nozzle that is located at each of both end parts of the nozzle row is suppressed to be smaller than a nozzle jetting rate of a central nozzle located at a central part of the nozzle row, and performs halftone processing with respect to image data of a second color different from the first color among the plurality of colors, in the range of the recording duty, using a dither mask that realizes a second nozzle jetting rate having a smaller difference between the nozzle jetting rate of the end part nozzle and the nozzle jetting rate of the central nozzle than that in the first nozzle jetting rate.

According to the first aspect of the invention, the different kinds of dither masks are applied to the image data of the first color and the second color that are different two colors in the image data of the plurality of colors. In the dither mask used for the image data of the first color and the dither mask used for the image data of the second color among the plurality of kinds of dither masks, thresholds are set to generate dot dispositions in which different specific nozzle jetting rates are achieved in the range of at least the part of the recording duty. By performing the halftone processing using the corresponding dither masks with respect to the image data corresponding to the respective colors, it is possible to obtain dot data for each color. A jetting operation of each nozzle is controlled on the basis of the dot data that is the halftone processing result.

According to the first aspect of the invention, different kinds of dither masks are applied to image data of at least two different colors among the plurality of colors, and a dot disposition of a different nozzle jetting rate for each color is obtained with respect to at least two colors. Thus, it is possible to realize a combination of dot dispositions capable of suppressing occurrence of color unevenness of a mixed color obtained by combining two or more colors. Obtaining the mixed color by combining two or more colors may be expressed as "overlap" of colors or "superimposition" of colors.

In obtaining the mixed color, a method for recording respective dots of two or more colors at the same position may be used, or a method for juxtaposing respective dots of two or more colors in a predetermined neighboring area to use a color mixing phenomenon by visual mixing may be used.

Further, according to the first aspect of the invention, since a nozzle that performs recording at each position on a recording medium and a scan order are specified in advance and the ratio of pixels to be actually recorded is controlled for each nozzle on the basis of the halftone processing result, there is no problem of productivity decrease. In addition, by setting a nozzle jetting rate of an end part nozzle in a nozzle row, with respect to at least one color, to a non-uniform nozzle jetting rate (first nozzle jetting rate) that is suppressed to be lower than a nozzle jetting rate of a central nozzle, it is possible to effectively suppress banding for the at least one color.

Here, the term "color" includes chromatic and achromatic colors.

Preferably, the "range of at least the part of the recording duty" includes a halftone range.

Different kinds of dither masks may be applied to each color of a plurality of colors, or one kind of same dither mask may be applied to some different colors among the plurality of colors.

At least two kinds of dither masks that satisfy the relationship between the first nozzle jetting rate and the second nozzle jetting rate may be included in the plurality of kinds of dither masks.

The "second nozzle jetting rate having the smaller difference between the nozzle jetting rate of the end part nozzle and the nozzle jetting rate of the central nozzle than that in the first nozzle jetting rate" means that the nozzle jetting rates of the respective nozzles are closer to be uniform, compared with the first nozzle jetting rate. The "difference" between the nozzle jetting rates means a difference of values of the nozzle jetting rates to be compared, that is, the size (absolute value) of the difference therebetween.

The second nozzle jetting rate may be a uniform nozzle jetting rate in which the nozzle jetting rates of the respective nozzles are uniform, or may be a non-uniform nozzle jetting rate in which the nozzle jetting rate of the end part nozzle is suppressed to be lower than the nozzle jetting rate of the central part located at the central part of the nozzle row.

According to a second aspect of the invention, in the image processing apparatus according to the first aspect of the invention, the nozzle jetting rate of an end nozzle located at an end of the nozzle row at the first nozzle jetting rate is lower than the nozzle jetting rate of an end nozzle located at an end of the nozzle row at the second nozzle jetting rate.

As the nozzle jetting rate of the end nozzle is suppressed to be lower, it is possible to effectively suppress banding. It is preferable to obtain a dot disposition that provides the first nozzle jetting rate with respect to a banding-noticeable color such as an achromatic color such as black or a relatively dark color.

According to a third aspect of the invention, in the image processing apparatus according to the first or second aspect of the invention, the first color has a higher banding visibility than that of the second color.

According to a fourth aspect of the invention, in the image processing apparatus according to the first or second aspect of the invention, the first color has a lower visibility of color unevenness in a case where the first color overlaps a different color than that of the second color.

According to a fifth aspect of the invention, in the image processing apparatus according to the first or second aspect of the invention, the first color has a higher density than that of the second color.

According to a sixth aspect of the invention, in the image processing apparatus according to the first or second aspect of the invention, the first color has a lower saturation than that of the second color.

According to a seventh aspect of the invention, in the image processing apparatus according to any of the first to sixth aspects of the invention, the nozzle jetting rate of each nozzle of the nozzle row at the second nozzle jetting rate is constant.

According to an eighth aspect of the invention, in the image processing apparatus according to any of the first to seventh aspects of the invention, the plurality of colors include four colors of cyan, magenta, yellow, and black, a dither mask that realizes the first nozzle jetting rate is used for black image data, and the dither mask that realizes the second nozzle jetting rate is used for image data of at least one of cyan, magenta, or yellow.

The plurality of colors may include other colors, in addition to 4 colors of cyan, magenta, yellow, and black.

According to a ninth aspect of the invention, in the image processing apparatus according to any one of the first to seventh aspects of the invention, the plurality of colors include three colors of cyan, magenta, and yellow, the dither mask that realizes the first nozzle jetting rate is used for image data of at least one of cyan or magenta, and the dither mask that realizes the second nozzle jetting rate is used for yellow image data.

The plurality of colors may include other colors, in addition to 3 colors of cyan, magenta, and yellow.

According to a tenth aspect of the invention, in the image processing apparatus according to any one of the first to seventh aspects of the invention, the plurality of colors include two colors of cyan and magenta, the dither mask that realizes the first nozzle jetting rate is used for image data of one color among cyan and magenta, and the dither mask that realizes the second nozzle jetting rate is used for image data of the other color among cyan and magenta.

The plurality of colors may include other colors, in addition to magenta and cyan. In the case of focusing on cyan and magenta included in the plurality of colors, different kinds of dither masks may be applied to the two colors.

According to an eleventh aspect of the invention, in the image processing apparatus according to any one of the first to seventh aspects of the invention, the plurality of colors include four colors of cyan, magenta, yellow, and black, and a nozzle jetting rate of each nozzle that jets black ink is set so that the nozzle jetting rate of the end nozzle that is located at the end of the nozzle row is the lowest, compared with a nozzle jetting rate of each nozzle that jets ink of the other colors.

According to the eleventh aspect of the invention, it is possible to effectively suppress banding by setting the nozzle jetting rate of the end nozzle to the lowest for black for which banding is particularly noticeable.

According to a twelfth aspect of the invention, in the image processing apparatus according to any one of the first to seventh aspects of the invention, the plurality of colors include four colors of cyan, magenta, yellow, and black, and a nozzle jetting rate of each nozzle that jets black ink is set so that a difference between the nozzle jetting rate of the end part nozzle and the nozzle jetting rate of the central nozzle is the largest, compared with a nozzle jetting rate of each nozzle that jets ink of the other colors.

According to a thirteenth aspect of the invention, in the image processing apparatus according to any one of the first to seventh aspects of the invention, the plurality of colors include four colors of cyan, magenta, yellow, and black, and a nozzle jetting rate of each nozzle that jets at least one ink of cyan or magenta has a higher nozzle jetting rate of the end nozzle that is located at the end of the nozzle row, compared with a nozzle jetting rate of each nozzle that jets black ink.

According to a fourteenth aspect of the invention, in the image processing apparatus according to any one of the first to seventh aspects of the invention, the plurality of colors include four colors of cyan, magenta, yellow, and black, and a nozzle jetting rate of each nozzle that jets ink of at least one of cyan or magenta is set so that a difference between the nozzle jetting rate of the end part nozzle and the nozzle jetting rate of the central nozzle is smaller, compared with a nozzle jetting rate of each nozzle that jets black ink.

According to a fifteenth aspect of the invention, in the image processing apparatus according to the thirteenth or fourteenth aspect of the invention, a nozzle jetting rate of each nozzle that jets cyan ink and a nozzle jetting rate of each nozzle that jets magenta ink are different from each other.

According to a sixteenth aspect of the invention, in the image processing apparatus according to any one of the first to seventh aspects of the invention, the plurality of colors include yellow, and a nozzle jetting rate of each nozzle that jets yellow ink is set so that the nozzle jetting rate of the end nozzle that is located at the end of the nozzle row is the largest, compared with a nozzle jetting rate of each nozzle that jets ink of the other colors.

According to a seventeenth aspect of the invention, in the image processing apparatus according to any one of the first to seventh aspects of the invention, the plurality of colors include yellow, and a nozzle jetting rate of each nozzle that jets yellow ink is set so that a difference between the nozzle jetting rate of the end part nozzle and the nozzle jetting rate of the central nozzle is the smallest, compared with a nozzle jetting rate of each nozzle that jets ink of the other colors.

According to an eighteenth aspect of the invention, in the image processing apparatus according to any one of the first to seventh aspects of the invention, the plurality of colors include yellow, and a dither mask applied to yellow image data is a dither mask that realizes a uniform nozzle jetting rate in which a nozzle jetting rate of each nozzle that jets yellow ink is constant.

According to a nineteenth aspect of the invention, in the image processing apparatus according to any one of the first to eighteenth aspects of the invention, the apparatus further comprises: a dither mask storage section that stores plural kinds of dither masks including the dither mask that realizes the first nozzle jetting rate and the dither mask that realizes the second nozzle jetting rate; and a dither mask selecting section that selects a dither mask to be used for the halftone processing from the plural kinds of dither masks, in accordance with a color type of image data that is a target of the halftone processing.

According to a twentieth aspect of the invention, in the image processing apparatus according to any one of the first to eighteenth aspects of the invention, the halftone processing unit includes a first halftone processing section that performs the halftone processing using the first dither mask that realizes the first nozzle jetting rate with respect to the image data of the first color, and a second halftone processing section that performs the halftone processing using the second dither mask that realizes the second nozzle jetting rate with respect to the image data of the second color.

According to a twenty first aspect of the invention, there is provided an image processing method for generating dot data indicating a disposition pattern of dots for each color for recording an image on a recording medium, while relatively moving a recording head having a nozzle row in which a plurality of nozzles that jet, for each of a plurality of colors of ink, each ink are arranged in a sub scan direction, in a main scan direction perpendicular to the sub scan direction and the sub scan direction with respect to the recording medium, comprising: a halftone processing step of performing halftone processing with respect to image data of a first color among the plurality of colors, in a range of at least a part of a recording duty, using a dither mask that realizes a first nozzle jetting rate in which a nozzle jetting rate of an end part nozzle that is located at each of both end parts of the nozzle row is suppressed to be smaller than a nozzle jetting rate of a central nozzle located at a central part of the nozzle row, and performing halftone processing with respect to image data of a second color different from the first color among the plurality of colors, in the range of the recording duty, using a dither mask that realizes a second nozzle jetting rate having a smaller difference between the nozzle jetting rate of the end part nozzle and the nozzle jetting rate of the central nozzle than that in the first nozzle jetting rate.

With respect to the image processing method according to the twenty first aspect of the invention, the same matters as specific matters of the image processing apparatus specified in the second to twentieth aspects of the invention may be appropriately combined. In this case, elements of a processing unit and a functional unit that are means for performing processes and operations specified in the invention of the image processing apparatus may be understood as elements of steps of corresponding processes and operations.

According to a twenty second aspect of the invention, there is provided a dither mask set that is used for halftone processing for generating, dot data indicating a disposition pattern of dots for each color for recording an image on the recording medium, while relatively moving a recording head having a nozzle row in which a plurality of nozzles that jet, for each of a plurality of colors of ink, each ink are arranged in a sub scan direction, in a main scan direction perpendicular to the sub scan direction and the sub scan direction with respect to a recording medium, comprising: a dither mask that is used with respect to image data of a first color among the plurality of colors and realizes a first nozzle jetting rate in which a nozzle jetting rate of an end part nozzle that is located at each of both end parts of the nozzle row is suppressed to be smaller than a nozzle jetting rate of a central nozzle located at a central part of the nozzle row, in a range of at least a part of a recording duty, and a dither mask that is used with respect to image data of a second color different from the first color among the plurality of colors and realizes a second nozzle jetting rate having a smaller difference between the nozzle jetting rate of the end part nozzle and the nozzle jetting rate of the central nozzle than that in the first nozzle jetting rate, in the range of the recording duty.

The "dither mask set" refers to a combination of two or more kinds of dither masks. With respect to the dither mask set according to the twenty second aspect of the invention, the same matters as specific matters of the image processing apparatus specified in the second to twentieth aspects of the invention may be appropriately combined.

According to a twenty third aspect of the invention, there is provided an image recording apparatus comprising: recording head having a nozzle row in which a plurality of nozzles that jet, for each of a plurality of colors of ink, each ink are arranged in a sub scan direction; a halftone processing unit that performs halftone processing with respect to image data of a first color among the plurality of colors, in a range of at least a part of a recording duty, using a dither mask that realizes a first nozzle jetting rate in which a nozzle jetting rate of an end part nozzle that is located at each of both end parts of the nozzle row is suppressed to be smaller than a nozzle jetting rate of a central nozzle located at a central part of the nozzle row, and performs halftone processing with respect to image data of a second color different from the first color among the plurality of colors, in the range of the recording duty, using a dither mask that realizes a second nozzle jetting rate having a smaller difference between the nozzle jetting rate of the end part nozzle and the nozzle jetting rate of the central nozzle than that in the first nozzle jetting rate; and a recording control section that controls the jetting of the ink from the nozzles on the basis of dot data indicating a dot disposition pattern for each color obtained through the halftone processing and performs a control for recording an image on a recording medium by repeating a main scan operation of jetting the ink from the nozzles while relatively moving the recording head with respect to the recording medium in a main scan direction that is orthogonal to the sub scan direction to perform recording and a sub scan operation of relatively moving the recording medium with respect to the recording head in the sub scan direction.

With respect to the image recording apparatus according to the twenty third aspect of the invention, the same matters as the specific matters of the image processing apparatus specified in the second to twentieth aspects may be appropriately combined.

According to the present invention, in a configuration in which an image is recorded on a recording medium by repeating a main scan operation and a sub scan operation, it is possible to suppress occurrence of banding (density unevenness) and occurrence of color unevenness, without productivity decrease.

Figure 11:
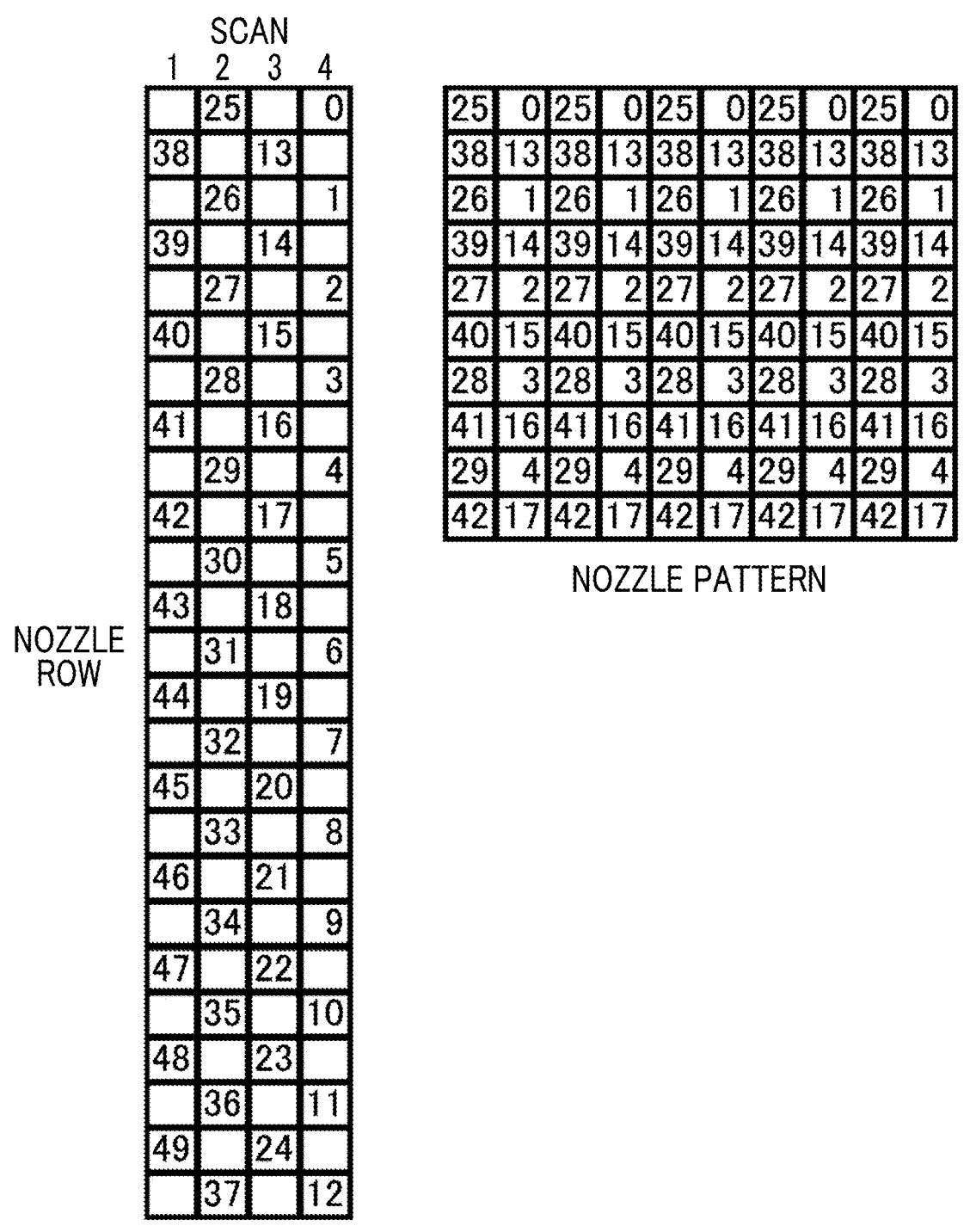

A left diagram of FIG. 11 is a diagram illustrating a relationship between scans for recording each raster and nozzles, and a right diagram of FIG. 11 is a chart showing a part of a nozzle pattern.

Figure 7:
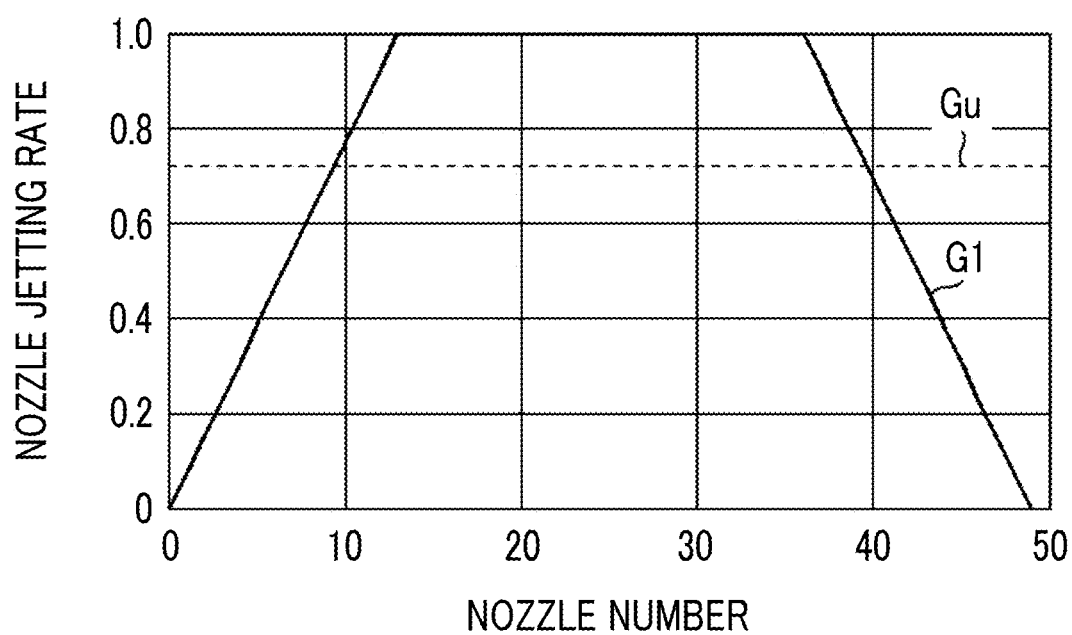
FIG. 7 is a diagram showing an example of data of a nozzle jetting rate determined for each nozzle.

FIG. 12 is a chart showing a jetting rate pattern obtained by expanding a nozzle jetting rate shown in graph G1 shown in FIG. 7 in accordance with the nozzle pattern shown in the right diagram of FIG. 11.

FIG. 13 is a chart showing an overlap probability pattern in which two colors having the jetting rate pattern shown in FIG. 12 are superimposed.

FIG. 14 is a chart showing an example of a jetting rate pattern in the case of a uniform nozzle jetting rate shown in graph Gu shown in FIG. 7.

FIG. 15 is a chart showing an overlap probability pattern in the case of the uniform nozzle jetting rate shown in FIG. 14.

FIG. 16 is a chart showing an overlap probability pattern in a case where disposition of dots of color B is shifted by one pixel in the main scan direction with respect to disposition of dots of color A.

FIG. 17 is a chart showing an overlap probability pattern in a case where disposition of dots of color B is shifted by one pixel in the sub scan direction with respect to disposition of dots of color A.

Figure 18:
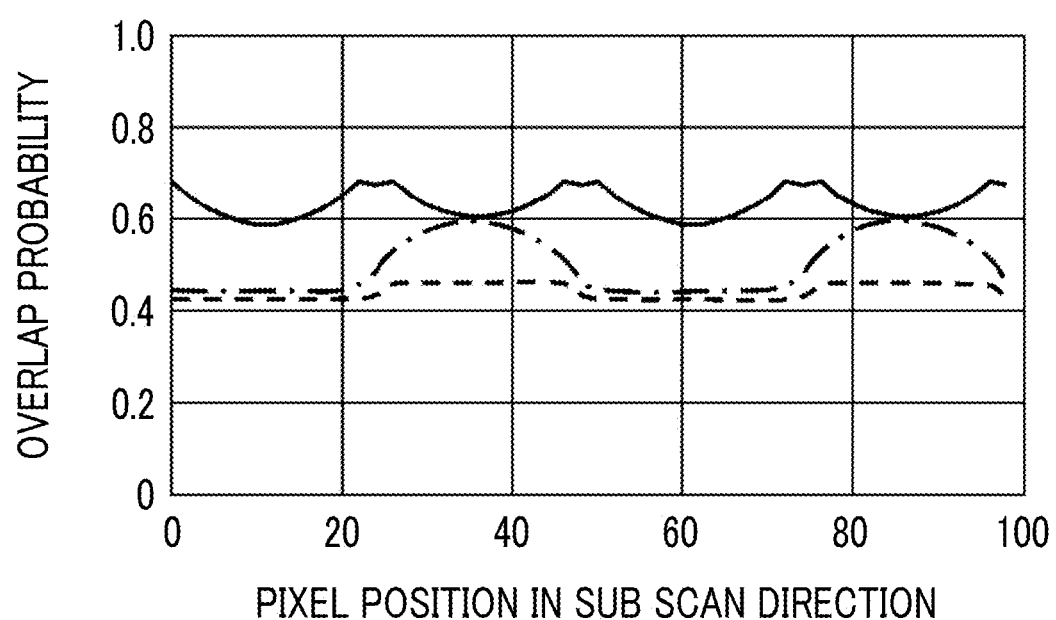

FIG. 18 is a graph showing an average overlap probability per unit area at each position in the sub scan direction in the case of a non-uniform nozzle jetting rate.

Figure 19:
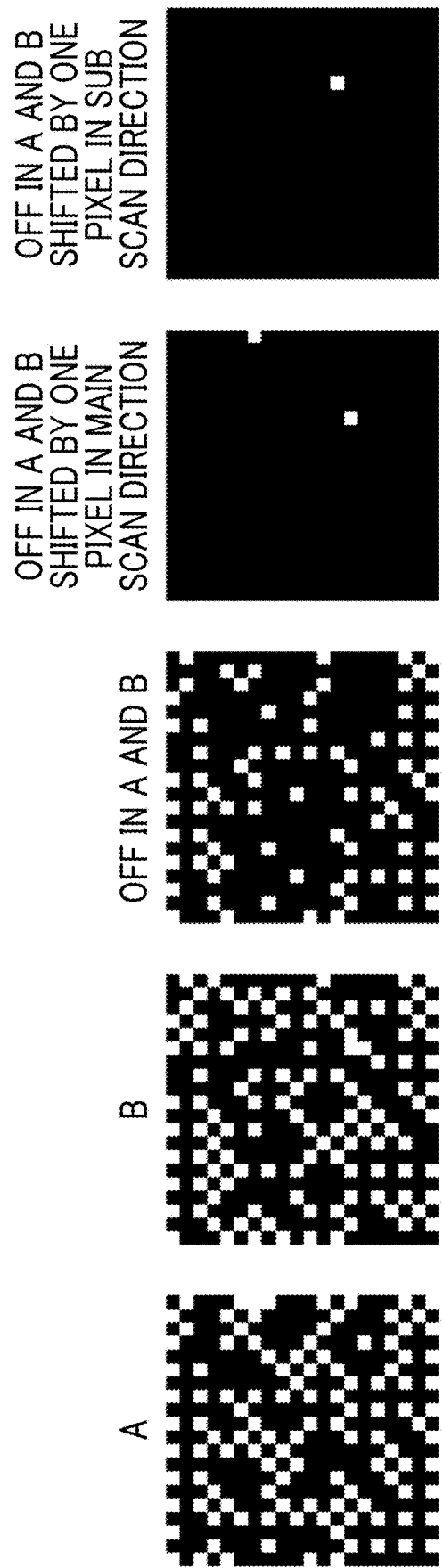

FIG. 19 is a diagram showing a specific example of disposition of dots of color A and color B in the case of a non-uniform nozzle jetting rate shown in the graph G1 shown in FIG. 7.

Figure 20:
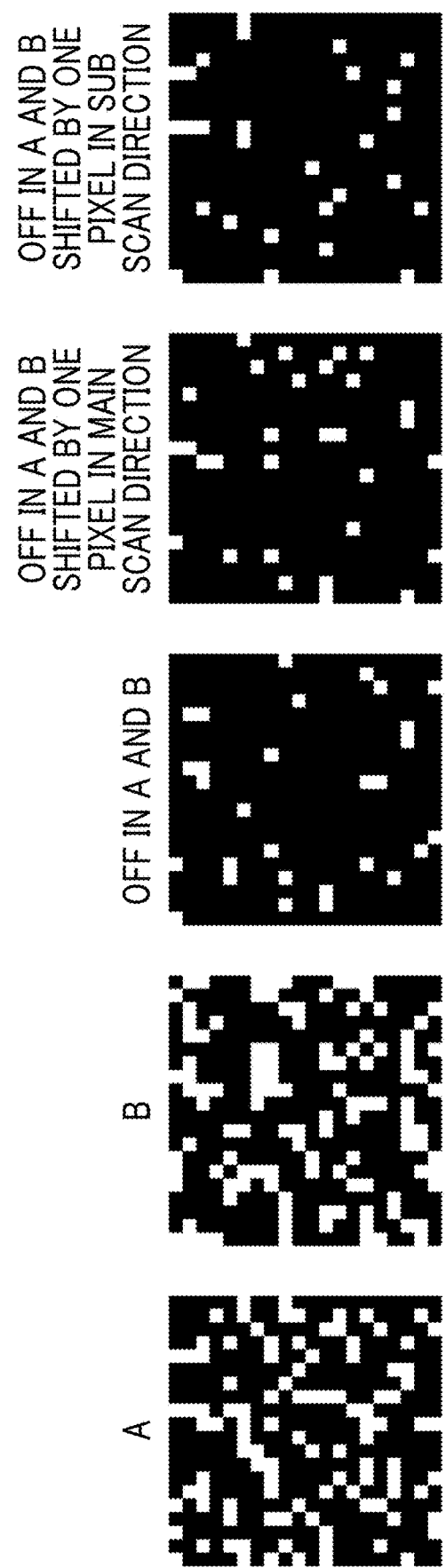

FIG. 20 is a diagram showing a specific example of disposition of dots of color A and color B in the case of the uniform nozzle jetting rate shown in the graph Gu shown in FIG. 7.

Figures 21, 22:
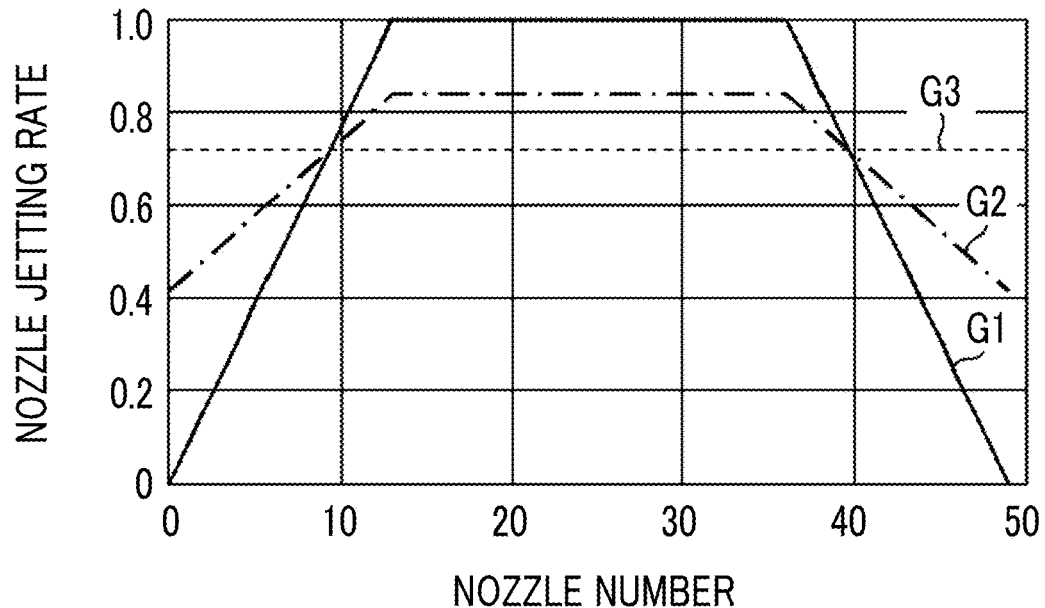

FIG. 21 is a graph showing an example of a nozzle jetting rate applied to an embodiment of the invention.

FIG. 22 is a chart showing a jetting rate pattern obtained by developing the nozzle jetting rate shown in the graph G2 of FIG. 21 in accordance with the nozzle pattern shown in FIG. 11.

FIG. 23 is a chart showing an example of an overlap probability pattern of two colors of cyan and magenta.

FIG. 24 is a chart showing an example of an overlap probability pattern in a case where dot disposition of two colors of cyan and magenta is shifted by one pixel in the main scan direction.

Figures 25, 26:
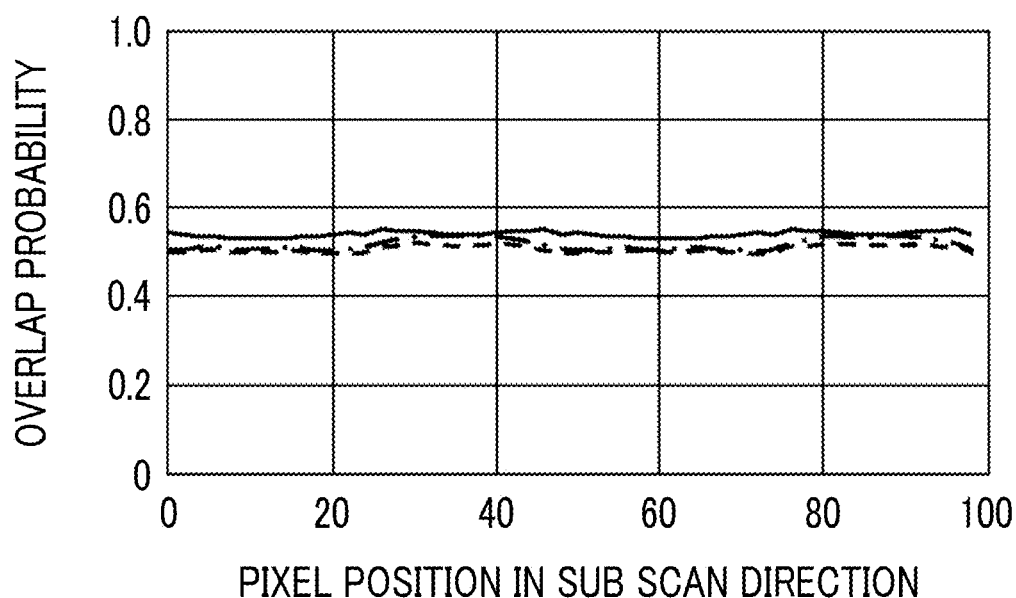

FIG. 25 is a chart showing an example of an overlap probability pattern in a case where dot disposition of two colors of cyan and magenta is shifted by one pixel in the sub scan direction.

FIG. 26 is a graph showing an average overlap probability per unit area at each position in the sub scan direction in a case where a nozzle jetting rate shown in graph G2 of FIG. 21 is employed.

FIG. 27 is a chart showing an example of an overlap probability pattern in a case where a nozzle jetting rate of one color among two colors is the nozzle jetting rate shown in the graph G1 of FIG. 21 and a nozzle jetting rate of the other color is the nozzle jetting rate shown in the graph G2 of FIG. 21.

FIG. 28 is a chart showing an example of an overlap probability pattern in a case where dot disposition of two colors is shifted by one pixel in the main scan direction.

Figures 29, 30:
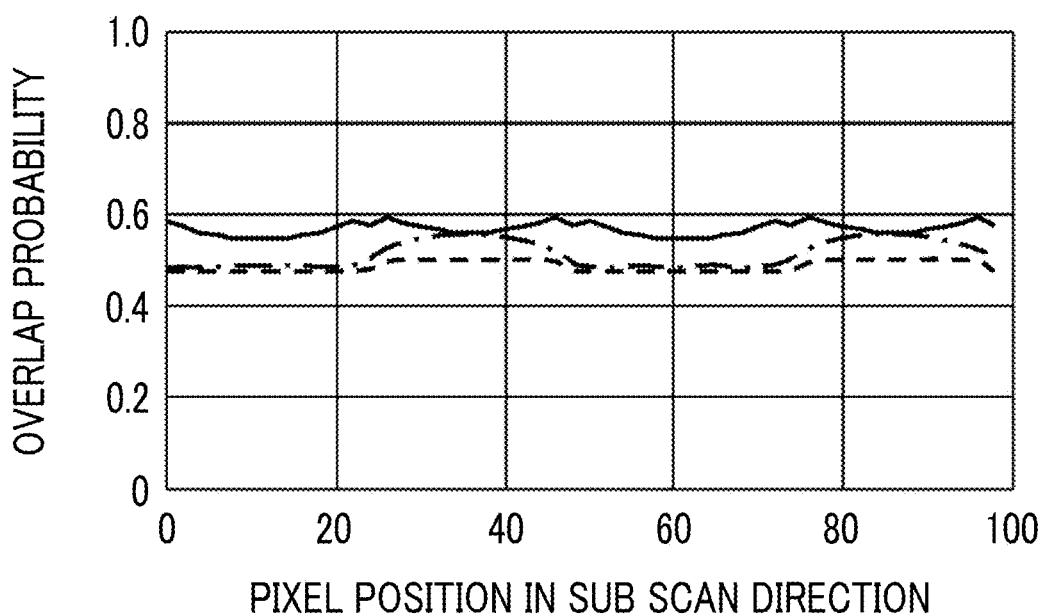

FIG. 29 is a chart showing an example of an overlap probability pattern in a case where dot disposition of two colors is shifted by one pixel in the sub scan direction.

FIG. 30 is a graph showing an average overlap probability per unit area at each position in the sub scan direction.

Figure 31:
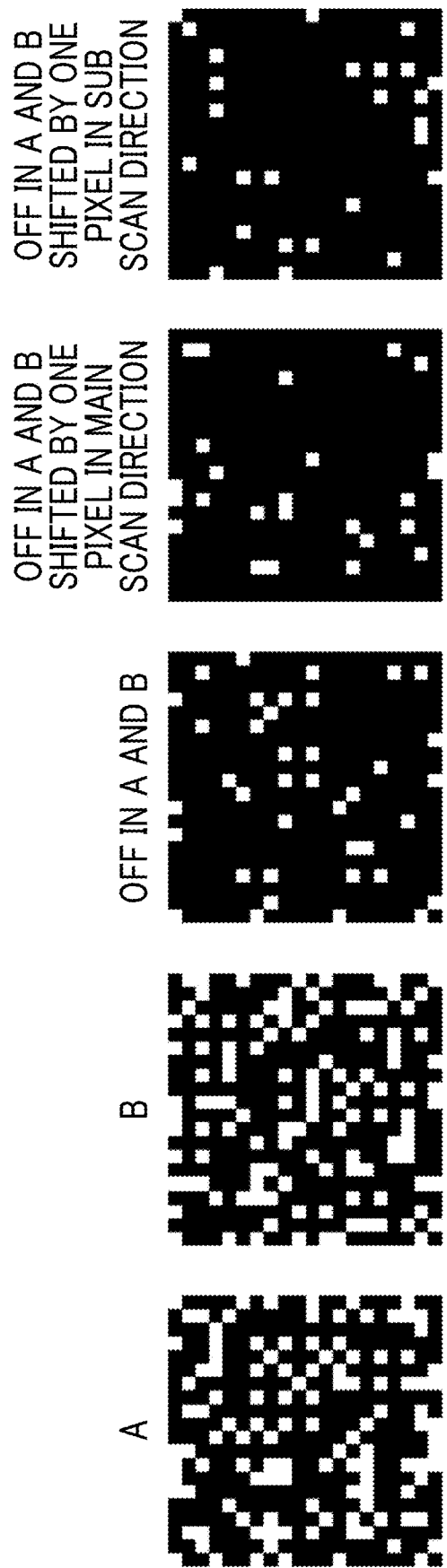

FIG. 31 is a diagram showing an example of dot disposition in a case where nozzle jetting rates of two colors correspond to all the nozzle jetting rate shown in the graph G2 of FIG. 21.

Figure 32:
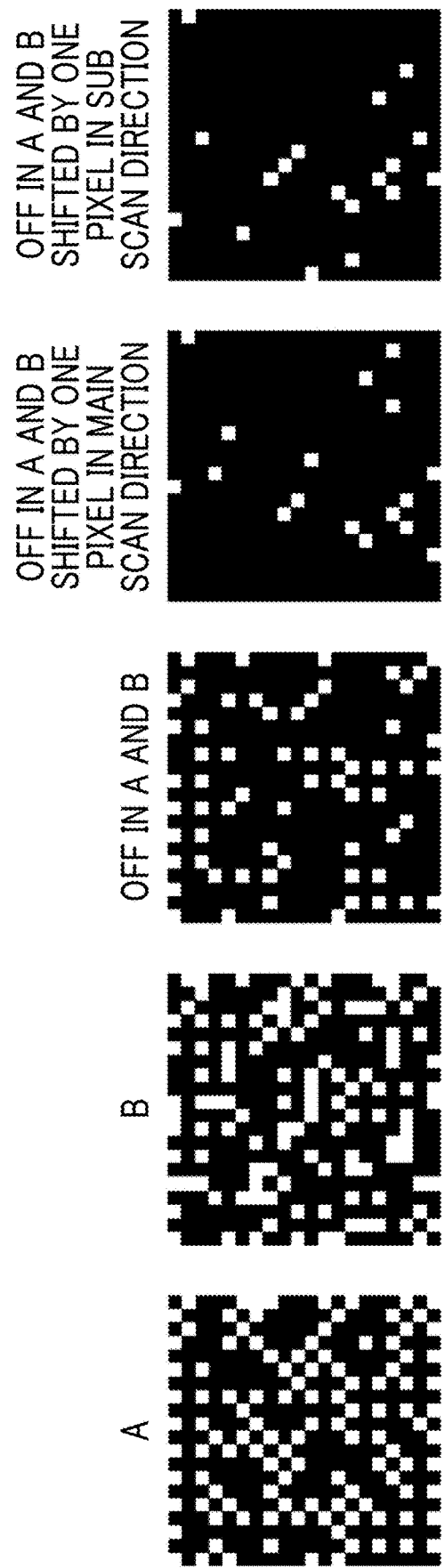

FIG. 32 is a chart showing an example of dot disposition in a case where a nozzle jetting rate of one color among two colors is the nozzle jetting rate shown in the graph G1 of FIG. 21 and a nozzle jetting rate of the other color is the nozzle jetting rate shown in the graph G2 of FIG. 21.

Figure 33:
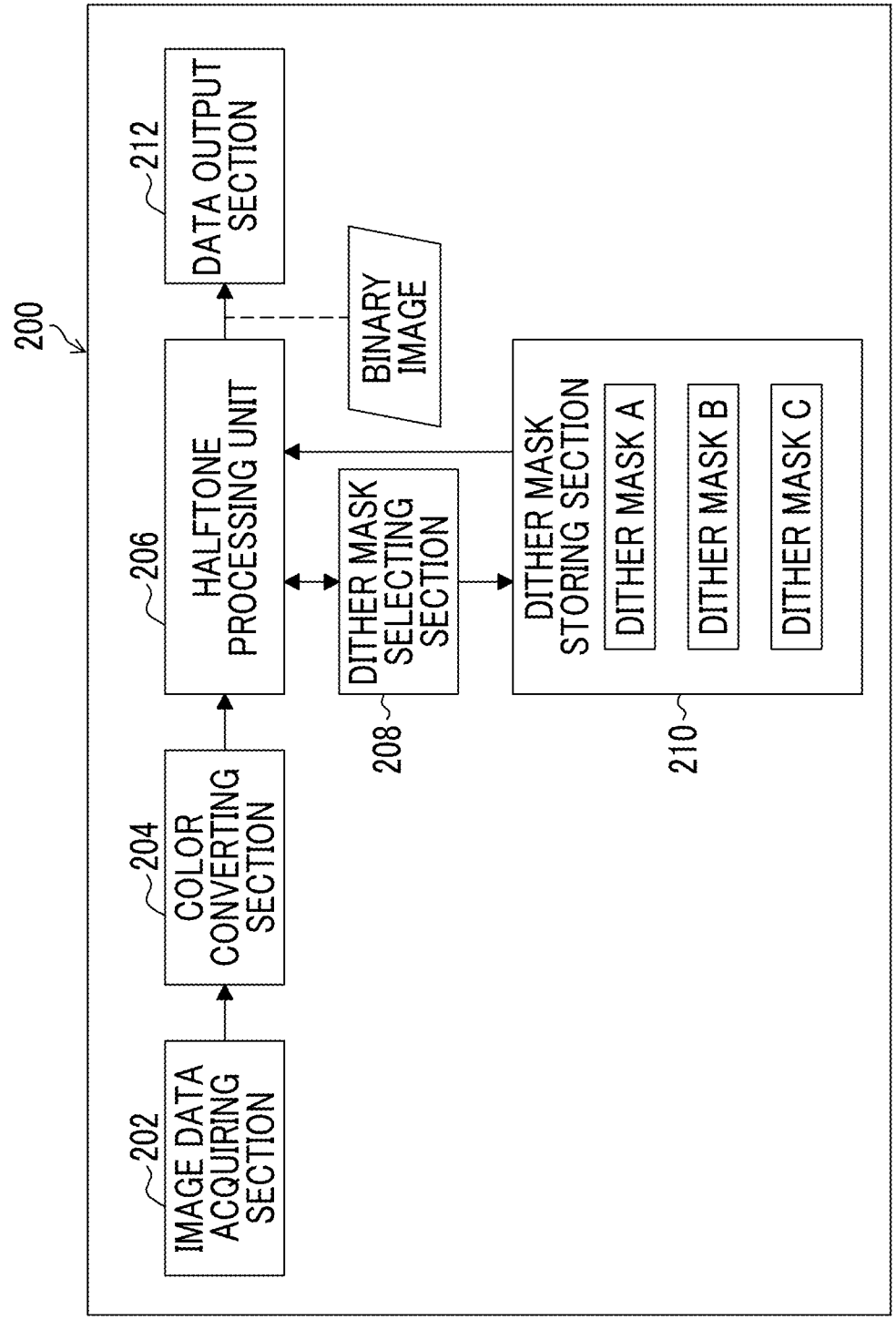

FIG. 33 is a block diagram showing functions of an image processing apparatus according to an embodiment of the invention.

Figure 34:
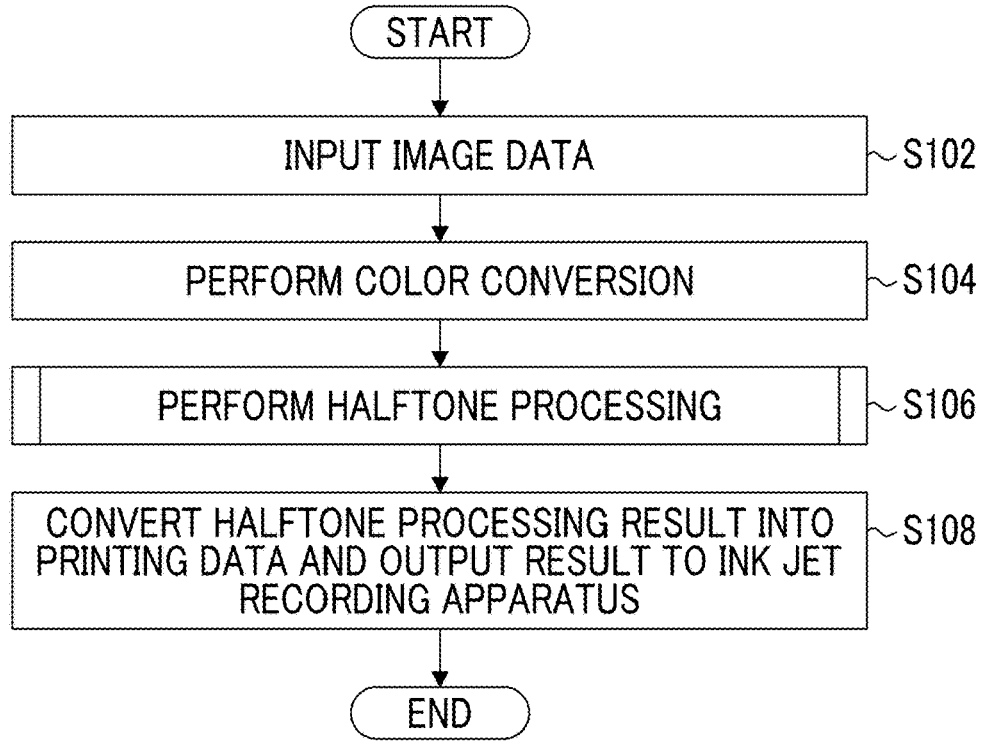

FIG. 34 is a flowchart showing a processing flow of the image processing apparatus.

Figure 35:
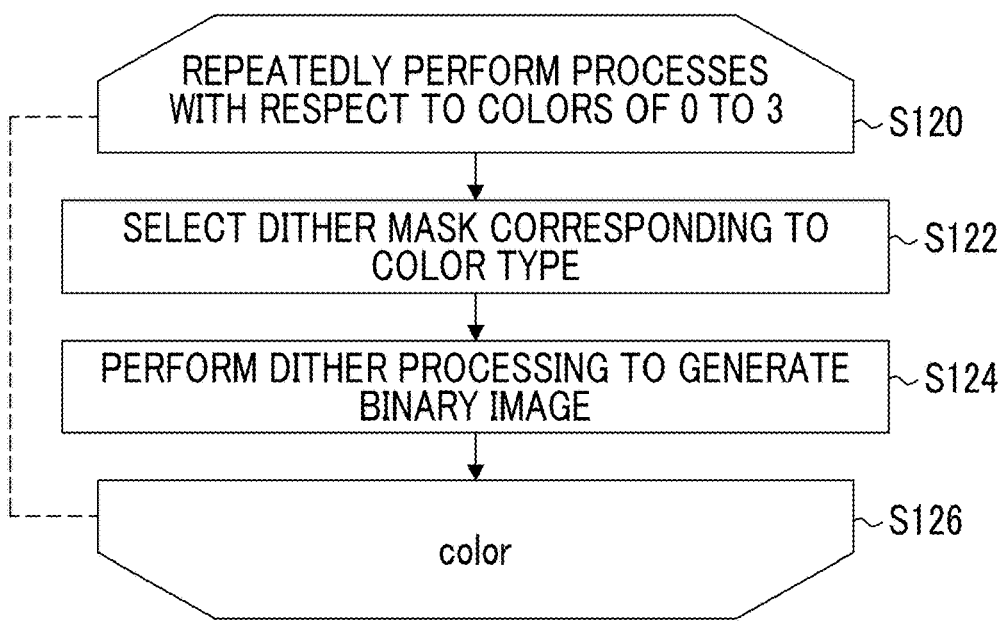

FIG. 35 is a flowchart showing processing content in a halftone processing step (step S106 in FIG. 34).

Figure 36:
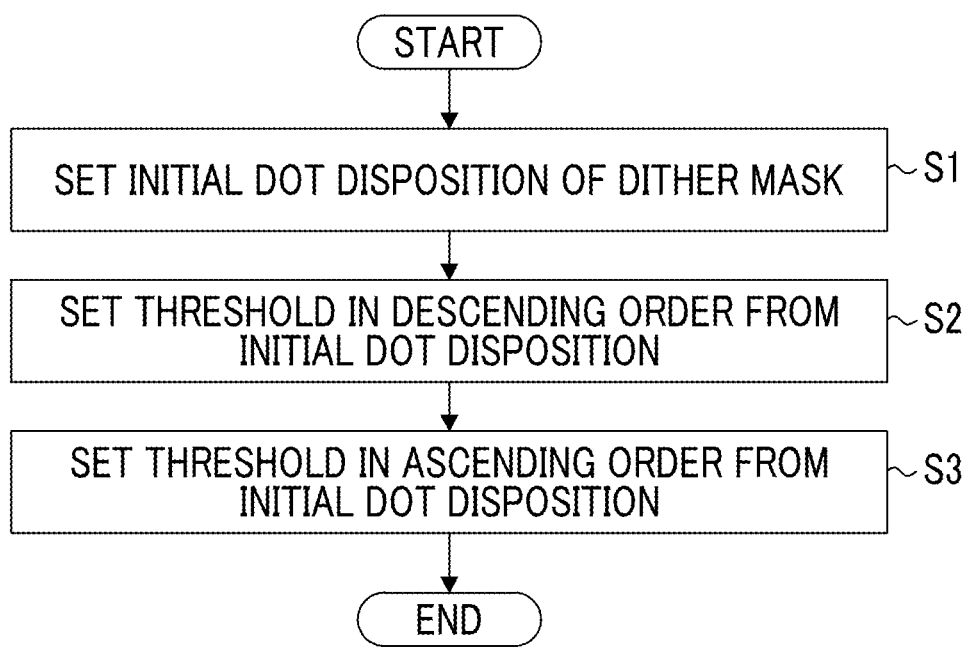

FIG. 36 is a flowchart showing an example of a procedure of a dither mask generating method.

Figure 37:
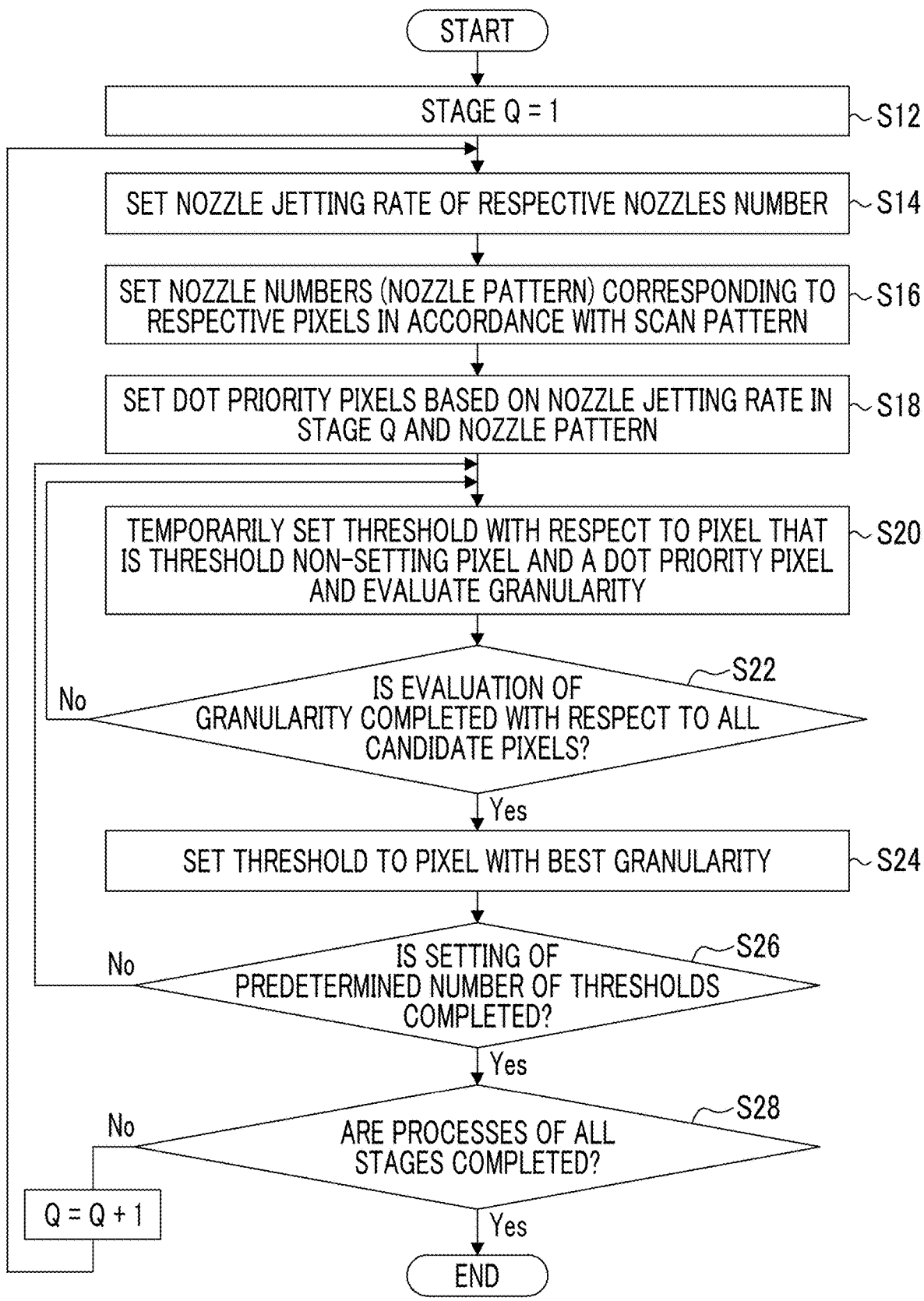

FIG. 37 is a flowchart showing an example of an ascending threshold setting process applied to an ascending threshold setting operation (step S3 in FIG. 36).

Figure 38:
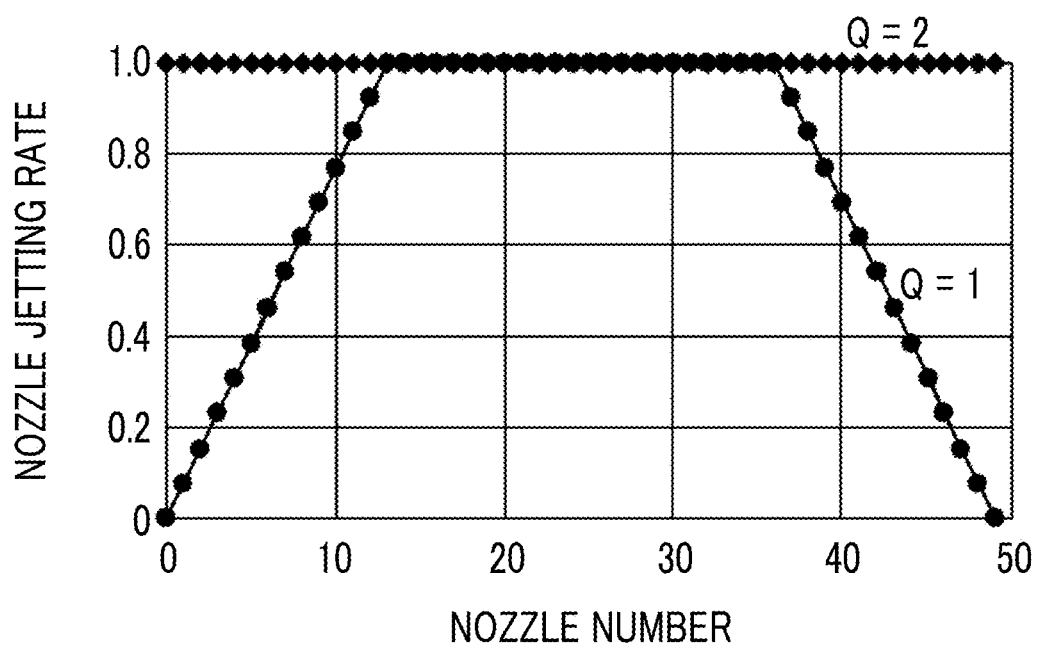

FIG. 38 is a graph showing an example of a nozzle jetting rate in each stage in a case where the number of stages is 2.

FIG. 39 is a diagram showing an example of disposition of dot priority pixels.

Figure 40:
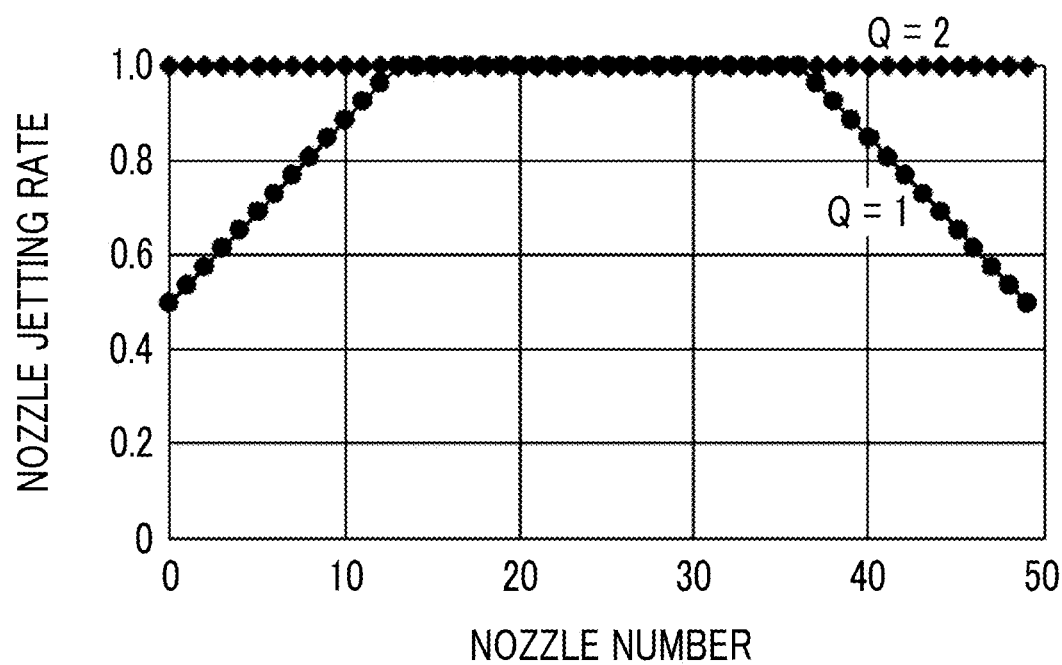

FIG. 40 is a graph showing another example of a nozzle jetting rate in each stage in a case where the number of stages is 2.

Figure 41:
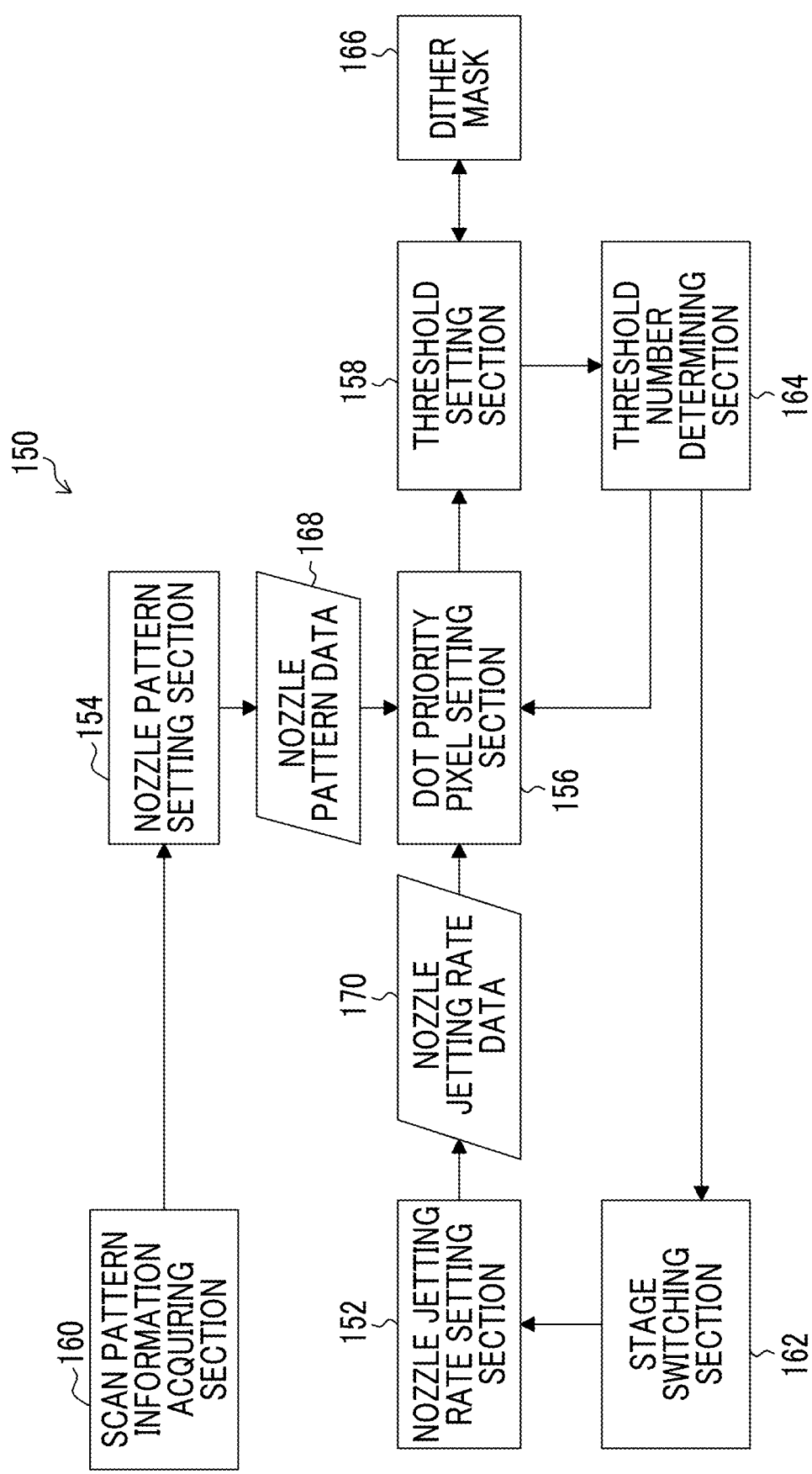

FIG. 41 is a block diagram showing functions of a dither mask generating device.

Figure 42:
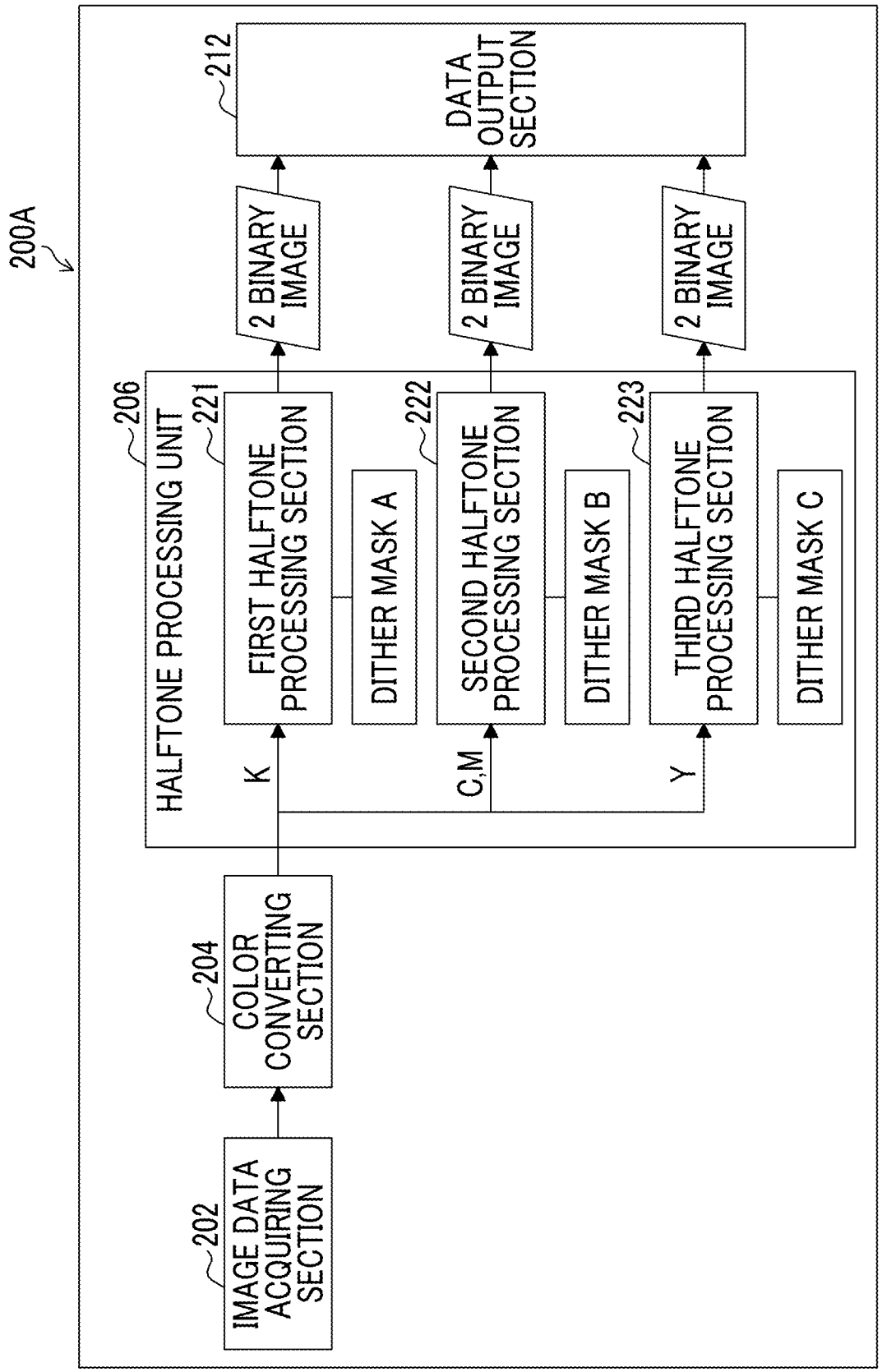

FIG. 42 is a block diagram showing another configuration example of the image processing apparatus.

DESCRIPTION OF THE PREFERRED
EMBODIMENTS

Hereinafter, preferred embodiments of the invention will be described with reference to the accompanying drawings.

Configuration Example of Ink Jet Recording Apparatus

Figure 1:
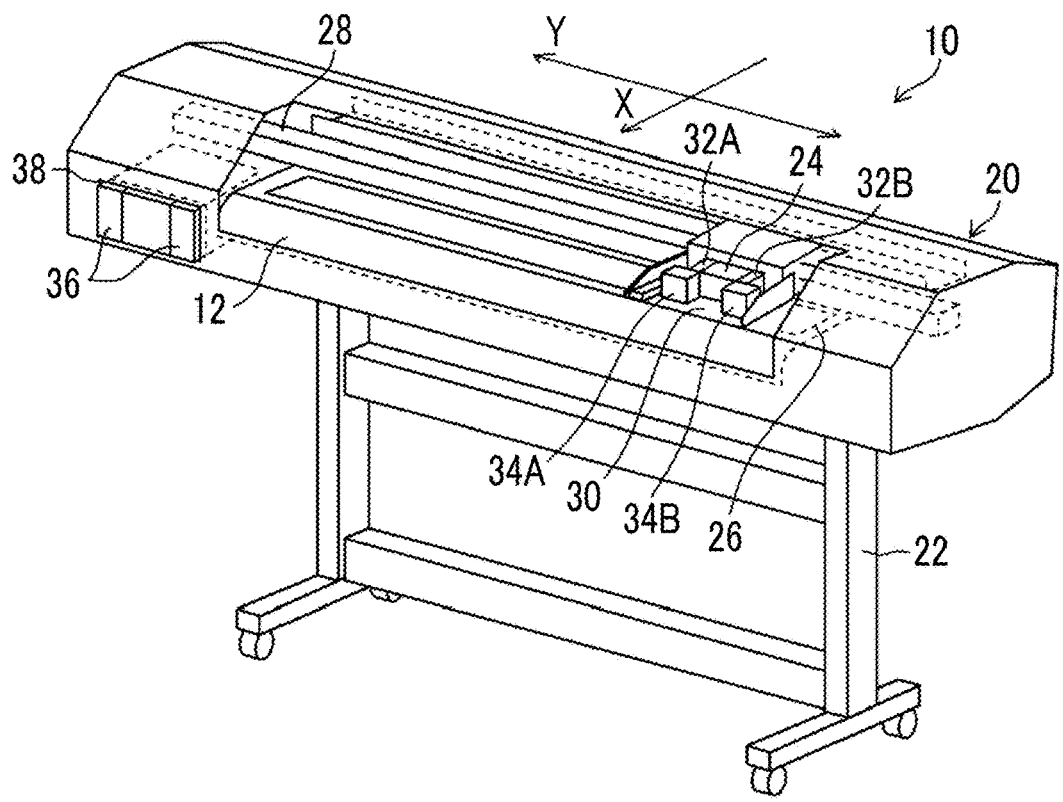
FIG. 1 is an external perspective view showing a configuration example of an ink jet recording apparatus.

FIG. 1 is an external perspective view showing a configuration example of an ink jet recording apparatus. An ink jet recording apparatus 10 is an example of a serial type ink jet printer, which is a wide format printer for recording a color image on a recording medium 12 using an ultraviolet curable ink.

The ink jet recording apparatus 10 comprises an apparatus body 20 and support feet 22 that supports the apparatus body 20. A recording head 24, a platen 26, a guide mechanism 28, and a carriage 30 are provided in the apparatus body 20.

The recording head 24 is a drop-on-demand type ink jet head that jets ink toward the recording medium 12. The term "recording head" is synonymous with a term such as a printing head, a print head, a plotting head, an ink jet head, a liquid jet head, a droplet jet head, or a droplet jet head. Further, the term "ink jet recording apparatus" is synonymous with a term such as an ink jet printing apparatus, an ink jet printer, or an ink jet type image forming apparatus. The term "recording" is used as a term that includes a meaning of "printing", "print", "plotting" or "image forming".

A variety of mediums may be used as the recording medium 12, regardless of materials such as paper, non-woven fabric, vinyl chloride, synthetic chemical fibers, polyethylene, polyester, or tarpaulin. The recording medium 12 may be a permeable medium, or may be a non-permeable medium. The term "recording medium" is a generic term for mediums to which ink is attached, and may include mediums called a variety of terms such as a printing medium, a medium for recording, a medium for image forming, an image receiving medium, a medium for jetting, a print medium, a recording sheet, or a printing sheet. In this specification, the term "sheet" is synonymous with a "recording medium".

The platen 26 is a member that supports the recording medium 12. The guide mechanism 28 and the carriage 30 function as head moving means for supporting the recording head 24 to be movable. The guide mechanism 28 is disposed to extend along a head scan direction that crosses a transport direction of the recording medium 12 and is a direction parallel to a medium support surface of the platen 26, above the platen 26. The "above the platen 26" means that the guide mechanism 28 is disposed at an upper and higher position with reference to the platen 26 when a gravity direction is a "downward" direction. The transport direction of the recording medium 12 may be referred to as a "paper feed direction". Further, a direction that is perpendicular to the paper feed direction and is parallel to a recording surface of the recording medium 12 may be referred to as a "sheet width direction".

The carriage 30 is supported to be reciprocally movable in the sheet width direction along the guide mechanism 28. A direction that is parallel to the reciprocal direction of the carriage 30 corresponds to a "main scan direction". Further, a direction that is parallel to the transport direction of the recording medium 12 corresponds to a "sub scan direction". That is, the paper width direction is the main scan direction, and the paper feed direction is the sub scan direction. In FIG. 1, the sub scan direction is expressed as an X direction, and the main scan direction is expressed as a Y direction.

The recording head 24, temporary curing light sources 32A and 32B, and main curing light sources 34A and 34B are mounted on the carriage 30. The recording head 24, the temporary curing light sources 32A and 32B, and the main curing light sources 34A and 34B integrally move together with the carriage 30 along the guide mechanism 28. By reciprocating the carriage 30 along the guide mechanism 28, the recording head 24 may be relatively moved in the main scan direction with respect to the recording medium 12.

The temporary curing light sources 32A and 32B emit infrared rays for temporarily curing ink landed on the recording medium 12. The temporary curing means partially curing ink to such a degree as to prevent movement or deformation of ink drops after dropping. A temporary curing process may be referred to as "partial curing", "half curing", "pinning", "set", or the like. In the present specification, the term "temporary curing" is used.

On the other hand, a process of further emitting infrared rays after the temporary curing and sufficiently curing ink is referred to as "main curing" or "curing". In the present specification, the term "main curing" is used. The main curing light sources 34A and 34B are light sources that perform additional exposure after the temporary curing and finally emit infrared rays for mainly curing ink.

The apparatus body 20 is provided with a mounting portion 38 for mounting of an ink cartridge 36. The ink cartridge 36 is an exchangeable ink tank that stores infrared curing ink. The ink cartridge 36 is provided corresponding to ink of each color used in the ink jet recording apparatus 10. The ink jet recording apparatus 10 in this example has a configuration in which ink of four colors, that is, cyan (C), magenta (M), yellow (Y), and black (K) is used. The respective color ink cartridges 36 are connected to the recording head 24 by ink supply paths that are independently formed. In a case where an ink remaining amount of each color becomes small, exchange of the ink cartridge 36 is performed.

Although not shown, a maintenance portion of the recording head 24 is provided on a right side when looking at the front of the apparatus body 20. The maintenance portion is provided with a cap for moisturization or nozzle suction of the recording head 24 when printing is not performed, and a dispense member for cleaning a nozzle surface that is an ink jet face of the recording head 24. A blade and/or a web may be used as the dispense member.

Configuration of Recording Medium Transport Path

Figure 2:
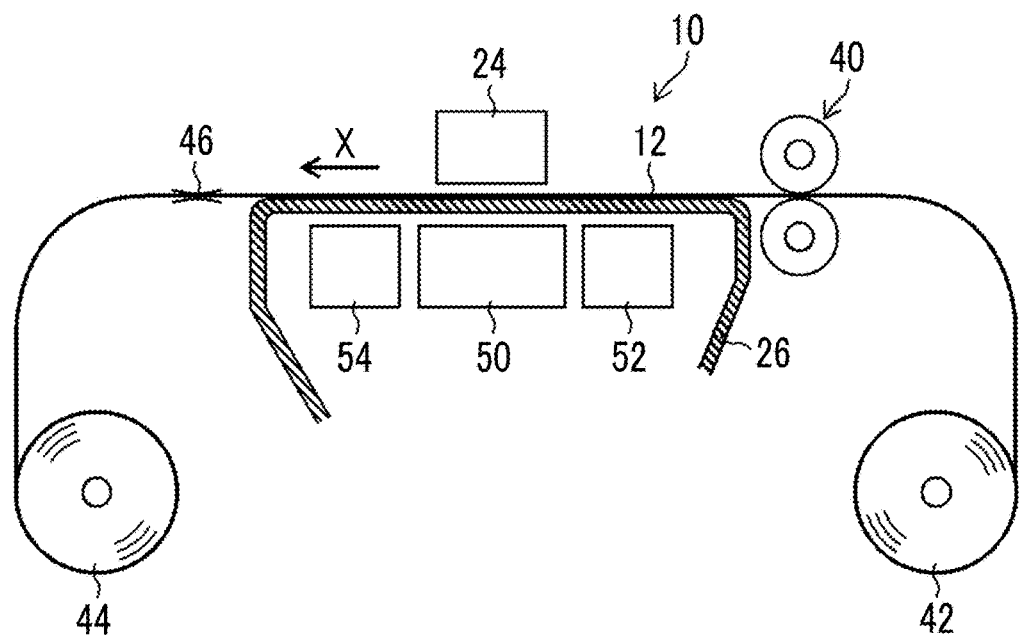
FIG. 2 is a diagram schematically showing a recording medium transport path of the ink jet recording apparatus.

FIG. 2 is a diagram schematically showing a recording medium transport path of the ink jet recording apparatus 10. As shown in FIG. 2, the platen 26 has an upper face that is a support face of the recording medium 12. On an upstream side in the paper feed direction with reference to a position of the platen 26, nip rollers 40 are disposed.

The recording medium 12 in this example is supplied in the form of rolled continuous paper. The recording medium 12 sent out from a supply side roll 42 is transported by the nip rollers 40. With respect to the recording medium 12 that reaches an area directly below the recording head 24, an image is recorded by the recording head 24. On a downstream side in the paper feed direction with reference to the position of the recording head 24, a winding roll 44 that winds the recording medium 12 after image recording is provided. Further, a guide 46 is provided on a transport path of the recording medium 12 between the platen 26 and the winding roll 44.

In the ink jet recording apparatus 10 of the present embodiment, roll-to-roll type paper transport means in which the recording medium 12 sent from the supply side roll 42 is wound by the winding roll 44 through the platen 26 is employed. Here, in execution of the invention, a configuration of the paper transport means is not limited to this example. For example, a configuration in which the winding roll 44 is not provided, or a configuration in which a cutter that cuts the recording medium 12 in a desired size is provided, or other configurations may be used. Further, the recording medium 12 is not limited to the continuous paper, and cut paper, that is, flat paper separated one by one may be used.

On a rear surface side of the platen 26, that is, on a side opposite to a medium support face that supports the recording medium 12 in the platen 26, a temperature control section 50 that controls temperature of the recording medium 12 during image recording is provided. By the temperature control of the temperature control section 50, it is possible to obtain desired values of physical properties such as a viscosity and a surface tension of ink landed on the recording medium 12, and to obtain desired dot diameters. Further, a pre-temperature control section 52 is provided on an upstream side of the temperature control section 50 in the paper feed direction, and an after-temperature control section 54 is provided on a downstream side of the temperature control section 50 in the paper feed direction. A configuration in which the pre-temperature control section 52 and/or the after-temperature control section 54 are not provided may be used.

Configuration Example of Recording Head

Figure 3:
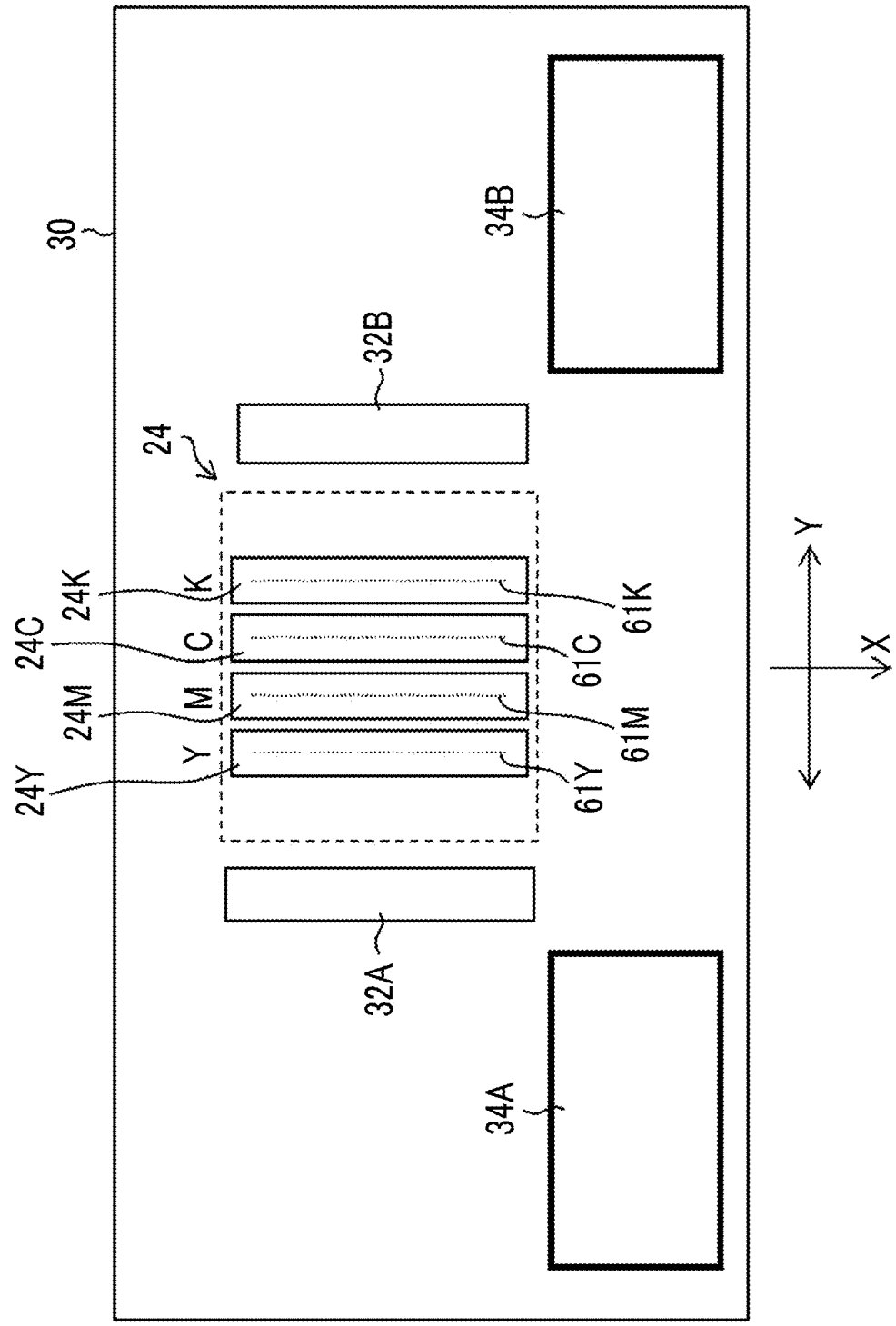
FIG. 3 is a planar perspective view showing an example of a disposition configuration of a recording head, a temporary curing light source, and a main curing light source disposed on a carriage.
Figure 4:
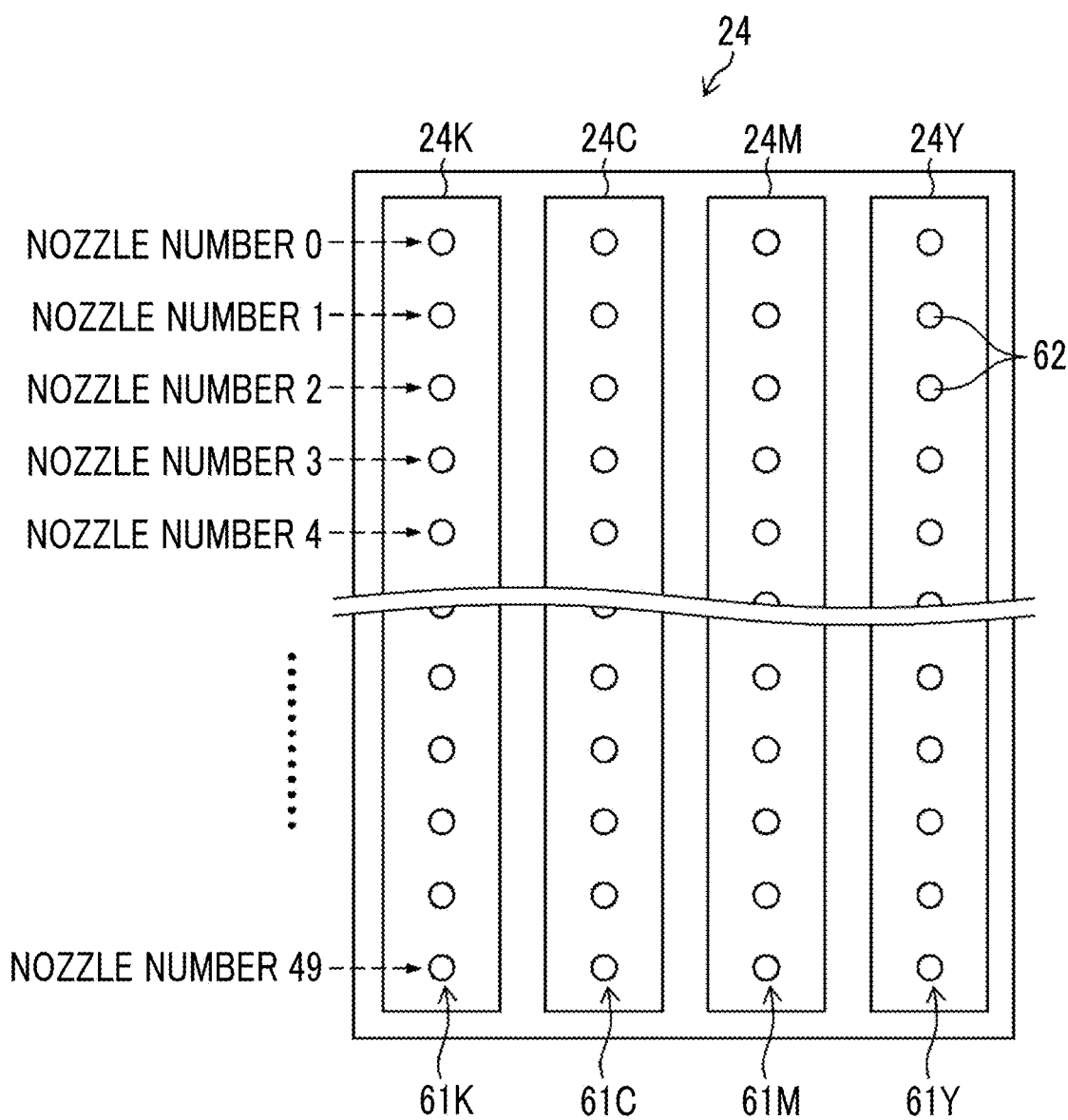
FIG. 4 is an enlarged view of the recording head shown in FIG. 3.

FIG. 3 is a planar perspective view showing an example of a disposition configuration of the recording head 24, the temporary curing light sources 32A and 32B, and the main curing light sources 34A, and 34B, disposed on the carriage 30. FIG. 4 is an enlarged view of the recording head 24 in FIG. 3.

As shown in FIGS. 3 and 4, nozzle rows 61C, 61M, 61Y, and 61K in which nozzles 62 (see FIG. 4) for jetting ink of the respective colors of cyan (C), magenta (M), yellow (Y), and black (K) are arranged in the sub scan direction are provided in the recording head 24.

In FIG. 3, the nozzle rows are indicated by dotted lines, and individual illustrations of the nozzles are not shown. In the recording head 24 shown in FIG. 3, an example in which the respective nozzle rows are disposed in the order of the nozzle row 61Y of yellow, the nozzle row 61M of magenta, the nozzle row 61C of cyan, and the nozzle row 61K of black from the left of FIG. 3 is shown, but kinds (color numbers) of ink colors or color combinations are not limited to the present embodiment.

For example, in addition to four colors of C, M, Y, and K, a configuration in which light ink such as light cyan or light magenta is used, or a configuration in which ink of a special color instead of the light ink or in combination thereof is used may be used. In accordance with the kind of an ink color to be used, a configuration in which a nozzle row that jets ink corresponding thereto is added may be used. Further, the disposition order of the nozzle rows of the colors is not particularly limited. Here, it is preferable that a configuration in which a nozzle row of ink that has a relatively low curing sensitivity with respect to ultraviolet rays among a plurality of kinds of ink is disposed on a side close to the temporary curing light source 32A or 32B is used.

In this embodiment, the recording head 24 is configured by forming a head module for each of the nozzle rows 61C, 61M, 61Y, and 61K of the respective colors and arranging the head modules. Specifically, a head module 24Y having the nozzle row 61Y that jets yellow ink, a head module 24M having the nozzle row 61M that jets magenta ink, a head module 24C having the nozzle row 61C that jets cyan ink, and a head module 24K having the nozzle row 61K that jets black ink are disposed at equal intervals to be parallel to each other in the reciprocal direction of the carriage 30. The reciprocal direction of the carriage 30 is the main scan direction.

The entirety of the module group of the head modules 24Y, 24M, 24C, and 24K of the respective colors may be considered as the "recording head", or each head module may be considered as the "recording head". Further, instead of a configuration in which the head modules 24Y, 24M, 24C, and 24K of the respective colors are combined, a configuration in which ink passages for respective colors are dividedly formed inside one recording head and nozzle rows that jet ink of a plurality of colors are provided may be used.

As shown in FIG. 4, the respective nozzle rows 61C, 61M, 61Y, and 61K are formed so that a plurality of nozzles 62 are arranged in parallel at regular intervals in the sub scan direction. In FIG. 4, an example in which 50 nozzles 62 are respectively arranged in the nozzle rows 61C, 61M, 61Y, and 61K of the respective colors is shown. Nozzle numbers 0 to 49 are assigned to the respective nozzles 62.

The nozzle numbers in this example are sequentially assigned to the respective nozzles 62 as consecutive numbers from one end side toward the other end side of the nozzle row in the sub scan direction. In this example, the nozzle number starts from the number 0, but a leading number among the nozzle numbers may be the number 1. The leading number may be a random integer that is equal to or greater than 0. The nozzle numbers may be used as identification numbers indicating positions of the respective nozzles 62.

Further, this example shows a nozzle row in which 50 nozzles 62 are arranged in a row along the sub scan direction, but the number of nozzles that form the nozzle row and a disposition form of the nozzles are not limited to this example. For example, a nozzle row in which nozzles are arranged at equal intervals in the sub scan direction using a two-dimensional nozzle arrangement in which a plurality of nozzle rows are combined may be formed.

As an ink jet method of the recording head 24, a piezo jet method for jetting ink through deformation of a piezoelectric element is employed. As a configuration in which an electrostatic actuator instead of the piezoelectric element is used a jet energy generating element may be used. Further, a thermal jet method for heating ink using a heating body (a heat generating element) such as a heater to generate an air bubble and jetting ink drops by its pressure may be employed. Here, since the ultraviolet curable ink generally has a viscosity higher than that of solvent ink, in a case where the ultraviolet curable ink is used, it is preferable to employ the piezo jet method having a relatively large jetting rate.

The recording head 24 jets ink onto the recording medium 12 while being moved in the main scan direction to perform image recording in a region having a predetermined length of the recording medium 12 in the sub scan direction. Further, in a case where the recording medium 12 is moved by a predetermined distance in the sub scan direction after the image recording, the recording head 24 performs the same recording in the next region, and thereafter, the same image recording is repeated whenever the recording medium 12 is moved by the predetermined distance in the sub scan direction, so that the image recording may be performed over the entire surface of the recording region of the recording medium 12.

As described above, the recording head 24 is a serial type recording head. The ink jet recording apparatus 10 (see FIG. 1) of the present embodiment employs a multipath method in which a predetermined recording resolution is realized through a plurality of scans of the recording head 24 in the main scan direction.

Configuration of Control System of Ink Jet Recording Apparatus

Figure 5:
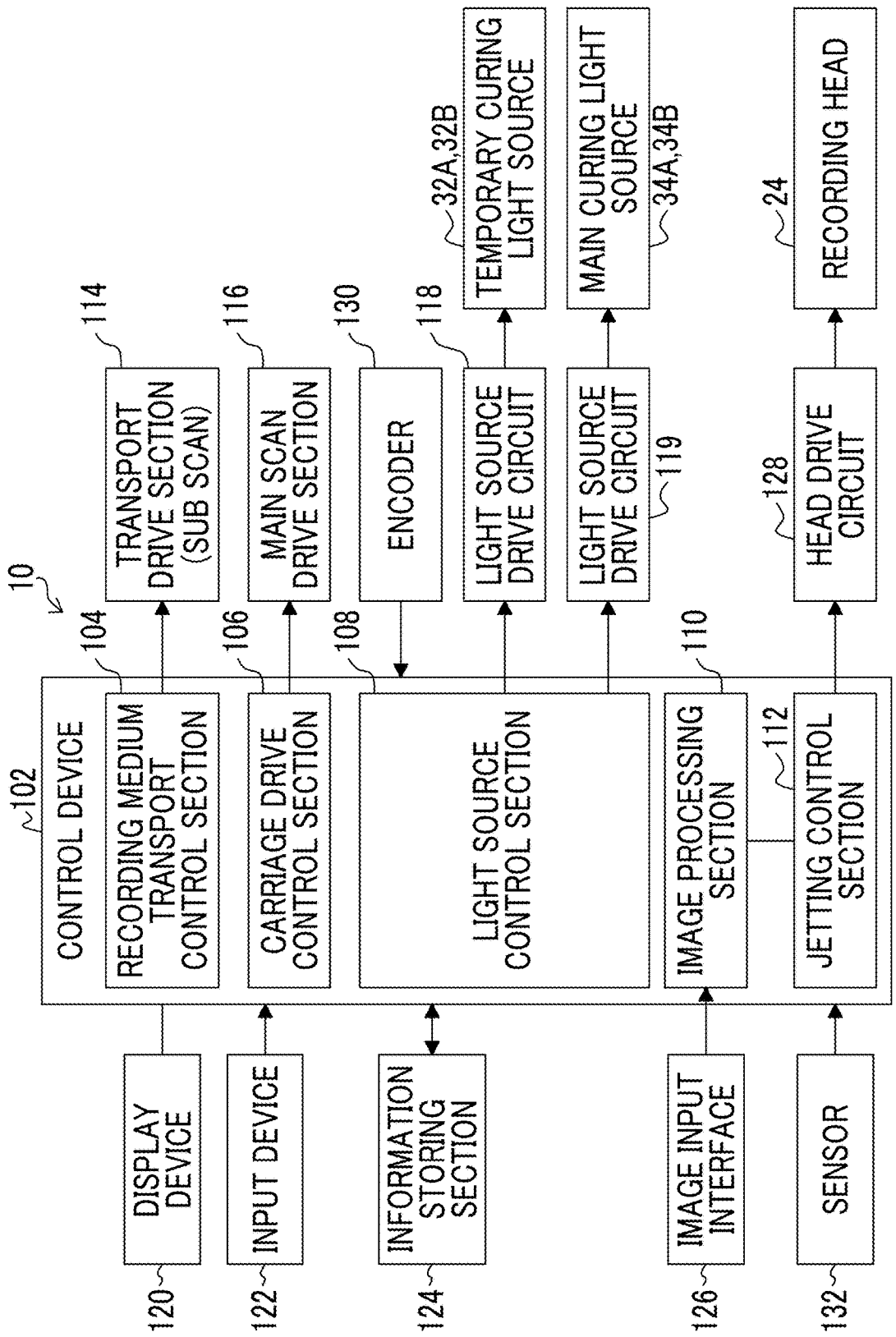
FIG. 5 is a block diagram showing a configuration of the ink jet recording apparatus.

FIG. 5 is a block diagram showing a configuration of the ink jet recording apparatus 10. As shown in FIG. 5, the ink jet recording apparatus 10 comprises a control device 102. A computer that comprises a central processing unit (CPU) may be used as the control device 102, for example. The control device 102 executes a variety of programs read from an information storing section 124 to generally control the entirety of the ink jet recording apparatus 10.

The control device 102 includes a recording medium transport control section 104, a carriage drive control section 106, a light source control section 108, an image processing section 110, and a jetting control section 112. The respective sections may be realized by hardware or software, or a combination thereof. The "software" is synonymous with a "program" or an "application".

The recording medium transport control section 104 controls the transport drive section 114 that transports the recording medium 12. The transport drive section 114 includes a drive motor that drives the nip rollers 40 (see FIG. 2), and a drive circuit thereof. The recording medium 12 transported on the platen 26 is intermittently fed in the sub scan direction in a swath width unit in accordance with a scan (a movement of a printing path) in the main scan direction performed by the recording head 24. Here, the "swath width" refers to a length in the sub scan direction determined at a repetitive scan cycle by reciprocation of the carriage 30, and is calculated by dividing a nozzle row length that is the length of the nozzle row in the sub scan direction by the number of paths that is the number of repetitive scans. The number of paths that is the number of repetitive scans is the number of scans necessary for completing drawing of a set recording resolution, and is determined by a drawing mode.

The carriage drive control section 106 controls the main scan drive section 116 that moves the carriage 30 in the main scan direction. The main scan drive section 116 includes a drive motor connected to a moving mechanism of the carriage 30, and a control circuit thereof.

An encoder 130 is provided in the drive motor of the main scan drive section 116 and the drive motor of the transport drive section 114. The encoder 130 inputs a pulse signal based on a rotation amount and a rotating speed of each drive motor to the control device 102. Thus, the control device 102 may recognize a position of the carriage 30 and a position of the recording medium 12 on the basis of the pulse signal input from the encoder 130.

The light source control section 108 controls emission of light of the temporary curing light sources 32A and 32B through a light source drive circuit 118, and controls emission of light of the main curing light sources 34A and 34B through a light source drive circuit 119.

The image processing section 110 performs image processing with respect to image data input through an image input interface 126, and converts the result into dot data for printing. In FIG. 5, for ease of notation, "IF" is simply used instead of "the interface. IF is an abbreviation of "interface".

The image processing section 110 functions as a halftone processing unit that performs halftone processing using a dither method. That is, the image processing section 110 performs quantification processing of pixel values using a dither mask with respect to a continuous-tone image that corresponds to input image data, and generates a halftone image corresponding to dot data for printing. The dot data refers to data indicating disposition of dots.

A method for generating the dither mask used in the halftone processing of the image processing section 110 will be described later.

The jetting control section 112 controls the head drive circuit 128 that drives the recording head 24 on the basis of dot data generated in the image processing section 110, to thereby control jetting of ink from each nozzle 62 of the recording head 24. The control device 102 is a form of a recording control section. A step of performing the halftone processing by the image processing section 110 corresponds to a form of a halftone processing step.

As the information storing section 124, for example, a non-volatile memory is used, and the information storing section 124 stores a variety of programs or a variety of data necessary for control of the control device 102. For example, the information storing section 124 stores a control program executed by the respective sections of the control device 102, a scan pattern program, and the like, as the programs. The scan pattern program is a multipath type image recording program, and defines a reciprocating scan (a movement of a printing path) of the recording head 24 in the main scan direction with respect to the recording medium 12 that is intermittently transported in the sub scan direction or the number of paths (the number of repetitive scans). The movement of the printing path that is accompanied by the movement of the recording head 24 in the main scan direction includes at least one of a movement direction of the recording head 24 in formation of dots, selection of a nozzle for jetting ink, or a jetting timing. A pattern of scans determined by a combination of the movement of the printing path and the number of paths is referred to as a "scan pattern".

To the control device 102, an input device 122 and a display device 120 are connected. The input device 122 may employ a variety of units such as a keyboard, a mouse, a touch panel, or an operating button, for example, and may employ an appropriate combination thereof. The input device 122 inputs an external operating signal that is manually operated by an operator who is a user to the control device 102.

A liquid crystal display or the like is used as the display device 120. An operator may input a variety of information using the input device 122. Further, the operator may confirm input content, and additionally, various types of information, a status of a system, and the like, through display on the display device 120.

A sensor 132 is provided in the carriage 30. The control device 102 may recognize the width of the recording medium 12 on the basis of a sensor signal input from the sensor 132.

Description of Multi-Path Type Image Recording Method

Figure 6:
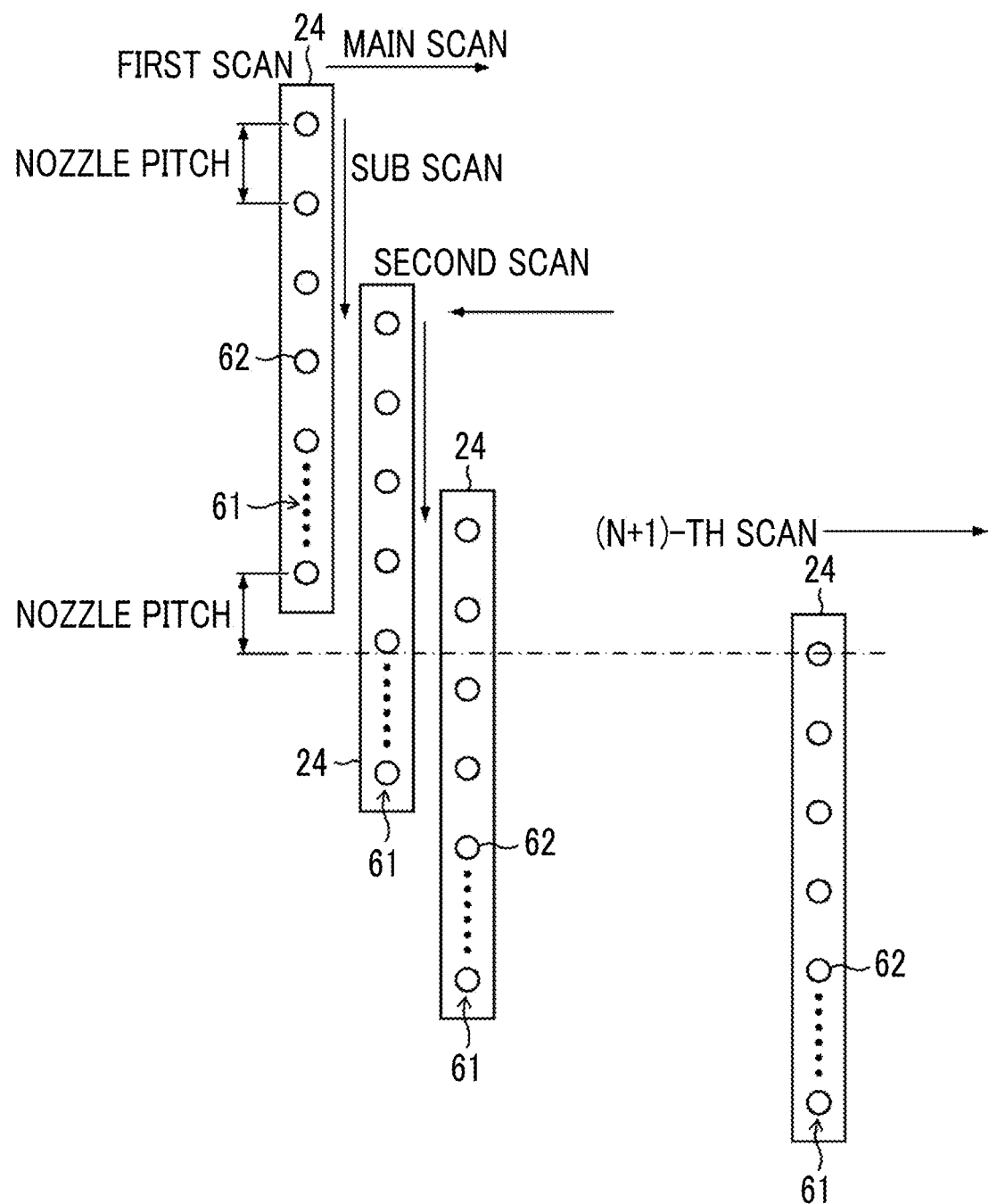
FIG. 6 is a diagram for illustrating an example of an image recording method of a multipath type.

FIG. 6 is a diagram for illustrating an example of an image recording method of a multipath type. Here, for ease of description, a case where a configuration of the recording head 24 is simplified, the number of nozzle rows of the recording head 24 is set to only one row, and recording is performed by the one-row nozzle row 61 will be described as an example. It may be understood that the nozzle row 61 represents any one row among the nozzle rows 61C, 61M, 61Y, and 61K described in FIG. 4.

Further, with respect to a configuration in which a recording medium is intermittently fed in the sub scan direction, for ease of illustration, in FIG. 6, a configuration in which the recording medium is at a stopped state and the recording head 24 is intermittently moved in the sub scan direction is shown. In FIG. 6, the recording medium is not shown, and only the movement of the recording head 24 is shown.

As shown in FIG. 6, in a case where the recording head 24 is moved in the main scan direction (lateral direction in FIG. 6), jetting of ink is performed from the nozzles 62. Further, two-dimensional image recording is performed on the recording medium by a combination of reciprocation of the recording head 24 along the main scan direction and the intermittent feeding of the recording medium in the sub scan direction (longitudinal direction in FIG. 6). The term "image recording" may be replaced with a term such as drawing, printing, or image formation.

A main scan operation for performing recording of dots by jetting of ink from the nozzles 62 while the recording head 24 is being moved in the main scan direction may include a scan performed at a forward path and a scan performed at a backward path in the main scan direction. An image may be recorded by a bidirectional scan at the forward path and the backward path, or may be recorded by a certain one-directional scan at the forward path or the backward path. In a case where the bidirectional scan at the forward path and the backward path is performed, one reciprocating scan is counted as execution of two scans of the forward path scan and the backward path scan.

In a case where an image of a desired recording resolution is completed by N scans where N is a natural number, a relative positional relationship (here, a positional relationship in the sub scan direction) between the recording medium and the recording head 24 in an (N+1)-th scan becomes a relationship as shown in FIG. 6. That is, in order to perform image recording of the predetermined recording resolution by N writings, the recording medium is intermittently fed in the sub scan direction in the first writing, the second writing, the third writing, and so on, and a positional relationship in which connection is performed at a position corresponding to the length of the nozzle row is obtained just in the (N+1)-th scan is obtained. In order to connect N writing operations in a seamless manner, the recording medium is moved in the sub scan direction by an amount of "nozzle row length+1 nozzle pitch" from the sub scan directional position of the first scan, and the (N+1)-th scan is performed. Here, the "nozzle row length" represents the length of the nozzle row 61 in the sub scan direction in which the nozzles 62 are arranged in a row in the sub scan direction, and corresponds to a distance between nozzles located at opposite ends of the nozzle row. The "nozzle pitch" represents a nozzle interval in the nozzle row in the sub scan direction.

Jetting Rate

Here, the "jetting rate" will be described. A nozzle jetting rate includes an absolute jetting rate and a relative jetting rate. The nozzle absolute jetting rate is a value indicating a ratio of recording pixels of which dots are recorded by ink jetting of each nozzle, among recording allocated pixels that are allocated to each nozzle, which are pixels of which recording is allocated to each of a plurality of nozzles in the recording head.

The nozzle absolute jetting rate is determined for each nozzle. The nozzle absolute jetting rate is expressed as a quotient of division in a case where the number of recording allocated pixels that are allocated to each nozzle is a denominator and the number of recording pixels of which dots are recorded by ink jetting of each nozzle is a numerator, which may be expressed as a numerical value that is equal to or greater than 0 and is equal to or smaller than 1. Further, the nozzle absolute jetting rate may also be expressed as a percentage. The nozzle absolute jetting rate increases as a recording duty increases, and becomes "1.0" or "100%" that is a maximum value at a recording duty of 100%.

Here, the "recording duty" refers to a ratio of pixels that are in a dot-on state among respective pixels of an image to be recorded on a recording medium. The recording duty may be referred to as a term such as a printing duty, an ink duty, a printing rate, or a recording rate, or may be simply referred to as a duty. In this specification, hereinafter, the recording duty is expressed as the "duty".

In short, the nozzle absolute jetting rate represents an ink jetting rate of each nozzle. The ink jetting rate of each nozzle is equal to a recording pixel rate of each nozzle. The nozzle absolute jetting rate may be understood as a rate of usage of a nozzle, which may be considered as a nozzle usage rate, or a nozzle operating rate.

Specifically, the nozzle absolute jetting rate represents a usage rate of each nozzle in a case where a usage rate of each nozzle in performing recording of a solid pattern that corresponds to a uniform gradation image of a maximum concentration is set to "1.0" or "100%" that is a reference value. The usage rate of each nozzle may be replaced with an ink jetting amount of each nozzle, or may be replaced with the number of recording pixels for each nozzle.

On the other hand, a relative usage rate of each nozzle is referred to as a nozzle jetting rate. The nozzle jetting rate becomes a control target of the nozzle absolute jetting rate. The nozzle jetting rate is a relative jetting rate indicating a relative ratio of each nozzle with respect to the nozzle absolute jetting rate. The nozzle jetting rate means a relative ratio between nozzles, of the nozzle absolute jetting rates of the respective nozzles, and an absolute value or a maximum value of a numerical value of the nozzle jetting rate does not mean a particular physical quantity. The absolute value of the nozzle jetting rate of each nozzle may be set by standardizing a sum of nozzle jetting rates of all nozzles to 1, or may be set by standardizing a maximum value to 1 or "100%". In this embodiment, for ease of description, the nozzle absolute jetting rate of a maximum jetting (maximum usage rate) is set to "1.0", and the nozzle jetting rate is expressed as a ratio with respect to the maximum value. In this embodiment, a value of the nozzle jetting rate is expressed as a numerical value in a range of "0 to 1". Hereinafter, in a case where the "jetting rate" is simply used, the jetting rate indicates the nozzle jetting rate that represents the relative usage rate of each nozzle.

In generating the dither mask used in this embodiment, a nozzle jetting rate of each nozzle that is a control target is determined, and a threshold of each pixel of the dither mask is set so that an absolute nozzle jetting rate is increased in accordance with an increase of a duty in a state where the nozzle jetting rate (relative rate) is generally retained.

FIG. 7 is a diagram showing an example of data of a nozzle jetting rate determined for each nozzle. A lateral axis in FIG. 7 represents a nozzle number, and a longitudinal axis represents a nozzle jetting rate associated with a nozzle of each nozzle number. FIG. 7 shows a relative rate of each nozzle in a state where a jetting rate of a maximum jetting nozzle is set to "1.0".

A trapezoidal graph G1 indicated by a solid line in FIG. 7 is an example of nozzle jetting rates in which nozzle jetting rates of nozzle groups (for example, a nozzle group of nozzle numbers 0 to 12, and a nozzle group of nozzle numbers 37 to 49) that belong to an end part of a nozzle row are set to values lower than jetting rates of a nozzle group (a nozzle group of nozzle numbers 13 to 36) that belongs to a central part of the nozzle row in order to suppress banding.

A straight line graph Gu indicated by a dotted line in the figure represents a uniform jetting rate at the same duty as in the graph G1. In the example of FIG. 7, it is assumed that the duty is 72%. The graph Gu is shown for comparison with the graph G1.

As illustrated in the graph Gu, a case where a nozzle jetting rate of each nozzle in the nozzle row is constant will be referred to as a "uniform nozzle jetting rate". On the other hand, as illustrated in the graph G1, a case where the jetting rate of each nozzle in the nozzle row is not constant, particularly, a case where the nozzle jetting rates of the nozzle groups at both end parts of the nozzle row are suppressed to be lower than the nozzle jetting rates of the nozzle group at the center and the nozzle jetting rates in the nozzle row are not uniform is referred to as a "non-uniform nozzle jetting rate".

Nozzles located at both end parts of the nozzle row are referred to as end part nozzles, and particularly, a nozzle located at the end of the nozzle row is referred to as an end nozzle. A nozzle located at the central part of the nozzle row is referred to as a central nozzle.

Description of Problems

Here, the problems to be solved will be described with reference to specific examples. Here, for ease of description, a case where a recording resolution of an ink jet recording apparatus is 600 dpi in a main scan direction and is 600 dpi in a sub scan direction, a nozzle arrangement density in the sub scan direction in the recording head is 300 npi, the number of nozzles is 50, a paper feed amount of an intermittent paper feeding operation is 25 pixel/600 dpi, and the number of paths in the main scan direction is "2 paths" will be described as an example.

Here, dpi (dots per inch) is a unit indicating the number of dots per 1 inch. Further, npi (nozzles per inch) is a unit indicating the number of nozzles per 1 inch. 1 inch corresponds to about 25.4 millimeters.

The paper feed amount refers to the amount of transportation of a sheet in a sub scan direction in one main scan. In a case where a relative movement of a recording head with respect to a sheet in the sub scan direction is present, it may be understood that the paper feed amount is the amount of relative movement of the recording head with respect the sheet in the sub scan direction in one main scan. The paper feed amount is expressed as the number of rasters in the sub scan direction. The number of rasters may be expressed as the number of pixels. The paper feed amount corresponds to a sub scan movement amount per sub scan operation.

Expression of "pixel/600 dpi" indicating a paper feed amount unit represents the size of one pixel in a recording resolution of 600 dpi, and 1 pixel/600 dpi corresponds to about 42.3 micrometers [μm].

The number of paths in the main scan direction refers to the number of times of main scan necessary for entirely filling one raster to be formed in the main scan direction with dots. The number of paths in the main scan direction is synonymous with "the number of overlaps". A case where the number of overlaps is "2" means that one raster in the main scan direction is completed by two main scans.

Figure 8:
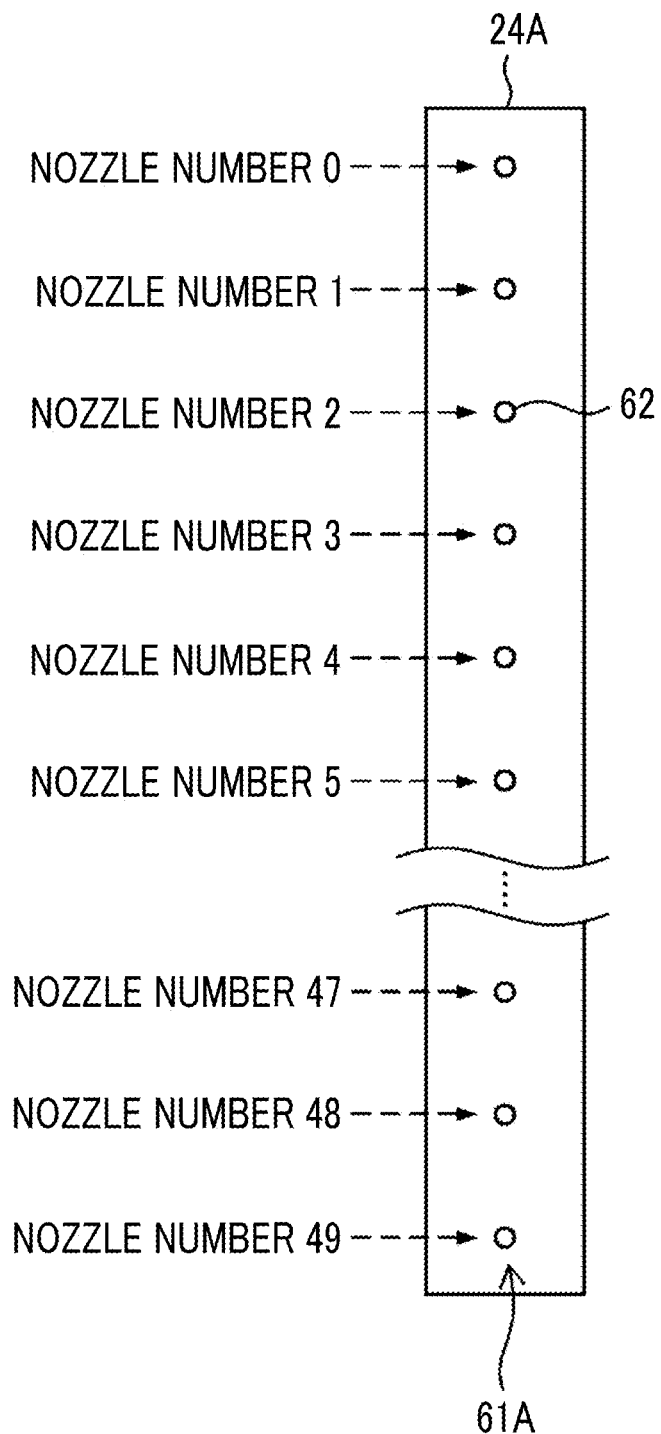
FIG. 8 is a diagram schematically showing an example of a recording head having a nozzle row in which the number of nozzles is 50.

FIG. 8 is a diagram schematically showing an example of a recording head having a nozzle row in which the number of nozzles is 50. As shown in FIG. 8, the recording head 24A has a nozzle row 61A in which 50 nozzles 62 are arranged in a row at equal intervals in the sub scan direction. The recording head 24A corresponds to a representative one of the head modules 24C, 24M, 24Y, and 24K described in FIG. 4.

Unique nozzle numbers 0, 1, 2, . . . , and 49 are sequentially assigned to the respective nozzles 62, from the nozzle 62 at an upper end in FIG. 8 that is one end of the nozzle row 61A toward a lower end of FIG. 8 that is the other end thereof. A nozzle arrangement density of the nozzle row 61A may be variously designed, but for example, the nozzle arrangement density is set to 300 npi in the sub scan direction.

The nozzle arrangement density 300 npi of the recording head 24A corresponds to 300 dpi in terms of a dot recording density, that is, a recording resolution. Here, "npi" may be rephrased as "dpi".

In this example, since a recording resolution assumed at the time of printing is 600 dpi in the main scan direction, and 600 dpi in the sub scan direction, a nozzle pitch of the nozzle row 61A of 300 npi corresponds to two pixels in the unit of the size of a pixel of 600 dpi.

Figure 9:
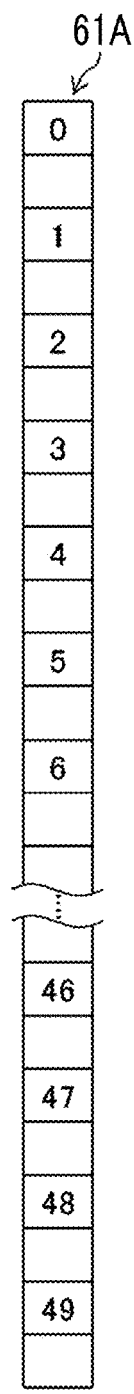
FIG. 9 is a diagram illustrating a state where the nozzle row of the recording head shown in FIG. 8 is symbolized.

FIG. 9 is a diagram illustrating that the nozzle row of the recording head shown in FIG. 8 is symbolized. In order to easily understand a relationship between the position of each nozzle 62 that forms the nozzle row 61A and a pixel, a writing method as shown in FIG. 9 is introduced with respect to writing of the nozzle row.

FIG. 9 shows that the nozzle row 61A is divided into cells in units of pixels, and numbers 0 to 49 indicating nozzle numbers are written in the cells. The position of a cell to which the nozzle number is assigned represents the position of the nozzle. That is, the writing of the nozzle row 61A shown in FIG. 9 is an alternative to the writing of the recording head 24A shown in FIG. 8.

Figure 10:
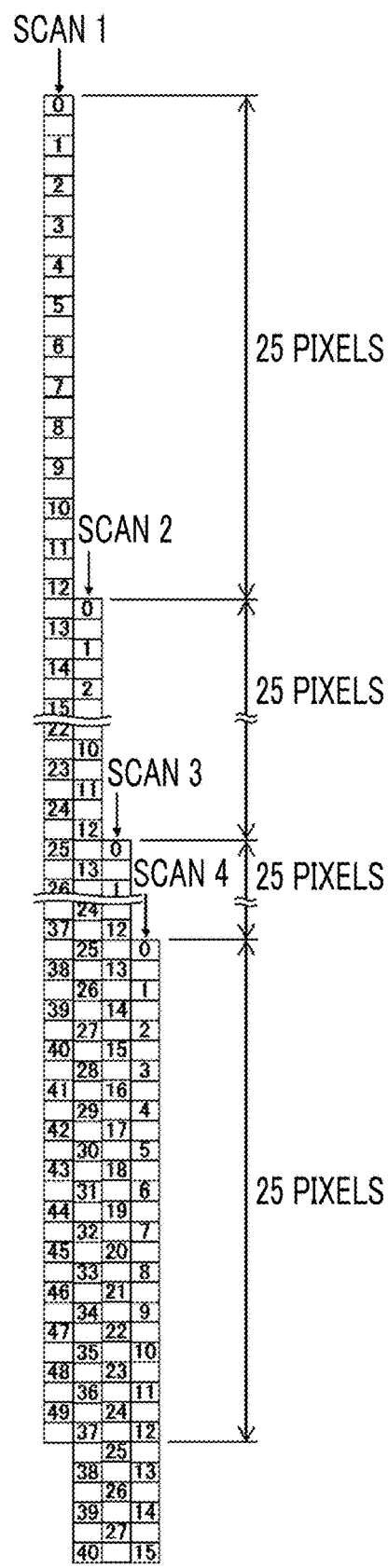
FIG. 10 is a diagram illustrating an intermittent feeding state where 25 pixels are relatively moved in a sub scan direction whenever a printing path in a main scan direction is performed once.

FIG. 10 shows an intermittent feeding state where 25 pixels are relatively moved in the sub scan direction whenever a printing path in the main scan direction is performed once. In FIG. 10, for ease of illustration, the recording head 24A is drawn as being moved in the sub scan direction with respect to a stopped recording medium. In the drawing method shown in FIG. 10, recording of 600 dpi is completed in two paths for a main scan line, which is a dropping point line in the main scan direction, and recording of 600 dpi is completed in two paths for a sub scan line, which is a dropping point line in the sub scan direction.

The main scan line is synonymous with "raster". The "raster" means a scan line in the main scanning direction, and indicates a row of pixels arranged in the main scan direction. The paper feed amount in the sub scan direction for each path is 25 pixels, that is, 25 rasters. In the case of this example, recording of 600×600 dpi is performed using recording by 4 scans as a repeating unit.

A left diagram of FIG. 11 is a diagram illustrating a relationship between scans for recording each raster and nozzles. The left diagram of FIG. 11 shows a range of 25 rasters. A right diagram of FIG. 11 is an example of a nozzle pattern. The nozzle pattern is an array pattern of nozzle numbers indicating a correspondence relationship between the position of each pixel in a certain image region and a nozzle number of a nozzle that records each pixel. The nozzle pattern may be a chart corresponding to a relationship diagram that specifies the relationship between pixels and nozzle numbers. That is, the nozzle pattern is information indicating "which nozzle each pixel is recorded by?".

The nozzle pattern in this example has a periodicity in which a repetitive minimum unit of "2×100 pixels" of 2 pixels in the main scan direction×100 pixels in the sub scan direction (=25 pixels×4) is repeated in the main scan direction and the sub scan direction. The periodicity of the nozzle pattern relates to repetition of a "filling order" that is an order in which a unit region of a predetermined pixel range is filled with dots. In the main scan direction, the repetition occurs in the unit of the number of overlaps, and in the sub scan direction, the repetition occurs in the unit of a product of a paper feed amount and the number of filling order repetition units. The number of filling order repetition units is expressed as a product of a nozzle pitch and the number of overlaps.

The size of the unit region matches the number of overlaps in the main scan direction, and matches the nozzle pitch in the sub scan direction. In this example in which the number of overlaps is "2" and the nozzle pitch is "2", the unit region corresponds to a pixel range of 2×2. The area of the unit region is referred to as a "unit area". The unit area represents the area of the unit region formed by the number of overlaps in the main scan direction and the number of pixels corresponding to the nozzle pitch in the sub scan direction. That is, the unit area is the area of the unit region formed by a pixel range of "the number of overlaps×nozzle pitch". In the case of this example, the unit area is filled by four scans (=2×2).

The nozzle pattern shown on the right side of FIG. 11 shows a range of 10×10 pixels at a position corresponding to a range of 10 rasters from the top of 25 rasters shown on the left side of FIG. 11. For example, a pixel in which the nozzle number 25 is written in the right diagram of FIG. 11 is a pixel for which the nozzle with the nozzle number 25 is in charge of recording, which indicates are cording charge pixel of the nozzle with the nozzle number 25. That is, the nozzle pattern indicates a recording charge pixel for each nozzle number.

FIG. 12 is an example of a jetting rate pattern. The jetting rate pattern refers to an array pattern of nozzle jetting rates indicating a correspondence relationship in which a nozzle jetting rate of a nozzle that records each pixel is specified for each pixel. The jetting rate pattern may be a chart corresponding to a relationship diagram in which a relationship between the pixels and the nozzle jetting rates is specified. The jetting rate pattern shown in FIG. 12 is obtained by specifying nozzle jetting rates corresponding to the respective nozzle numbers of the nozzle pattern shown on the right side of FIG. 11 from the graph G1 in FIG. 7.

As described above, in the case of this example, the nozzle pattern and the jetting rate pattern are repeated at a cycle of 100 pixels in the sub scan direction and at a cycle of 2 pixels in the main scan direction.

Description of Phenomenon in which Color Unevenness Occurs

For example, in the case of an ink jet recording apparatus capable of recording a color image using ink of four colors of cyan, magenta, yellow, and black, a nozzle row is provided for each of the plurality of colors of ink (see FIG. 4).

Here, consideration is given to an overlap of two color dots of color A and color B, which are different colors from each other. It is assumed that both a recording operation of color A dot and a recording operation of color B dot satisfy the nozzle pattern shown in FIG. 11 and the jetting rate pattern shown in FIG. 12.

As an example in a case where a nozzle pattern of color A and a nozzle pattern of color B are different from each other, there may be a case where a nozzle row of color A and a nozzle row of color B are relatively offset in the sub scan direction, or a case where a recording order of color A in the main scan direction and a recording order of color B in the main scan direction are different from each other.

However, in any case, due to the non-uniform nozzle jetting rates as shown in the graph G1 in FIG. 7, disposition of the dots of color A and disposition of the dots of color B are biased, which results in color unevenness. Accordingly, here, a phenomenon in which color unevenness occurs will be described by focusing on only a case where both the nozzle pattern of color A and the nozzle pattern of color B have a common configuration shown in FIG. 11 and both the jetting rate pattern of color A and the jetting rate pattern of color B have a common configuration shown in FIG. 12.

A specific color combination of color A and color B is not particularly limited. As an example of the color combination, a combination in which color A is cyan and color B is magenta may be employed.

The jetting rate pattern shown in FIG. 12 is a pattern of a probability of dot ON in each pixel, which indicates that the probability of dot ON is unevenly biased. The probability that a dot of color A and a dot of color B overlap each other is represented by the square of the dot ON probability, that is, the square of the nozzle jetting rate. The probability that dots of two colors overlap each other is referred to as an "overlap probability". An array pattern of the overlap probabilities indicating a correspondence relationship in which the overlap probabilities of respective pixels are specified for each pixel is referred to as an "overlap probability pattern". The overlap probability pattern may be a chart corresponding to a correspondence diagram showing specification of a relationship between a pixel and its overlap probability.

FIG. 13 shows an example of the overlap probability pattern. The overlap probability pattern shown in FIG. 13 is obtained by squaring the nozzle jetting rate of each pixel in the jetting rate pattern shown in FIG. 12. As shown in FIG. 12, it can be understood that the nozzle jetting rate of color A and the nozzle jetting rate of color B are both unevenly biased, and thus, the probability that the dot of color A and the dot of color B overlap each other is also unevenly biased (See FIG. 13). In FIG. 13, pixels with overlap probabilities of "0.00" to "1.00" are unevenly distributed in an image region.

For comparison, FIG. 14 shows an example of a jetting rate pattern in the case of a uniform nozzle jetting rate, and FIG. 15 shows an example of an overlap probability pattern in the case of a uniform nozzle jetting rate. FIG. 14 shows a jetting rate pattern in the case of the uniform nozzle jetting rate shown in the graph Gu displayed by the dotted line in FIG. 7.

FIG. 15 shows an overlap probability pattern in the case of the uniform nozzle jetting rate exemplified in the graph Gu displayed by the dotted line in FIG. 7. It can be understood that the overlap probability pattern in the case of the uniform jetting rate pattern shown in FIG. 14 is a uniform pattern having an overlap probability of "0.52" for all pixels, as shown in FIG. 15.

On the other hand, an average value of the overlap probabilities for the non-uniform overlap probability pattern shown in FIG. 13 is "0.63". That is, the non-uniform nozzle jetting rate has more overlaps between the dots of color A and the dots of color B than in the case of the uniform nozzle jetting rate. This is because in the case of the non-uniform nozzle jetting rate, there are a lot of dot overlaps in pixels with high nozzle jetting rates. As the nozzle jetting rate increases, the dot overlap increases at the square of the nozzle jetting rate, and thus, the average overlap probability also increases.

In FIG. 12, in a pixel with a nozzle jetting rate of "1.00", the dot of color A and the dot of color B always overlap each other. In the case of the non-uniform nozzle jetting rate, the overlap between the dots of color A and the dots of color B increases. This means that the overlap is likely to decrease in a case where disposition of the dots of color A and disposition of the dots of color B slightly shift at the same time. It should be noted that "the overlap is likely to decrease" does not mean that the overlap necessarily decreases.

FIG. 16 shows an overlap probability pattern in a case where the disposition of the dots of color B is shifted by one pixel in the main scan direction with respect to the disposition of the dots of color A. Further, FIG. 17 shows an overlap probability pattern in a case where the disposition of the dots of color B is shifted by one pixel in the sub scan direction with respect to the disposition of the dots of color A. The overlap probability in a case where the disposition of the dots of color B is relatively shifted by one pixel with respect to the disposition of the dots of color A is obtained by multiplication of nozzle jetting rates of pixels corresponding to a position relationship indicating one pixel shifting in the jetting rate pattern.

As is clear from comparison between FIG. 13 and FIG. 16 or comparison between FIG. 13 and FIG. 17, it can be understood that the overlap probability of each pixel in a case where the disposition of the dots of color B is relatively shifted by one pixel with respect to the disposition of the dots of color A greatly changes from a case where the disposition of the dots of color B is not shifted and an average value of the overlap probabilities (average overlap probability) becomes smaller than an overlap probability of "0.52" (FIG. 15) in the case of the uniform nozzle jetting rate.

As shown in FIG. 16, in a case where one pixel shift is performed in the main scan direction, an average value of overlap probabilities becomes "0.42". As shown in FIG. 17, in a case where one pixel shift is performed in the sub scan direction, an average value of overlap probabilities becomes "0.44". On the other hand, in the case of the uniform nozzle jetting rate indicated by the dotted line in FIG. 7, as is clear from FIG. 14, the overlap probability is "0.52" for all pixels, regardless of the presence or absence of the pixel shift in the main scan direction and/or the presence or absence of the pixel shift in the sub scan direction.

In the case of the non-uniform nozzle jetting rate, in a case where the shift amount of the dispositions of the dots of color A and the dots of color B is a shift corresponding to the number of pixels that matches the multiple of the number of paths (in this example, 2) in the main scan direction, and/or in a case where the shift amount of the dispositions of the dots of color A and the dots of color B is a shift corresponding to the number of pixels that matches the multiple of the nozzle pitch (in this example, 2) in the sub scan direction, since the jetting rate patterns of two colors match or are similar to each other, the overlap probability periodically increases or decreases as the shift amount changes.

Further, in the case of the non-uniform nozzle jetting rate, the overlap probability periodically changes in the sub scan direction. However, in the case of the non-uniform nozzle jetting rate shown in the graph G1 of FIG. 7, even though the numerical value of the nozzle jetting rate of each pixel is not uniform in the jetting rate pattern of FIG. 12, an average jetting rate per unit area becomes uniform. Here, the unit area means the area of a unit region formed by the number of paths (number of overlaps) in the main scan direction and the number of pixels corresponding to the nozzle pitch in the sub scan direction. In this example, 2×2 pixels become the unit area.

In a case where the average jetting rate per unit area is not uniform, unevenness naturally occurs. Accordingly, the jetting rate of each nozzle is set so that the average jetting rate per unit area becomes uniform.

However, even though the average jetting rate per unit area is uniform, an average overlap probability per unit area is not uniform. That is, even though the average value of the jetting rates per unit area is uniform, the average value of the squares of the jetting rates per unit area is not uniform. Similarly, an average value per unit area of the multiplication values of the nozzle jetting rates of pixels according to the relative pixel shift in the main scanning direction and/or the sub scan direction is not uniform.

FIG. 18 shows an average overlap probability per unit area at each position in the sub scan direction in the case of a non-uniform nozzle jetting rate. A lateral axis in FIG. 18 represents a pixel position in the sub scan direction, and indicates a range of 100 pixels that is a repetitive unit in the sub scan direction. A longitudinal axis in FIG. 18 represents an overlap probability.

A graph indicated by a solid line in FIG. 18 shows an average overlap probability per unit area in a case where there is no shift in the dispositions of the dots of color A and color B (FIG. 13). A graph indicated by a dotted line in FIG. 18 shows an average overlap probability per unit area in a case where the disposition of the dots of color A and the disposition of the dots of color B are relatively shifted by one pixel in the main scan direction (FIG. 16). A graph indicated by a dotted chain line in FIG. 18 shows an average overlap probability per unit area in a case where the disposition of the dots of color A and the disposition of the dots of color B are relatively shifted by one pixel in the sub scan direction (FIG. 17).

As can be clearly understood from FIG. 18, the average overlap probability per unit area periodically changes in the sub scan direction. The cycle of the change in the overlap probability and the way of the change vary depending on a scanning method in performing drawing, that is, the nozzle pattern and the nozzle jetting rate of each nozzle.

In the case of the uniform nozzle jetting rate, the overlap probability is "0.52" at all positions, regardless of the shift of the dot disposition in the main scan direction and/or the shift of the dot disposition in the sub scan direction.

In FIG. 13 and FIGS. 16 to 17, an example in which the overlap probability of the dots of color A and color B in the case of the non-uniform nozzle jetting rate, and the average overlap probability per unit area is different from that in the case of the uniform nozzle jetting rate (FIG. 15) has been described. Further, in FIG. 13 and FIGS. 16 to 17, an example in which the overlap probability greatly changes due to a slight shift of the dot dispositions of the colors A and B and the overlap probability periodically changes in the sub scan direction has been described (see FIG. 18).

Hereinbefore, the overlap probability that the dots of color A and color B overlap each other has been described, but according to the same principle, it can be understood that a probability that only color A is in a dot ON state, a probability that only color B is in a dot ON state, or a probability that both color A and color B are in a dot OFF state is similarly different from that in the case of the uniform nozzle jetting rate. The dot ON probability corresponds to a nozzle jetting rate, and the dot ON probability pattern means a jetting rate pattern. On the other hand, since the dot OFF probability is a value obtained by subtracting the dot ON probability from 1, the dot OFF probability pattern becomes a pattern obtained by subtracting the nozzle jetting rate from 1.

Further, the pattern of the probability that only color A is in the dot ON state is a pattern obtained by multiplying the value of each pixel of the dot ON probability pattern by the value of each corresponding pixel of the dot OFF probability pattern. Here, a case where the dot dispositions of color A and color B are shifted, the pixel of the dot OFF probability pattern to be multiplied may be relatively shifted with respect to each pixel of the dot ON probability pattern.

Further, the pattern of the probability that both color A and color B are in the dot OFF state is a pattern obtained by squaring the value of each pixel of the dot OFF probability pattern. In a case where the dot dispositions of color A and color B are shifted, values of the shifted pixels may be multiplied in the dot OFF probability pattern. In this way, by obtaining probability patterns and/or graphs corresponding to FIG. 13 and FIGS. 16 to 18 with respect to the probability that only color A is in the dot ON state, the probability that only color B is in the dot ON state, or the probability that both color A and color B are in the dot OFF state in the case of the non-uniform nozzle jetting rate, it can be understood that the case of the non-uniform nozzle jetting rate and the case of the uniform nozzle jetting rate are different from each other.

Comparison Based on Specific Examples of Dot Disposition

FIG. 19 is a diagram showing a specific example of dispositions of dots of color A and color B in the case of the non-uniform nozzle jetting rate shown in the graph G1 indicated by the solid line of FIG. 7. A pattern shown in a leftmost part of FIG. 19 is an example of a dot disposition of color A. A second pattern from the left of FIG. 19 is an example of a dot disposition of color B. A third pattern from the left of FIG. 19 shows a dot OFF disposition in a case where the dot disposition of color A and the dot disposition of color B overlap each other.

The second pattern from the right of FIG. 19 shows a dot OFF disposition in a case where the dot disposition of color A and the dot disposition of color B are relatively shifted by one pixel in the main scan direction to overlap each other. The pattern shown in a rightmost part of FIG. 19 shows a dot OFF disposition in a case where the dot disposition of color A and the dot disposition of color B are relatively shifted by one pixel in the sub scan direction to overlap each other.

Each pattern shown in FIG. 19 corresponds to a disposition chart of dots in the range of 20×20 pixels, in which a black cell represents a dot ON pixel, and a white cell represents a dot OFF pixel.

FIG. 20 is a diagram showing a specific example of dispositions of dots of color A and color B in the case of the uniform nozzle jetting rate shown in the graph Gu indicated by the dotted line in FIG. 7. Similar to FIG. 19, each pattern shown in FIG. 20 corresponds to a disposition chart of dots in the range of 20×20 pixels, in which a black cell represents a dot ON pixel, and a white cell represents a dot OFF pixel.

The pattern shown in a leftmost part of FIG. 20 is an example of a dot disposition of color A. A second pattern from the left of FIG. 20 is an example of a dot disposition of color B. A third pattern from the left of FIG. 20 shows a dot OFF disposition in a case where the dot disposition of color A and the dot disposition of color B overlap each other.

The second pattern from the right of FIG. 20 shows a dot OFF disposition in a case where the dot disposition of color A and the dot disposition of color B are relatively shifted by one pixel in the main scan direction to overlap each other. The pattern shown in the rightmost part of FIG. 20 shows a dot OFF disposition in a case where the dot disposition of color A and the dot disposition of color B are relatively shifted by one pixel in the sub scan direction to overlap each other.

As shown in FIG. 20, in the case of the uniform nozzle jetting rate, the number of dot OFF pixels nearly does not change, regardless of the presence or absence of the relative shift of the dot dispositions between colors of color A and color B. On the other hand, as shown in FIG. 19, in the case of the non-uniform nozzle jetting rate, the number of dot OFF pixels in a case where there is no relative shift between colors is larger than that in the case of the uniform nozzle jetting rate. Further, in a case where the relative positional relationship between the colors slightly shifts, the number of dot OFF pixels greatly decreases and the number of dot OFF pixels becomes smaller than that in the case of the uniform nozzle jetting rate.

At the same time, this shows that in the case of the non-uniform nozzle jetting rate, the number of pixels where the dots of color A and color B overlap each other in a case where there is no relative position shift between colors is larger than that in the case of the uniform nozzle jetting rate, and in a case where the relative positional relationship between the colors is slightly shifted, the number of pixels where the dots of color A and color B overlap each other is greatly reduced and the number of pixels where the dots overlap each other becomes smaller than that in the case of the uniform nozzle jetting rate.

According to the above-description, it can be shown that in a case where the nozzle jetting rate of each nozzle is unevenly biased, the probability that each pixel is in the dot ON state or the probability that each pixel is in the dot OFF state is unevenly biased, and as a result, the probability that the dispositions of two colors of color A and color B overlap each other changes compared with the case of the uniform nozzle jetting rate, and the probability of the overlap greatly changes and the probability of the overlap periodically changes in the sub scan direction, due to a slight relative shift in the dispositions of color A and color B.

Further, as well as "the probability of the overlap" (overlap probability) that is the probability that two colors A and B are in the dot ON state, it can be shown that any one of the probability that only one of two colors is in the dot ON state and the probability that both the two colors are in the dot OFF state also changes compared with the case of the uniform nozzle jetting rate, and the probability greatly changes and the probability periodically changes in the sub scan direction, due to a slight relative shift in the dispositions of color A and color B.

As a result, in a case where at least one of two colors of color A or color B is a chromatic color, color unevenness occurs. That is, as the probability that the dispositions of the dots of the color A and the color B overlap each other changes in the sub scan direction, unevenness in which the colors change in the sub scan direction occurs. Further, in a case where there is shift in the dot dispositions of two colors in the main scanning direction and/or the sub scan direction and the shift amount changes in the main scanning direction and/or the sub scan direction, the probability that the dot dispositions of the two colors overlap each other changes in accordance with the change in the shift amount, and as a result, unevenness of color change occurs.

This is not limited to the probability that two color dots overlap each other, and with respect to any one of the probability that only one of the two colors is in the dot ON state and the probability that both the colors are in the dot OFF state, similarly, as each probability changes in the sub scan direction, unevenness in which the colors change in the sub scan direction occurs. Further, in a case where there is a shift in the dot dispositions of two colors in the main scanning direction and/or the sub scan direction and the shift amount changes in the main scanning direction and/or the sub scan direction, the probability that only one of the dot dispositions of two colors is in the dot ON state and the probability that both the colors are in the dot OFF state respectively change in accordance with the change in the shift amount, and as a result, unevenness of color change occurs. In this way, in a case where at least one of two colors is a chromatic color, color unevenness may occur.

Combinations of 3 Colors or More

In the above description, an example in which in a case where the nozzle jetting rate is not uniform, the probability that the dot dispositions of two colors overlap each other in the sub scan direction changes to cause color unevenness, and in a case where the nozzle jetting rate is not uniform, the overlapping probability changes due to a shift in the dot dispositions of the two colors to cause color unevenness has been described.

Similarly, an example in which in a case where the nozzle jetting rate is not uniform, the overlap probability of dispositions of three or more colors changes in the sub scan direction, and the overlap probability changes due to a relative shift of the dot dispositions of three or more colors may be described.

First, with respect to dot dispositions of three or more colors, a pattern of an overlap probability in a desired combination of dot ON and dot OFF may be calculated from a pattern obtained by multiplying a value of each pixel of a nozzle jetting rate pattern by a value of each pixel of a pattern obtained by subtracting a nozzle jetting rate from 1 three or more times in the desired combination (by the same number of times as the number of colors).

For example, in the case of three colors of color A, color B, and color C, a pattern of a probability that color A and color B are in the dot ON state and color C is in the dot OFF state may be calculated by multiplying a value of each pixel of a nozzle jetting rate pattern corresponding to dot ON of color A by a value of each pixel of a nozzle jetting rate pattern corresponding to dot ON of color B, and multiplying the result by a "value of each pixel of a pattern obtained by subtracting a nozzle jetting rate from 1", corresponding to dot OFF of color C.

In this case, in a case where the dot dispositions of three colors are shifted, values of shifted pixels may be multiplied. For example, in a case where the dot dispositions of color A and color B are shifted by one pixel in the main scan direction, in multiplying values of respective pixels of the jetting rate pattern corresponding to the dot ON of color A and the jetting rate pattern corresponding to the dot ON of color B, values of the pixels that are shifted by one pixel in the main scan direction may be multiplied. From the pattern of the overlap probability of dot ON or dot OFF of dot dispositions of three or more colors obtained in this way, it is possible to check a change in the overlap probability of the dot dispositions or three or more colors in the sub scan direction or a change in the overlap probability due to shift of the dot dispositions of three or more colors, and as a result, it can be understood that the overlap probability changes in a similar way to the case of two colors.

In the case of a plurality of colors of three or more colors, since the overlap probability of dot dispositions of any two colors of the plurality of colors changes and the overlap probability of dot dispositions of three or more colors also changes, similar to the case of two colors, color unevenness occurs. In a case where one color among the three or more colors includes a chromatic color, color unevenness may occur.

Outline of Embodiments

According to embodiments of the present disclosure, there is provided a technique for reducing banding and color unevenness in a method for reflecting nozzle jetting rates of respective nozzles in a dither mask to be applied in halftone processing to control recording. For example, with respect to ink of a relatively dark color among multiple color inks used for image recording, for example, with respect to black in a case where ink of four colors of C, M, Y, and K is used, it is necessary to suppress a nozzle jetting rate of an end part nozzle in order to suppress banding.

However, with respect to a relatively light color among multiple color inks, even though the nozzle jetting rate of the end part nozzle is not suppressed as much as the dark color, banding is not noticeable in reality. On the other hand, for chromatic colors, there is a risk that color unevenness occurs as the nozzle jetting rate of the end part nozzle is suppressed to increase a difference from the nozzle jetting rate of the central nozzle, that is, as the nozzle jetting rate becomes non-uniform.

Accordingly, for example, in the case of a lighter color than black, such as cyan, magenta, or yellow, banding is not noticeable even though the nozzle jetting rate of the end part nozzle is not suppressed to be as low as black, and there is a room for increasing the nozzle jetting rate of the end part nozzle. Further, in a case where there is a risk that color unevenness occurs when overlapping with other colors in a case where the nozzle jetting rate of the end part nozzle is kept low like black since it is a chromatic color, by making a jetting rate of each nozzle of at least one color among cyan, magenta, and yellow close to a uniform nozzle jetting rate by increasing the jetting rate of the end part nozzle compared with black, it is possible to reduce banding and color unevenness.

With respect to the problem of color unevenness, as the jetting rate of each nozzle becomes uniform, it is likely that the probability that each pixel is in the dot ON state (jetting rate pattern) or the probability that each pixel is in the dot OFF state (pattern obtained by subtracting the jetting rate from 1) is nearly uniform, and the probability that dispositions of respective colors overlap each other also becomes uniform, and thus, color unevenness is reduced.

FIG. 21 is a graph showing an example of a nozzle jetting rate applied to an embodiment of the invention. It is shown that a nozzle jetting rate shown in a graph G2 indicated by a dotted chain line in FIG. 21 is larger than a nozzle jetting rate shown in a graph G1 indicated by a solid line in FIG. 21, in a jetting rate of an end nozzle, and is close to a uniform nozzle jetting rate (graph G3). That is, the nozzle jetting rate shown in the graph G2 is smaller than the nozzle jetting rate shown in the graph G1 in a difference between the nozzle jetting rate of the end part nozzle and the nozzle jetting rate of the central nozzle, and is close to a uniform nozzle jetting rate.

The graph G1 of the nozzle jetting rate indicated by the solid line in FIG. 21 is the same as the graph G1 of the nozzle jetting rate indicated by the solid line in FIG. 7. The graph G3 of a nozzle jetting rate indicated by a dotted line in FIG. 21 is the same as the graph Gu of the nozzle jetting rate indicated by the dotted line in FIG. 7.

Focusing on the graph G2 and the graph G3, the nozzle jetting rate shown in the graph G2 is a nozzle jetting rate in which the nozzle jetting rate of the end part nozzle is suppressed to be lower than the nozzle jetting rate of the central nozzle. The nozzle jetting rate shown in the graph G3 is a nozzle jetting rate in which the difference between the nozzle jetting rate of the end part nozzle and the nozzle jetting rate of the central nozzle is small compared with the nozzle jetting rate shown in the graph G2.

Focusing on the graph G1 and the graph G3, the nozzle jetting rate shown in the graph G1 is a nozzle jetting rate in which the nozzle jetting rate of the end part nozzle is suppressed to be lower than the nozzle jetting rate of the central nozzle. The nozzle jetting rate shown in the graph G3 is a nozzle jetting rate in which the difference between the nozzle jetting rate of the end nozzle and the nozzle jetting rate of the central nozzle is small compared with the nozzle jetting rate shown in the graph G1.

The nozzle jetting rate shown in the graph G1 among the graphs G1, G2, and G3 has the lowest nozzle jetting rate of the end nozzle.

The nozzle jetting rate shown in the graph G1 among the graphs G1, G2, and G3 has the largest difference between the nozzle jetting rate of the end part nozzle and the nozzle jetting rate of the central nozzle.

The nozzle jetting rate shown in the graph G3 among the graphs G1, G2, and G3 has the highest nozzle jetting rate of the end nozzle.

The nozzle jetting rate shown in the graph G3 among the graphs G1, G2, and G3 has the smallest difference between the nozzle jetting rate of the end part nozzle and the nozzle jetting rate of the central nozzle.

For example, in the case of a four-color system of cyan, magenta, yellow, and black, the nozzle jetting rate shown in the graph G1 is set as a jetting rate of each nozzle in a nozzle row for jetting black ink, and the nozzle jetting rate shown in the graph G2 is set as a jetting rate of each nozzle of at least one color among cyan, magenta, or yellow.

Example in a Case where Jetting Rates of Nozzles of Two Colors are Nozzle Jetting Rate of Graph G2

For example, nozzle jetting rates of respective nozzles for cyan and magenta among cyan, magenta, and yellow are both set to the nozzle jetting rate shown in the graph G2 of FIG. 21, and a nozzle jetting rate of each nozzle for yellow is set to the nozzle jetting rate shown in the graph G3 of FIG. 21.

FIG. 22 shows a jetting rate pattern corresponding to 10×10 pixels in a case where the nozzle jetting rate shown in the graph G2 of FIG. 21 is applied. FIG. 22 shows a jetting rate pattern obtained by applying the nozzle jetting rate shown in the graph G2 of FIG. 21 to the nozzle pattern shown in FIG. 11.

FIG. 23 shows an overlap probability pattern of two colors of cyan and magenta. The overlap probability pattern shown in FIG. 23 is a pattern of values obtained by squaring values of respective pixels of the jetting rate pattern shown in FIG. 22.

FIG. 24 shows an overlap probability pattern in a case where dot dispositions of two colors of cyan and magenta are shifted by one pixel in the main scan direction. FIG. 25 shows an overlap probability pattern in a case where dot dispositions of two colors of cyan and magenta are shifted by one pixel in the sub scan direction.

From comparison between FIGS. 23 and 13, it can be obviously understood that the nozzle jetting rate (graph G2) indicated by the dotted chain line of FIG. 21 has a smaller difference between overlap probabilities of respective pixels, compared with the case of the nozzle jetting rate (graph G1) indicated by the solid line of FIG. 21. In the overlap probability pattern shown in FIG. 23, it can be understood that the overlap probability of respective pixels may be any value from 0.18 to 0.71. On the other hand, in the overlap probability pattern shown in FIG. 13, the overlap probability of respective pixels is any value from 0.00 to 1.00.

Further, from comparison between FIGS. 23 to 25 in a case where the nozzle jetting rate (graph G2) indicated by the dotted chain line of FIG. 21 is employed, and FIGS. 13, 16, and 17 in a case where the nozzle jetting rate (graph G1) indicated by the solid line of FIG. 21 is employed, it can be obviously understood the nozzle jetting rate (graph G2) indicated by the dotted chain line of FIG. 21 has a smaller difference between average overlapping probabilities due to a slight shift in the main scan direction and/or the sub scan direction, compared with the case of the nozzle jetting rate (graph G1) indicated by the solid line of FIG. 21.

In an overlap probability pattern of FIG. 23 corresponding to a case where there is no shift in dot dispositions of two colors, an average overlap probability per unit area is 0.54. In an overlap probability pattern of FIG. 24 corresponding to a case where dot dispositions of two colors are shifted by one pixel in the main scan direction, an average overlap probability per unit area is 0.50. In an overlap probability pattern of FIG. 25 corresponding to a case where dot dispositions of two colors are shifted by one pixel in the sub scan direction, an average overlap probability per unit area is 0.51.

FIG. 26 is a graph showing an average overlap probability per unit area at each position in the sub scan direction in a case where the nozzle jetting rate (graph G2) indicated by the dotted chain line of FIG. 21 is employed. A lateral axis in FIG. 26 represents a pixel position in the sub scan direction, and a longitudinal axis represents an overlap probability. A graph indicated by a solid line of FIG. 26 represents an average overlap probability per unit area in a case where there is no shift in dot dispositions of two colors (in the case of FIG. 23). A graph indicated by a dotted line of FIG. 26 represents an average overlap probability per unit area in a case where dot dispositions of two colors are shifted by one pixel in the main scan direction (in the case of FIG. 24). A graph indicated by a dotted chain line of FIG. 26 represents an average overlap probability per unit area in a case where dot dispositions of two colors are shifted by one pixel in the sub scan direction (in the case of FIG. 25).

From comparison between FIG. 26 and FIG. 18, it can be obviously understood that the nozzle jetting rate indicated by the dotted chain line of FIG. 21 (graph G2) has a smaller change in the average overlap probability in the sub scan direction compared with the case of the nozzle jetting rate (graph G1) indicated by the solid line of FIG. 21 and becomes close to the value "0.52" (FIG. 15) of the average overlap probability in the case of the uniform nozzle jetting rate.

In a Case where Two Nozzle Jetting Rates are Different

In a case where a nozzle jetting rate of one color among two colors is the nozzle jetting rate indicated by the solid line of FIG. 21 and a nozzle jetting rate of the other color is the nozzle jetting rate indicated by the dotted chain line of FIG. 21, similarly, the overlap probability becomes close to be uniform compared with the overlap probability in a case where the nozzle jetting rates of both the two colors match the nozzle jetting rate indicated by the solid line of FIG. 21.

FIG. 27 shows an overlap probability pattern corresponding to 10×10 pixels in a case where a nozzle jetting rate of one color among two colors is the nozzle jetting rate shown in the graph G1 of FIG. 21 and a nozzle jetting rate of the other color is the nozzle jetting rate shown in the graph G2 of FIG. 21.

The overlap probability pattern of FIG. 27 is obtained by multiplying values of corresponding pixels of a jetting rate pattern obtained by applying the nozzle jetting rate shown in the graph G1 of FIG. 21 to the nozzle pattern of FIG. 11 and a jetting rate pattern obtained by applying the nozzle jetting rate shown in the graph G2 of FIG. 21 to the nozzle pattern of FIG. 11.

FIG. 28 shows an overlap probability pattern in a case where dot dispositions of two colors are shifted by one pixel in the main scan direction. FIG. 29 shows an overlap probability pattern in a case where dot dispositions of two colors are shifted by one pixel in the sub scan direction. The overlap probability rate pattern in a case where the dot dispositions of two colors are shifted in the main scan direction or the sub scan direction is obtained by multiplying values of corresponding pixels in a shifted positional relationship, of the jetting rate pattern obtained by applying the nozzle jetting rate shown in the graph G1 of FIG. 21 to the nozzle pattern of FIG. 11 and the jetting rate pattern obtained by applying the nozzle jetting rate shown in the graph G2 of FIG. 21 to the nozzle pattern of FIG. 11.

FIG. 30 is a graph showing an average overlap probability per unit area at each position in the sub scan direction. A lateral axis of FIG. 30 represents a pixel position in the sub scan direction, and a longitudinal axis thereof represents an overlap probability. A graph indicated by a solid line of FIG. 30 represents an average overlap probability per unit area in a case where there is no shift in dot dispositions of two colors (in the case of FIG. 27). A graph indicated by a dotted line of FIG. 30 represents an average overlap probability per unit area in a case where dot dispositions of two colors are shifted by one pixel in the main scan direction (in the case of FIG. 28). A graph indicated by a dotted chain line of FIG. 30 represents an average overlap probability per unit area in a case where dot dispositions of two colors are shifted by one pixel in the sub scan direction (in the case of FIG. 29).

In the overlap probability pattern shown in FIG. 27, an overlap probability of each pixel has a certain value from 0.00 to 0.84. Further, in the overlap probability pattern shown in FIG. 27 corresponding to a case where there is no shift in dot dispositions of two colors, an average overlap probability per unit area is 0.56. In the overlap probability pattern shown in FIG. 28 corresponding to a case where dot dispositions of two colors are shifted by one pixel in the main scan direction, an average overlap probability per unit area is 0.48. In the overlap probability pattern shown in FIG. 29 corresponding to a case where dot dispositions of two colors are shifted by one pixel in the sub scan direction, an average overlap probability per unit area is 0.48.

According to the examples shown in FIG. 27 to FIG. 30, it can be understood that the overlap probabilities are slightly not uniform compared with the overlap probability in the case of the nozzle jetting rate (graph G2) shown in the dotted chain line of FIG. 21 with respect to both two colors, and are more uniform than the overlap probability in the case of the nozzle jetting rate (graph G1) shown in the solid line of FIG. 21 with respect to both two colors.

Specific Examples of Dot Disposition

FIG. 31 is a diagram showing an example of a dot disposition in a case where both nozzle jetting rates of two colors correspond to the nozzle jetting rate (graph G2) indicated by the dotted chain line of FIG. 21. A pattern shown in a leftmost part of FIG. 31 is an example of a dot disposition of color A. A second pattern from the left of FIG. 31 is an example of a dot disposition of color B. A third pattern from the left of FIG. 31 shows a dot OFF disposition in a case where the dot disposition of color A and the dot disposition of color B overlap each other.

The second pattern from the right of FIG. 31 shows a dot OFF disposition in a case where the dot disposition of color A and the dot disposition of color B are relatively shifted by one pixel in the main scan direction to overlap each other. The pattern shown in a rightmost part of FIG. 31 shows a dot OFF disposition in a case where the dot disposition of color A and the dot disposition of color B are relatively shifted by one pixel in the sub scan direction to overlap each other.

FIG. 32 is a diagram showing an example of a dot disposition in a case where a nozzle jetting rate of one color among two colors is the nozzle jetting rate (graph G1) indicated by the solid line of FIG. 21 and a nozzle jetting rate of the other color is the nozzle jetting rate (graph G2) indicated by the dotted chain line of FIG. 21. A pattern shown in a leftmost part of FIG. 32 is an example of a dot disposition of color A. A second pattern from the left of FIG. 32 is an example of a dot disposition of color B. A third pattern from the left of FIG. 32 shows a dot OFF disposition in a case where the dot disposition of color A and the dot disposition of color B overlap each other.

The second pattern from the right of FIG. 32 shows a dot OFF disposition in a case where the dot disposition of color A and the dot disposition of color B are relatively shifted by one pixel in the main scan direction to overlap each other. The pattern shown in a rightmost part of FIG. 32 shows a dot OFF disposition in a case where the dot disposition of color A and the dot disposition of color B are relatively shifted by one pixel in the sub scan direction to overlap each other.

Each pattern shown in FIG. 31 and FIG. 32 corresponds to a disposition chart of dots in the range of 20×20 pixels, in which a black cell represents a dot ON pixel, and a white cell represents a dot OFF pixel.

In both of the example shown in FIG. 31 and the example shown in FIG. 32, it can be understood that a difference in the number of dot OFF pixels due to shift of dot dispositions of two color is small, compared with the example shown in FIG. 19. The example shown in FIG. 19 shows a case where both nozzle jetting rates of two colors correspond to the nozzle jetting rate (graph G1) indicated by the solid line in FIG. 21.

As described above, by making a nozzle jetting rate of each nozzle of at least one color that is a chromatic color close to a uniform nozzle jetting rate by increasing a nozzle jetting rate of an end nozzle compared with an achromatic black color, it is possible to reduce banding and color unevenness.

Configuration Example of Image Processing Apparatus

In this embodiment, an example in which a nozzle jetting rate of each nozzle for each color is controlled by halftone processing using a dither mask will be described. By using the nozzle jetting rate of each nozzle shown in the graph G1 or the graph G2 of FIG. 21 as a control target, it is possible to generate a dither mask in which the nozzle jetting rate is reflected.

FIG. 33 is a block diagram showing functions of an image processing apparatus according to an embodiment of the invention. An image processing apparatus 200 has a function of selectively using a plurality of dither masks in accordance with color types of image data and performing halftone processing for data on a continuous-tone image of each color. The functions of the image processing apparatus 200 shown in FIG. 33 may be incorporated in the control device 102 (see FIG. 5) of the ink jet recording apparatus 10. The image processing section 110 shown in FIG. 5 corresponds to the image processing apparatus 200.

The image processing apparatus 200 performs halftone processing using a dither mask A with respect to image data of black that is an achromatic color having a high density.

The image processing apparatus 200 performs halftone processing using a dither mask B with respect to image data of respective colors of cyan and magenta that are chromatic colors having a light density compared with black. The image processing apparatus 200 performs halftone processing using a dither mask C with respect to image data of a yellow color that is a chromatic color having an extremely lighter density, compared with black.

In order to suppress banding, the dither mask A is a dither mask in which a nozzle jetting rate of an end nozzle of a nozzle row is suppressed to be low as in the graph G1 indicated by the solid line of FIG. 21. Using the nozzle jetting rate of the graph G1 shown in the solid line of FIG. 21, the dither mask A in which the nozzle jetting rate is reflected is generated.

In order to suppress color unevenness while suppressing banding to some extent, the dither mask B is a dither mask in which the jetting rate of the end nozzle is made to be close to a jetting rate of a central nozzle (close to a uniform nozzle jetting rate compared with the graph G1), as in the graph G2 indicated by the dotted chain line of FIG. 21. Using the nozzle jetting rate of the graph G2 shown in the dotted chain line of FIG. 21, the dither mask B in which the nozzle jetting rate is reflected is generated.

The dither mask C is a dither mask of a uniform nozzle jetting rate of which a jetting rate of each nozzle in a nozzle row is constant, as in the graph G3 shown in the dotted line of FIG. 21. Here, since yellow has little contribution to banding, the dither mask C may be used. The dither mask C is a typical normal dither mask in the related art, and for example, may employ a blue noise mask generated using a known void and cluster method, for example.

In the case of this example, focusing on the graphs G1 and G2, the nozzle jetting rate of the graph G1 corresponds to a "first nozzle jetting rate", and the nozzle jetting rate of the graph G2 corresponds to a "second nozzle jetting rate". Alternatively, focusing on the graphs G2 and G3, the nozzle jetting rate of the graph G2 corresponds to the "first nozzle jetting rate", and the nozzle jetting rate of the graph G3 corresponds to the "second nozzle jetting rate". Alternatively, focusing on the graphs G1 and G3, the nozzle jetting rate of the graph G1 corresponds to the "first nozzle jetting rate", and the nozzle jetting rate of the graph G3 corresponds to the "second nozzle jetting rate".

The image processing apparatus 200 includes an image data acquiring section 202, a color converting section 204, a halftone processing unit 206, a dither mask selecting section 208, a dither mask storage section 210, and a data output section 212. The functions of the image processing apparatus 200 may be realized by a combination of hardware and software of a computer.

The image data acquiring section 202 is an input interface that takes in image data that is a printing target. The image data acquiring section 202 may be configured by a data input terminal that takes in image data from an external signal processing or another signal processing unit in the apparatus. As the image data acquiring section 202, a wired or wireless communication interface may be employed, a media interface that performs reading and writing with respect to an external recording medium (removable disk) such as a memory card, or an appropriate combination thereof may be employed. The image data acquiring section 202 may be the image input interface 126 described with reference to FIG. 5.

The color converting section 204 performs a color conversion process with respect to input image data. The color converting section 204 performs a process of converting RGB image data into CMYK image data, for example. Here, R in the RGB notation represents red. G represents green. B represents blue. The color converting section 204 performs a color conversion process of image data using a color profile that conforms to the ICC profile format based on the International Color Consortium (ICC), to thereby generate a color image signal that is suitable for an output from the ink jet recording apparatus 10. In a case where four-color ink of CMYK is used in the ink jet recording apparatus 10, image data of CMYK is generated by the color converting section 204. Further, in a case where six-color ink including light magenta (LM) and light cyan (LC) in addition to CMYK is used, image data including respective color components of CMYK, and LM and LC is generated by the color converting section 204. The color converting section 204 performs a separation process of separating input image data into image data for each color of ink used in the ink jet recording apparatus 10.

In a case where CMYK image data is input from the image data acquiring section 202, a color conversion process of converting RGB to CMYK in the color converting section 204 may not be performed. Further, although not shown, a gradation transformation process may be performed with respect to the image data after the color conversion process so as to have color development characteristics defined by the ink jet recording apparatus 10.

The halftone processing unit 206 performs halftone processing with respect to a continuous-tone image of each color, using any one of the dither mask A, the dither mask B, and the dither mask C, and generates a binary image as a result of the halftone processing.

The dither mask selecting section 208 performs a process of selecting a dither mask to be applied to the halftone processing unit 206, from the dither mask A, the dither mask B, and the dither mask C stored in the dither mask storage section 210.

The dither mask selecting section 208 selects the dither mask A, the dither mask B, or the dither mask C, in accordance with a color type of image data to be binarized. The dither mask selecting section 208 selects the dither mask A with respect to black image data. The dither mask selecting section 208 selects the dither mask B with respect to cyan and magenta image data. The dither mask selecting section 208 selects the dither mask C with respect to yellow image data.

The dither mask storage section 210 is a storage device that stores data on a plurality of types of dither masks including the dither mask A, the dither mask B, and the dither mask C. The dither mask storage section 210 includes a storage device such as a hard disk device and/or a memory.

Data of the dither mask selected by the dither mask selecting section 208 is read out from the dither mask storage section 210, and then, is sent to the halftone processing unit 206.

The halftone processing unit 206 applies an appropriate dither mask for each of color types of C, M, Y, and K to generate a binary image for each color type. The binary image is a dot image indicating a dot disposition pattern. The binary image is synonymous with a halftone image. The binary image for each color obtained as a result of the halftone processing of the halftone processing unit 206 corresponds to dot data indicating a dot disposition pattern for each color. In this embodiment, the binary image that is data of binary values (binarized data) indicating dot on/off is exemplified as dot data generated by the halftone processing unit 206, but multi-value data corresponding to types of dot sizes (large dot, medium dot, small dot, and the like) may be used as the dot data.

The data output section 212 is an interface that outputs the binary image data generated by the halftone processing unit 206 to the processing unit inside the image processing apparatus 200 or to the outside of the apparatus. The binary image data generated by the halftone processing unit 206 is sent to the jetting control section 112 (see FIG. 5) through the data output section 212, so that printing is performed using the recording head 24.

Image Processing Method in Image Processing Apparatus

FIG. 34 is a flowchart showing a processing flow of the image processing apparatus 200. In step S102, image data that is a processing target is input to the image processing apparatus 200.

In step S104, the image processing apparatus 200 performs color conversion with respect to the input image data. For example, the color converting section 204 performs a process of converting RGB image data into CMYK image data.

In step S106, the image processing apparatus 200 performs halftone processing for each color of C, M, Y, and K. The halftone processing unit 206 applies a dither mask depending on a color type to generate a binary image for each color.

In step S108, the image processing apparatus 200 converts a halftone processing result into printing data, and outputs the result to the ink jet printing apparatus.

FIG. 35 is a flowchart indicating details of the process in the halftone processing step (step S106 of FIG. 34).

Here, the processes from step S120 to step S126 are repeatedly performed with respect to each of four colors of CMYK. For example, indexes 0, 1, 2, and 3 are used to distinguish color types of four colors of CMYK, in which "0" represents cyan, "1" represents magenta, "2" represents yellow, and "3" represents black, respectively. In a state where the color type index variable is set to "color", while changing the index variable by "+1" from the initial value "0" to the final value "3", the processes from step S120 to step S126 are repeatedly performed.

In step S122, the image processing apparatus 200 selects a dither mask corresponding to the color type. The dither mask selecting section 208 selects the dither mask B with respect to cyan and magenta. The dither mask selecting section 208 selects the dither mask C with respect to yellow. The dither mask selecting section 208 selects the dither mask A with respect to black.

In step S124, the image processing apparatus 200 performs dither processing for each color using the dither mask selected in step S122 to generate a binary image.

After all binary images of the respective colors of CMYK are generated, the procedure proceeds to step S108 in FIG. 34 from the flowchart of FIG. 35.

In this example, focusing on the relationship between the dither mask A and the dither mask B, a nozzle jetting rate (graph G1 in FIG. 21) of a control target of the dither mask A to be applied to black corresponds to the "first nozzle jetting rate", and a nozzle jetting rate (graph G2 in FIG. 21) of a control target of the dither mask B to be applied to cyan and magenta corresponds to the "second nozzle jetting rate".

Alternatively, focusing on the relationship between the dither mask B and the dither mask C, the nozzle jetting rate (graph G2 in FIG. 21) of the control target of the dither mask B to be applied to cyan and magenta corresponds to the "first nozzle jetting rate", and a nozzle jetting rate (graph G3 in FIG. 21) of a control target of the dither mask C to be applied to yellow corresponds to the "second nozzle jetting rate".

Alternatively, focusing on the relationship between the dither mask A and the dither mask C, the nozzle jetting rate (graph G1 in FIG. 21) of the control target of the dither mask A to be applied to black corresponds to the "first nozzle jetting rate", and the nozzle jetting rate (graph G3 in FIG. 21) of the control target of the dither mask C to be applied to yellow corresponds to the "second nozzle jetting rate".

A process of storing the dither mask A, the dither mask B, and the dither mask C in the dither mask storage section 210 corresponds to an example of a "process of preparing a plurality of types of dither masks".

Dither Mask Used in Halftone Processing

In generating the dither mask, a nozzle jetting rate that is a control target is determined, a threshold of each pixel of the dither mask is set so that an absolute nozzle jetting rate is increased in accordance with an increase of a duty in a state where a nozzle jetting rate is generally retained.

Example of Dither Mask Generating Method

An example of a method for generating the dither mask A and the dither mask B will be described.

FIG. 36 is a flowchart showing an example of a procedure of a dither mask generating method according to an embodiment. The dither mask generating method of this example includes a process of setting an initial dot disposition of a dither mask (step S1), a process of setting a threshold in a descending order from the initial dot disposition (step S2), and a process of setting a threshold in an ascending order from the initial dot disposition (step S3).

Processing of the respective processes of the flowchart shown in FIG. 36 is performed by a computer that functions as a dither mask generating device. The computer functions as the dither mask generating device by executing a program.

Here, in order to simplify the dither mask generating method, it is assumed that the initial dot disposition is a dot disposition with an excessively low duty and a nozzle jetting rate is not reflected. An initial duty of the "excessively low duty" corresponding to the initial dot disposition may have a value that is larger than 0% and is equal to or smaller than 1%, for example, and more preferably, is set to a value that is equal to or greater than 0.1% and is equal to or smaller than 0.5%. In the case of such a low duty, an influence of setting of the nozzle jetting rate may be nearly ignored. The duty of the initial dot disposition (initial duty) is not limited to the above-described numerical value, and may have any value as long as the influence of setting of the nozzle jetting rate can be ignored.

In the initial dot disposition setting process of step S1, dots of a number corresponding to a predetermined initial duty are disposed in a mask region that is a pixel array region that is the same as a mask size of the dither mask.

The descending-order threshold setting process of step S2 is a process of performing a process of setting a threshold of each gradation without reflecting the nozzle jetting rate, using a known threshold setting method. The "descending order" is an order of sequentially setting thresholds from a large threshold value to a small threshold value. The "descending order" in step S2 means that the process is performed while sequentially setting thresholds from a gradation threshold corresponding to the initial dot disposition to a small threshold.

That is, in step S2, a process of sequentially setting small thresholds to threshold non-setting pixels in the descending order while gradually excluding dots from the initial dot disposition. The "threshold non-setting pixels" in the descending order are pixels with dots. The "with dots" is synonymous with "dot-on".

The ascending-order threshold setting process of step S3 is a process of performing a process of setting thresholds to the threshold non-setting pixels in an ascending order while reflecting a nozzle jetting rate. The "ascending order" is an order of sequentially setting thresholds from a small threshold value to a large threshold value. The "ascending order" in step S3 means that the process is performed while sequentially setting thresholds from a gradation threshold corresponding to the initial dot disposition to a large threshold.

The orders of the descending-order threshold setting process (step S2) and the ascending-order threshold setting process (step S3) may be replaced with each other.

FIG. 37 is a flowchart showing an example of ascending-order threshold setting processing that is applied to the ascending-order threshold setting process (step S3 in FIG. 36).

In the ascending-order threshold setting process according to the embodiment shown in FIG. 37, first, a setting stage Q of a nozzle jetting rate is set to "stage Q=1" that is an initial value (step S12). In this embodiment, since nozzle jetting rates of respective nozzles are set by being switched in stages in accordance with regions of duties, the nozzle jetting rates are provided in stages. The stage Q is a variable indicating a stage of a nozzle jetting rate.

In this embodiment, the nozzle jetting rate may be used as a "priority pixel setting rate", and the term "nozzle jetting rate" may be replaced with the "priority pixel setting rate".

FIG. 38 is a graph showing an example of nozzle jetting rates in respective stages in a case where the number of stages is 2. A lateral axis in FIG. 38 represents a nozzle number, and a longitudinal axis represents a nozzle jetting rate. In FIG. 38, a graph of Q=1 represents nozzle jetting rates in a stage 1, and a graph of Q=2 represents nozzle jetting rates in a stage 2. Here, a recording head in which the number of nozzles is 50 will be described as an example.

The "Q" indicating the stage may have an integer value from Q=1 to a stage maximum value in a descending order of nozzle jetting rates. That is, in a case where k is an integer that is equal to or greater than 1, nozzle jetting rates of a stage k+1 are larger than nozzle jetting rates of a stage k. Jetting rates of the stage 1 are the lowest, and jetting rates of a final stage (nozzle jetting rates of the stage 2 in FIG. 38) are set to "1.0" for all nozzles.

Each nozzle jetting rate of Q=1 corresponds to the graph G1 indicated by the solid line in FIG. 21. That is, FIG. 38 is a nozzle jetting rate used as a control target in generating the dither mask A.

Under the setting of the nozzle jetting rates of the stage 1, respective nozzles can record dots only in a range of nozzle absolute jetting rates shown in the graph of stage 1. That is, in a case where the nozzle jetting rates of the respective nozzles are set as in the graph of the stage 1, an upper limit in a recordable duty under the setting is determined. In the case of the stage 1 in FIG. 38, the upper limit in the recordable duty is generally set to 72%. Accordingly, in order to set a threshold of the dither mask up to the maximum duty 100%, the jetting rates are further increased from the stage 1, and nozzle jetting rates of all the nozzles should be set to "1.0" in the final stage. That is, in accordance with an increase of a value of a threshold that is set with respect to threshold non-setting pixels of the dither mask, it is necessary to change the setting of the nozzle jetting rates into a plurality of stages of at least two stages.

In FIG. 38, a setting type of nozzle jetting rates of two stages (Q=1, and 2) is shown, but the number of stages may be discretionally set to be equal to or greater than 2.

Nozzle jetting rates of the respective nozzles 62 in the nozzle row 61A of the recording head 24A shown in FIG. 8 may be replaced with the nozzle jetting rates of the respective stages 1 to 2, as shown in FIG. 38, for example. In this embodiment, the thresholds are set up to the duty of 72% by applying the jetting rate of Q=1 shown in FIG. 38. Then, the thresholds are set up to the duty of 100% by applying the nozzle jetting rate of Q=2.

In other words, up to the duty of 72%, the absolute jetting rate of each nozzle increases with the threshold in a state where the relative ratio of each nozzle jetting rate remains the same as the nozzle jetting ratio of Q=1. From the duty of 72% to the duty of 100%, the absolute jetting rate of each nozzle increases with the threshold value in a state where the relative ratio of each nozzle jetting rate gradually changes the same ratio as the nozzle jetting rate of Q=1 to the nozzle jetting rate of Q=2.

In step S12 of FIG. 37, after the stage Q=1 is set, the procedure proceeds to step S14. In step S14, the nozzle jetting rates of the respective nozzles 62 in the recording head 24A are set. Here, the set nozzle jetting rates correspond to one form of priority pixel setting rates, and the nozzle jetting rate setting process of step S14 corresponds to one form of a priority pixel setting rate setting process. In a case where the stage Q=1 is set, the nozzle jetting rates of the respective nozzles 62 in the nozzle row 61A of the recording head 24A shown in FIG. 8 are set as in the graph shown in the stage Q=1 of FIG. 38.

Then, in step S16 of FIG. 37, nozzle numbers (that is, a nozzle pattern) corresponding to respective pixels are set in accordance with a scan pattern. The process of step S16 is a process of setting nozzle numbers corresponding to respective pixels of the dither mask, in accordance with a scan pattern in performing image recording using the ink jet recording apparatus 10 with respect to an image region (that is, a mask region) having a pixel array having the number of pixels that is identical to the mask size of the dither mask.

The nozzle numbers corresponding to the respective pixels mean nozzle numbers of nozzles that record the respective pixels. The process of step S16 is a process of determining corresponding nozzle numbers with respect to the respective pixels of the dither mask.

When m and n are natural numbers, in a case where a dither mask that is a generation target is a matrix of m rows×n columns, corresponding nozzle numbers are respectively determined with respect to respective pixels in an image region formed by a two-dimensional pixel array of m rows×n columns. A pattern of nozzle numbers in which the corresponding nozzle numbers are determined with respect to the respective pixels of the dither mask is referred to as a nozzle pattern of the dither mask.

The process of step S16 corresponds to a process of setting a nozzle pattern indicating a correspondence relationship between the respective pixels of the dither mask and the nozzle numbers for recording at respective pixel positions, and corresponds to one form of a "nozzle pattern setting process".

The nozzle pattern of the dither mask is formed such that a nozzle pattern of a repetitive minimum unit is repeated.

After the nozzle pattern of the dither mask is set in step S16 of FIG. 37, the procedure proceeds to step S18 in FIG. 37. In step S18, on the basis of the nozzle jetting rates of the stage Q set in step S14 and the nozzle pattern set in step S16, dot priority pixels are set. Step S18 corresponds to one form of a "dot priority pixel setting process". The dot priority pixels refer to a pixel group that becomes pixel candidates for which a threshold is set, among the pixels of the dither mask.

FIG. 39 is a diagram showing an example of disposition of dot priority pixels. FIG. 39 shows a disposition example of dot priority pixels set on the basis of the nozzle jetting rates of the stage Q=1 described in FIG. 38 and the nozzle pattern described in FIG. 11. The nozzle numbers shown in FIG. 39 are identical to those of the example in FIG. 11. The nozzle pattern shown in FIG. 11 is repeated by 100 pixels (paper feed amount: 25 pixels×4) in the sub scan direction, but in FIG. 39, only 18 pixels are shown.

It is preferable that the size of the dither mask is set such that the size in the sub scan direction is a size of integer times of the repetitive minimum unit of the nozzle pattern and the size in the main scan direction is a size of integer times of the repetitive minimum unit of the nozzle pattern. In the case of this example, since the nozzle pattern is repeated by 100 pixels in the sub scan direction, the size of the dither mask is set to a multiple of the repetitive minimum unit, for example, 100×100 pixels. FIG. 39 shows dot priority pixels of 20×18 pixels that are a part of the dither mask of 100×100 pixels. Further, in FIG. 39, values of jetting rates are rounded to the fifth decimal place, and are shown up to the fourth decimal place.

As obvious from the nozzle pattern described in FIG. 11, in a case where the number of paths in the main scan direction is 2, a nozzle pattern corresponding to the dither mask of 100×100 pixels have different nozzles to be used in odd rows and even rows. Hereinafter, for ease of description, nozzles used for recording of odd rows (the first row, the third row, the fifth row, and so on from the left of FIG. 39) are referred to as "left nozzles", and nozzles used for recording of even rows (the second row, the fourth row, the sixth row, and so on from the left of FIG. 39) are referred to as "right nozzles".

FIG. 39 shows an example of disposition of dot priority pixels set on the basis of the nozzle jetting rates shown in Q=1 of FIG. 38 and the nozzle pattern shown in FIG. 11.

In FIG. 39, "left nozzle jetting rates" refer to nozzle jetting rates of respective pixels for recording pixels that belong to the odd rows in the nozzle pattern corresponding to the dither mask of 100×100 pixels. Further, in FIG. 39, "right nozzle jetting rates" refer to nozzle jetting rates of respective pixels for recording pixels that belong to the even rows in the nozzle pattern corresponding to the dither mask of 100×100 pixels.

"The number of left nozzle priority pixels" refers to the number of dot priority pixels in main scan directional rasters formed by the pixels that belong to the odd rows in the nozzle corresponding to the dither mask of 100×100 pixels. "The number of right nozzle priority pixels" refers to the number of dot priority pixels in main scan directional rasters formed by the pixels that belong to the even rows in the nozzle corresponding to the dither mask of 100×100 pixels. In FIG. 39, values of dot priority pixel numbers are rounded to the third decimal place, and are shown up to the second decimal place.

The number of entire dot priority pixels in the mask size of the dither mask is a sum of the numbers of dot priority pixels of the respective nozzles of the respective rasters obtained by multiplying the nozzle jetting rates of the respective nozzles for recording each raster by "the number of main scan pixels/the number of paths in the main scan direction". The dot priority pixels of the respective nozzles of each raster are set so that an occurrence probability of a dot priority pixel is proportional to a nozzle jetting rate.

In FIG. 39, a flag of a number "1" is assigned to a dot priority pixel, and a cell indicating the pixel is painted with a gray tone. Further, a number "0" is assigned to a non-dot priority pixel. That is, the pixel with the number "1" in a matrix region of 20×18 pixels represents "dot priority pixel-on" and the pixel with the number "0" represents "dot priority pixel-off".

Further, in FIG. 39, nozzle numbers of nozzles for recording respective rasters, nozzle jetting rates, and dot priority pixel numbers of the respective rasters are shown together with the disposition example of the dot priority pixels. Here, the "raster" refers to the main scan directional raster in which pixels are arranged in the main scan direction that is the lateral direction (row direction) in FIG. 39.

The number of dot priority pixels of each raster is obtained by multiplying the nozzle jetting rates of the nozzles for recording the raster by "the number of main scan pixels of the dither mask/the number of paths in the main scan direction". The number of main scan pixels of the dither mask refers to the number of pixels of the dither mask in the main scan direction. In the case of the example of FIG. 39, since the number of main scan pixels of the dither mask is 100, and the number of paths in the main scan direction is "2", the "number of main scan pixels of the dither mask/the number of paths in the main scan direction" is 50. A first row raster shown in FIG. 39 is recorded by the nozzle number 25 and the nozzle number 0 with the number of paths in the main scan direction being "2", in which the nozzle jetting rate of the nozzle number 25 is 1.0000 and the nozzle jetting rate of the nozzle number 0 is 0.0000. Accordingly, the number of left nozzle priority pixels of the first row raster is calculated as 50.00 (=1.0000×100/2). Further, the number of right nozzle priority pixels of the first row raster is calculated as 0.00 (=0.0000×100/2).

Specific Examples of Dot Priority Pixel Setting Method

First Example of Dot Priority Pixel Setting Method

Dot priority pixels of respective nozzles of each raster are set according to the following conditional expression, for example.

[Conditional expression 1] Only in a case where rand( )≤nozzle jetting rate is satisfied, the "dot priority pixel-on" is set.

Here, "rand( )" in the conditional expression 1 represents a random number in a range that is equal to or greater than 0 and is smaller than 1.0000.

In each pixel position, the random number in the range that is equal to or greater than 0 and is smaller than 1.0000 is generated at a regular probability by the rand ( ) function, and rand( ) that is a generated random number value is compared with a nozzle jetting rate. In a case where rand( ) is equal to or smaller than the nozzle jetting rate, the pixel is set to a dot priority pixel.

By determining the dot priority pixels in accordance with the conditional expression 1, dot priority pixels are set in a random number manner by setting a value of "nozzle jetting rate×the number of main scan pixels/the number of paths in the main scan direction" to a target number, in each raster recorded by respective nozzles.

The number of dot priority pixels calculated by the "nozzle jetting rate×the number of main scan pixels/the number of paths in the main scan direction" and the number of dot priority pixels that are actually set in accordance with the conditional expression 1 should not necessarily match each other.

That is, the number of left nozzle priority pixels of each raster shown in FIG. 39 is a target number of dot priority pixels of left nozzles in each raster, and may be calculated in advance by the above-described calculation. The number of right nozzle priority pixels of each raster shown in FIG. 39 is a target number of dot priority pixels of right nozzles in each raster, and may be calculated in advance by the above-described calculation. Here, the number of the actually set dot priority pixels may be changed depending on the values of the random numbers.

Second Example of Dot Priority Pixel Setting Method

In addition to the conditional expression 1, the method for randomly setting the dot priority pixels may employ a variety of methods. For example, first, the number of priority pixels set in each raster recorded by respective nozzles is calculated as an integer value, and then, a first dot priority pixel is set as a pixel of a number calculated as "rand( )RAND_MAX % the number of recording pixels". Here, the "number of recording pixels" represents the number of pixels of which recording is allocated to each nozzle in each raster, which is identical to "the number of main scan pixels/the number of paths in the main scan direction". The rand( )RAND_MAX represents a random number that is an integer in a range that is equal to or greater than 0 and is smaller than RAND_MAX. "RAND_MAX" is an integer that is at least larger than the number of recording pixels. For example, RAND_MAX may be set to 65536. Here, "%" is a remainder operator. Further, a % b represents a remainder obtained by dividing a by b. That is, "rand( )RAND_MAX % the number of recording pixels" is a number corresponding to a remainder obtained by dividing the random number that is the integer in the range that is equal to or greater than 0 and is smaller than RAND_MAX by the "number of recording pixels". Through this operation, integers in a range that is equal to or greater than 0 and is smaller than "the number of recording pixels −1" may be obtained. In the example of FIG. 39, "the number of recording pixels is 50".

A pixel number corresponding to an integer calculated by "rand( )RAND_MAX % the number of recording pixels" is set to a first dot priority pixel with integers of 0 to 49 being associated with pixel numbers of 50 pixels.

Then, a pixel of a number corresponding to an integer calculated by rand( )RAND_MAX % (the number of recording pixels −1) excluding the first dot priority pixel is set to a second dot priority pixel. In the example of FIG. 39, "the number of recording pixels is 50", and a pixel number corresponding to an integer calculated by rand( )RAND_MAX % (the number of recording pixels −1) is set to a second dot priority pixel with integers of 0 to 48 being associated with pixel numbers of 49 pixels excluding the first dot priority pixel. Hereinafter, similarly, a pixel number corresponding to an integer calculated by rand( )RAND_MAX % (the number of recording pixels−2) excluding the first and second dot priority pixels is set to a third dot priority pixel. A fourth dot priority pixel and subsequent dot priority pixels may be sequentially set up to the number of dot priority pixels by the same procedure.

In setting the dot priority pixels, pixels of thresholds set up to a previous stage may be included in dot priority pixels in the corresponding stage, or may not be included therein. In setting the dot priority pixels, in a case where the pixels of the thresholds set up to the previous stage are considered, in the above-described setting method according to the example 2, the pixels of the thresholds set up to the previous stage are excluded from pixels that are candidates of the dot priority pixels in the corresponding stage, and the number of thresholds are excluded from the number of dot priority pixels.

With respect to the dot priority pixel setting method, in the first example and the second example, a case where the rand( ) function is used is shown, but the method for randomly setting the dot priority pixels may employ a variety of methods, and is not limited to the case where the rand( ) function is used.

Third Example of Dot Priority Pixel Setting Method

Further, the dot priority pixel setting method is not limited to the method for randomly setting the dot priority pixels, and may employ a method for setting dot priority pixels at regular intervals. An example of the method for setting the dot priority pixels at regular intervals will be described.

For example, a jetting pixel interval of respective nozzles in each raster is set to 1, "1/nozzle jetting rate" is determined as a regular interval, and a dot priority pixel may be set to a pixel with a number obtained by rounding a value of an integer multiple of the "1/nozzle jetting rate" to an integer value. The jetting pixel interval refers to a jetting interval of respective nozzles in each raster. In a case where the number of paths in the main scan direction is 1, the interval corresponds to 1 pixel, and in a case where the number of paths in the main scan direction is 2, the interval corresponds to 2 pixels.

This will be described with reference to the example of FIG. 39. In FIG. 39, for example, since a nozzle jetting rate with respect to a left nozzle of a second row raster is 0.8462, a dot priority pixel is set to a pixel with a number obtained by rounding a value of an integer multiple of 1/0.8462=1.1818 to an integer value. Here, in FIG. 39, since the number of paths in the main scan direction is 2, the jetting pixel interval "1" corresponds to 2 pixels. Accordingly, in a case where the integer values are rounded, dot priority pixels are set to a first pixel, a third pixel, a seventh pixel, a ninth pixel, and so on (pixels of numbers corresponding to 1, 2, 4, 5, 6, and so on obtained by respectively rounding 1.1818, 2.3636, 3.5453, 4.7270, 5.909, and so on to integer values) in which a left end pixel is the first pixel. Further, since a nozzle jetting rate with respect to a right nozzle of the second row raster is 1.0000, a dot priority pixel is set to a pixel with a number obtained by rounding a value of an integer multiple of 1/1.0000=1.0000 to an integer value. That is, in a case where the integer values are rounded, dot priority pixels are set to a second pixel, a fourth pixel, a sixth pixel, an eighth pixel, and so on (pixels of numbers corresponding to 1, 2, 3, 4, and so on obtained by respectively rounding 1.0000, 2.0000, 3.0000, 4.00000, and so on to integer values).

Using the methods described in the above-mentioned first example to the third example, for example, dot priority pixels are set in step S18 shown in FIG. 37, and then, the procedure proceeds to step S20.

In step S20, among all pixels of the dither mask, a threshold is temporarily set with respect to a pixel that is a threshold non-setting pixel and a dot priority pixel, and then, its granularity is evaluated. An index of the granularity evaluation may be a known index such as a root mean square (RMS) granularity, for example. The RMS granularity is a standard deviation calculated by applying a blur filter that considers human visual characteristics such as a visual transfer function (VTF) to a dot disposition.

An evaluation result of the granularity in step S20 is stored in a memory or the like, and then, the procedure proceeds to step S22. In step S22, it is determined whether the evaluation of the granularity in step S20 is completed with respect to all candidate pixels that are candidates of pixels to which thresholds are to be set. All candidate pixels correspond to a set of the pixels that are the threshold non-setting pixels and the dot priority pixels, to which the thresholds are capable of temporarily setting in step S20.

In step S22, in a case where there is a candidate pixel of which the granularity is not evaluated, the determination of step S22 is negative (No), and then, the procedure returns to step S20. That is, pixels to which thresholds are to be temporarily set are changed in the range of the candidate pixels that are the threshold non-setting pixels and the dot priority pixels, and then, the process of step S20 is repeated.

In a case where the process of the granularity evaluation in step S20 is completed with respect to all the candidate pixels, the determination of step S22 is affirmative (Yes), and then, the procedure proceeds to step S24.

In step S24, on the basis of the result obtained by evaluating the granularity with respect to all the candidate pixels, a threshold is set to a pixel with the best granularity. The process of step S24 corresponds to one form of a "threshold setting process".

Then, in step S26, it is determined whether setting of a predetermined number of thresholds is completed. Here, the "predetermined number" is a specified value that is determined in advance as the number of thresholds set under setting of nozzle jetting rates in the same stage. The "predetermined number" in the flowchart shown in FIG. 37 is set to a number that is smaller than the number of all dot priority pixels set in step S18, for example, "the number of all dot priority pixels×0.8". In a case where the predetermined number is set to be equal to the number of all dot priority pixels, there is a concern that the granularity deteriorates in the vicinity of the predetermined number. By setting the predetermined number to the number that is smaller than the number of all dot priority pixels, it is possible to reduce the granularity deterioration. Here, in a case where the predetermined number is set to be an excessively small value, the performance for suppressing a jetting rate of an end part nozzle in a nozzle row is lowered. Accordingly, in setting the predetermined number, it is preferable to set the predetermined number to an appropriate value from both viewpoints of the reduction of the granularity deterioration and the performance for suppressing the jetting rate of the end part nozzle. For example, the predetermined number is set to a value in a range that is equal to or greater than 0.6 times the number of all dot priority pixels and is equal to or smaller than 0.9 times the number of all dot priority pixels, and more preferably, to a value in a range that is equal to or greater than 0.7 times the number of all dot priority pixels and is equal to or smaller than 0.8 times the number of all dot priority pixels.

In step S26, in a case where the setting of the predetermined number of thresholds is not completed, the procedure returns to step S20. On the other hand, in step S26, in a case where the setting of the predetermined number of thresholds is completed, the procedure proceeds to step S28.

In step S28, it is determined whether the processes of all stages are completed. In a case where the processes of all the stages are not completed with respect to the stage Q of the nozzle jetting rate, "1" is added to the value of the stage Q, and the value of the stage Q is changed to "Q+1" (step S30), and then, the procedure returns to step S14.

The setting is changed to nozzle jetting rates of the next stage changed in step S30, and then, the above-described processing routine (step S14 to step S28) is repeated. Since the same setting as in the previous stage may be used with respect to the nozzle pattern described in step S16, the process of step S16 may be omitted.

A process for newly setting dot priority pixels in step S18 under the setting of the nozzle jetting rates in a stage different from the previous stage performed through step S30 corresponds to one form of "a process of changing dot priority pixels".

As the loop from step S14 to step S28 is repeated after step S30, setting of nozzle jetting rates of respective nozzles set by the nozzle jetting rate process of step S14 is changed to a plurality of stages, that is, at least two stages, in accordance with a threshold region corresponding to the number of thresholds corresponding to the predetermined number of thresholds in step S26 (that is, in accordance with the values of the thresholds set in step S24).

Further, before thresholds are set with respect to all of the dot priority pixels that are once set in step S18, that is, in a case where setting of a predetermined number of thresholds that is smaller than the number of dot priority pixels is completed, the setting is newly changed to setting of separate dot priority pixels in step S18 after step S30.

In this way, the same processes are performed with respect to all stages, and the respective thresholds are set. In a case where it is determined in step S28 that the processes of all the stages are completed, the procedure shown in the flowchart of FIG. 37 is terminated.

With respect to step S28, in the final stage, the jetting rates of all nozzles are set to "1.0", the dot priority pixels are set to all the pixels, and the number of all pixels is set as the "predetermined number" in step S26.

Instead of the procedure shown in the flowchart shown in FIG. 37, only in the final stage, the threshold setting may be performed in a separate loop, and the setting of the dot priority pixels and the determination may not be performed. That is, in a case where the nozzle jetting rates of all nozzles in the final stage are set to "1.00", without executing the process of setting the nozzle jetting rate of each nozzle to "1.00" and the process of setting all pixels to the dot priority pixels, a separate processing loop in which the setting of the nozzle jetting rates and the setting of the dot priority pixels are excluded and the determination of the dot priority pixels is not performed may be performed.

Even in a case where the above-described separate processing loop is employed, the processes are substantially equivalent to those in a case where the processes of setting the nozzle jetting rates of all nozzles to "1.00" and setting all the pixels to the dot priority pixels, and transition to the separate processing loop corresponds to one form of setting of the "final stage" among the "plurality of stages".

The procedure shown in the flowchart described in FIG. 37 is applied with respect to setting of thresholds that are a part of all the thresholds set in the dither mask. That is, a process of changing the dot priority pixels that are once set is applied with respect to the setting of at least a part of all the thresholds.

According to the procedure shown in the flowchart in FIG. 37, it is possible to increase a nozzle absolute jetting rate of each nozzle while generally maintaining a relative percentage of jetting of respective nozzles in accordance with nozzle jetting rates (that is, priority pixel setting rates), together with an increase of the set thresholds. The "relative percentages of jetting of respective nozzles" are based on the nozzle jetting rates, which should not be completely equivalent to each other.

In a case where the dither mask B is generated, instead of the nozzle jetting rates of Q=1 and Q=2 shown in FIG. 38, nozzle jetting rates of Q=1 and Q=2 shown in FIG. 40 are applied. The nozzle jetting rate shown as Q=1 in FIG. 40 corresponds to the graph G2 indicated by the dotted chain line in FIG. 21.

In a case where the dither mask B is generated by reflecting the nozzle jetting rate shown in FIG. 40, the thresholds are set by applying the nozzle jetting rate of Q=1 up to a duty of 83%, and the thresholds are set by applying the nozzle jetting rate of Q=2 up to a duty of 100%.

In a case where the dither mask C is generated, a known blue noise mask may be generated using a known method such as a void-and-cluster method without setting each nozzle jetting rate. The void-and-cluster method is disclosed, for example, in Robert A. Ulichney "Void-and-cluster method for dither array generation", Proc. SPIE 1913, Human Vision, Visual Processing, and Digital Display IV, 332 (Sep. 8, 1993).

Configuration of Dither Mask Generating Device

FIG. 41 is a block diagram showing a function of the dither mask generating device. The dither mask generating device 150 comprises a nozzle jetting rate setting section 152, a nozzle pattern setting section 154, a dot priority pixel setting section 156, and a threshold setting section 158. Further, the dither mask generating device 150 includes a scan pattern information acquiring section 160, a stage switching section 162, and a threshold number determining section 164. The respective sections may be realized by a hardware circuit such as an integrated circuit, hardware and software of a computer, or an appropriate combination thereof. Further, functions of the dither mask generating device 150 may be provided in the control device 102 described in FIG. 5.

The nozzle jetting rate setting section 152 shown in FIG. 41 performs a process of setting a nozzle jetting rate of each nozzle 62 in the recording head 24A (see FIG. 8). The nozzle jetting rate setting section 152 sets the nozzle jetting rate of each nozzle in accordance with stages of nozzle jetting rates that are prepared in advance, as shown in FIGS. 38 and 40. The nozzle jetting rate setting section 152 performs the process described in step S14 of FIG. 37. The nozzle jetting rate setting section 152 corresponds to one form of a priority pixel setting rate setting section.

The stage switching section 162 shown in FIG. 41 designates a stage of nozzle jetting rates to be set by the nozzle jetting rate setting section 152. The stage switching section 162 performs the process described in step S30 of FIG. 37. The nozzle jetting rate setting section 152 sets the nozzle jetting rates in the stage designated by the stage switching section 162.

The nozzle pattern setting section 154 performs a process of specifying a nozzle corresponding to each pixel of a dither mask 166, on the basis of information on a scan pattern obtained from the scan pattern information acquiring section 160. That is, the nozzle pattern setting section 154 performs a process of associating at least one nozzle for recording at each pixel position with respect to each pixel of the dither mask 166.

The scan pattern information acquiring section 160 acquires the information on the scan pattern based on a drawing mode from a scan pattern program or the like. As described above, since the scan pattern program specifies a reciprocating scan of the recording head 24 in the main scan direction with respect to the recording medium 12 that is intermittently transported in the sub scan direction or the number of paths, it is possible to discriminate the scan pattern of the recording head 24 from the scan pattern program.

The nozzle pattern setting section 154 discriminates a scan pattern in a case where the recording head 24 is relatively moved in the main scan direction and the sub scan direction with respect to the recording medium 12. The nozzle pattern setting section 154 performs a process of determining which nozzle 62 of the recording head 24 is to record each pixel of the dither mask 166 on the basis of the scan pattern. The nozzle pattern setting section 154 generates nozzle pattern data 168 that is data on a nozzle pattern indicating a correspondence relationship between each pixel of the dither mask 166 and a nozzle for recording each pixel. The nozzle pattern data 168 is generated from data on the nozzle pattern described in FIG. 11. The nozzle pattern setting section 154 performs the process described in step S16 of FIG. 37.

A method for generating the nozzle pattern data 168 is not limited to the method determined on the basis of the scan pattern program, and may employ a variety of methods. Since the nozzle pattern data 168 may be determined according to the drawing mode and the size of the dither mask 166 or a disposition method thereof, nozzle pattern data corresponding to each of a plurality of types of drawing modes may be stored in an information storing section such as a memory.

The dot priority pixel setting section 156 performs a process of setting dot priority pixels on the basis of the nozzle jetting rate data 170 and the nozzle pattern data 168. Further, the dot priority pixel setting section 156 performs a process of changing dot priority pixels before thresholds are set with respect to all dot priority pixels that are once set. Changing the dot priority pixels before the thresholds are set with respect to all the dot priority pixels that are once set means changing the dot priority pixels in a state where at least a part of the dot priority pixels that are once set are pixels for which thresholds are not set. The dot priority pixel setting section 156 performs the process described in step S18 of FIG. 37.

The threshold setting section 158 performs a process of preparing the dither mask 166 including pixels for which thresholds are not set and setting thresholds with respect to the pixels of the dither mask 166 for which the thresholds are not set. The threshold setting section 158 performs the process described in step S20 to step S24 in FIG. 37. As the thresholds of all the pixels of the dither mask 166 are set by the threshold setting section 158, the dither mask 166 that is a generating target is completed.

The threshold number determining section 164 manages the number of thresholds set by the threshold setting section 158, and determines whether setting of a predetermined number of thresholds is completed. The threshold number determining section 164 performs the process described in step S26 of FIG. 37.

The determination result of the threshold number determining section 164 is notified to the dot priority pixel setting section 156. The dot priority pixel setting section 156 performs a process of changing dot priority pixels on the basis of information obtained from the threshold number determining section 164.

Further, the determination result of the threshold number determining section 164 is reported to the stage switching section 162. The stage switching section 162 performs a process of changing the stage of the nozzle jetting rates on the basis of information obtained from the threshold number determining section 164.

A function of the nozzle jetting rate setting section 152 corresponds to one form of a priority pixel setting rate setting function. A function of the nozzle pattern setting section 154 corresponds to one form of a nozzle pattern setting function. A function of the dot priority pixel setting section 156 corresponds to one form of a dot priority pixel setting function and a function of changing dot priority pixels. A function of the threshold setting section 158 corresponds to one form of a threshold setting function.

Summary of Dither Mask Generating Method According to Present Disclosure

A summary of the dither mask generating method according to the present disclosure described in the above description is as follows. That is, the dither mask generating method according to the present disclosure includes a nozzle pattern setting process of setting a nozzle pattern indicating a correspondence relationship between each pixel of a dither mask and a nozzle for recording a position of each pixel, a dot priority pixel setting process of setting dot priority pixels that are candidates of pixels for which thresholds are set, among the pixels of the dither mask, a threshold setting process of setting thresholds to pixels that belong to the dot priority pixels, and a process of changing the dot priority pixels before the thresholds are set to all of the dot priority pixels that are once set in the dot priority pixel setting process with respect to at least a part of the thresholds.

According to the dither mask generating method, in setting thresholds in the dither mask, a nozzle pattern is reflected to set dot priority pixels, and the thresholds are set to pixels that belong to the dot priority pixels. Further, before the thresholds are set with respect to all the dot priority pixels that are once set, the dot priority pixels are changed, and the setting of the thresholds is performed with respect to pixels that belong to the changed dot priority pixels. In this way, by changing the dot priority pixels to set the thresholds, it is possible to generate a dither mask in which constraint in threshold disposition is reduced and granularity is good.

Here, "before the thresholds are set with respect to all the dot priority pixels that are once set, the dot priority pixels are changed" means that the dot priority pixels are changed in a state where thresholds are not set with respect to at least a part of the dot priority pixels that are once set.

Further, in the above-described dither mask generating method, a configuration in which a priority pixel setting rate setting process of setting priority pixel setting rates indicating a ratio of dot priority pixels in recording allocated pixels that are allocated to each nozzle, which are pixels of which recording is allocated to each of a plurality of nozzles, among pixels of the dither mask is provided and the dot priority pixel setting process sets dot priority pixels on the basis of a nozzle pattern and the priority pixel setting rate of each nozzle may be used.

"The pixel priority setting rate" may be expressed as the ratio of the dot priority pixels in the recording allocated pixels allocated to each nozzle or the number thereof. In a case where the priority pixel setting rate is expressed as the ratio, for example, "the pixel priority setting rate" may be defined as a quotient of division in which the number of recording allocated pixels is a denominator and the number of dot priority pixels is a numerator, that is, "the number of dot priority pixels/the number of recording allocated pixels". The ratio may be defined as a percentage. Further, the priority pixel setting rate may be defined as the number of dot priority pixels. Since the number of recording allocated pixels of each nozzle in the pixels of the dither mask may be specified on the basis of the nozzle pattern, the number of dot priority pixels of each nozzle corresponds to information indicating the ratio of the dot priority pixels in the recording allocated pixels.

The priority pixel setting rate may be determined on the basis of a target nozzle jetting rate. The nozzle jetting rates designed in accordance with the above-described nozzle jetting rate design method may be used as priority pixel setting rates. The priority pixel setting rates of each nozzle may be appropriately set from a viewpoint of obtaining a banding reducing effect. A priority pixel setting rate for suppressing banding may be determined in accordance with a nozzle arrangement form, and additionally, characteristics of a recording head, a drawing condition, or the like.

Another Example of Dither Mask Generating Method

A method for generating a dither mask on the basis of a nozzle jetting rate that is a control target is not limited to the above-described method. For example, the dither mask may be generated by the method disclosed in JP2016-107603A. The method disclosed in JP2016-107603A is a method in which nozzle jetting rates are reflected in an evaluation index in a case where thresholds of the dither mask are set.

In a case where a nozzle jetting rate of each nozzle that is a control target is given, as a dither mask generating method in which a dot disposition capable of achieving the nozzle jetting rates can be obtained, a variety of methods including known methods may be applied.

Dither Mask Set

In each of a plurality of types of dither masks used in this embodiment, thresholds are set so that a dot disposition for realizing a predetermined specific nozzle jetting rate can be obtained with respect to at least a part of a duty range. Nozzle jetting rates to be realized are different depending on types of the dither masks.

In the example shown in FIGS. 38 and 40, in a halftone duty range in which thresholds are set by applying at least the nozzle jetting rates shown in Q=1, the thresholds are set so that a dot disposition that shows a specific nozzle jetting rate that is a control target can be obtained. A nozzle jetting rate used as a control target in generating a dither mask corresponds to the "predetermined specific nozzle jetting rate".

A combination of the dither mask A, the dither mask B, and the dither mask C shown in FIG. 33 corresponds to an example of a "dither mask set". Further, a combination of any two dither masks among the dither mask A, the dither mask B, and the dither mask C corresponds to another example of the "dither mask set".

Even though nozzle jetting rates that are realized are the same, the dither masks may be generated by various methods. For example, in the dither mask generating method shown in FIG. 36, in a case where a duty of an initial dot disposition (initial duty) in step S1 is changed or the initial dot disposition is changed with the same initial duty, different dither masks are generated. In an ascending threshold setting process of step S3, in a case where a dot priority pixel setting method or a granularity evaluation method is changed, different dither masks are generated. Further, in a case where sizes of dither masks are changed, different dither masks are generated. Furthermore, even in a case where a certain dither mask is shifted in the main scan direction and/or sub scan direction, a dither mask different from the certain dither mask is generated.

In the present invention, dither masks having different nozzle jetting rates realized in a range of at least a part of a duty range are considered as different kinds of dither masks, and the various kinds of dither masks are considered as the same kind of dither mask as long as nozzle jetting rates to be realized are the same. For example, in a case where the dither mask A shown in FIG. 33 is used for black image data, the dither mask B is used for cyan and magenta image data, and the dither mask C is used for yellow image data, it is preferable that a dither mask used for cyan halftone processing and a dither mask used for magenta halftone processing are different dither masks in order to prevent overlapping of dot dispositions of the respective colors. For example, it is preferable to perform the magenta halftone processing using a dither mask obtained by shifting the dither mask used for the cyan halftone processing in the main scanning direction and/or the sub scan direction, but even in a case where the dither mask used for the cyan halftone processing and the dither mask used for the magenta halftone processing are different from each other, since the nozzle jetting rates to be realized by the respective dither masks are the same, the above-mentioned dither masks are considered as the same kind of dither mask (dither mask B), in the present invention.

Advantages of Embodiment

According to the present embodiment, halftone processing is performed using a dither mask in which nozzle jetting rates obtained by suppressing a jetting rate of an end part nozzle to be lower than a jetting rate of a central nozzle are reflected, with respect to a high-density or low-saturation color having a relatively large contribution to banding, whereas halftone processing is performed using a dither mask in which nozzle jetting rates that are uniformly close to each other, with respect to a low-density or high-saturation color having a relatively large contribution to color unevenness. The color having the relatively large contribution to the banding refers to a color with high banding visibility. The color having the relatively large contribution to the color unevenness refers to a color with high color unevenness visibility.

According to this embodiment, it is possible to obtain a halftone processing result in which a nozzle jetting rate that is a control target, and to perform a jetting control of each nozzle on the basis of the halftone processing result. Thus, it is possible to suppress occurrence of color unevenness while suppressing banding without lowering productivity.

Modification Example 1

Instead of the configuration of the image processing apparatus 200 shown in FIG. 33, a configuration of an image processing apparatus 200A shown in FIG. 42 may be employed. In FIG. 42, the same reference numerals are given to components that are the same as or similar to those shown in FIG. 33, and description thereof will not be repeated.

The halftone processing unit 206 in the image processing apparatus 200A of FIG. 42 includes a first halftone processing section 221, a second halftone processing section 222, and a third halftone processing section 223. The first halftone processing section 221 performs halftone processing using the dither mask A with respect to image data of black (K). The second halftone processing section 222 performs halftone processing using the dither mask B with respect to image data of respective colors of cyan (C) and magenta (M). The third halftone processing section 223 performs halftone processing using the dither mask C with respect to image data of yellow (Y).

Here, in a case where black is set to a "first color" and each of cyan and magenta is set to a "second color", the dither mask A corresponds to a "first dither mask", the first halftone processing section 221 corresponds to a "first halftone processing section", the dither mask B corresponds to a "second dither mask", and the second halftone processing section 222 corresponds to a "second halftone processing section".

Alternatively, in a case where each of cyan and magenta is set to the "first color" and yellow is set to the "second color", the dither mask B corresponds to the "first dither mask", the second halftone processing section 222 corresponds to the "first halftone processing section", the dither mask C corresponds to the "second dither mask", and the third halftone processing section 223 corresponds to the "second halftone processing section".

In a case where black is the "first color", and yellow is the "second color", the dither mask A corresponds to a "first dither mask", the first halftone processing section 221 corresponds to the "first halftone processing section", the dither mask C corresponds to a "second dither mask", and the third halftone processing section 223 corresponds to a "second halftone processing section".

A configuration in which data of the dither mask A, the dither mask B, and the dither mask C is retained in the halftone processing unit 206 corresponds to an example of a process of preparing a plurality of kinds of dither masks. As described above, in the present invention, dither masks having different nozzle jetting rates realized for at least a part of a duty range are considered as different kinds of dither masks. That is, it is preferable that the dither mask used in the halftone processing of cyan and the dither mask used in halftone processing of magenta are different dither masks in order to prevent overlapping of dot dispositions of the respective colors, but since the nozzle jetting rates realized by the respective dither masks are the same, the dither masks are considered as the same kind of dither mask (dither mask B).

Modification Example 2

Halftone processing may be performed using the dither mask A with respect to one color among cyan and magenta, and may be performed using the dither mask B with respect to the other color.

Modification Example 3

In the case of an ink jet recording apparatus that records a color image using six-color ink including light cyan (LC)

and light magenta (LM) in addition to four colors of CMYK, halftone processing is performed using the dither mask B with respect to image data of respective colors of light cyan and light magenta.

Modification Example 4

In the above-described embodiment, a configuration in which a dither mask corresponding to a color type is selected from the dither mask A, the dither mask B, and the dither mask C respectively corresponding to three kinds of the nozzle jetting rates of the graphs G1, G2, and G3 shown in FIG. 21 is shown, but a configuration in which the number of types of dither masks having different nozzle jetting rates are set to two and a dither mask corresponding to a color type is selected may be used. For example, a configuration in which a dither mask corresponding to a non-uniform nozzle jetting rate (the graph G1 in FIG. 21) is selected for only black and a dither masks corresponding to a uniform nozzle jetting rate (the graph G3 in FIG. 21) is selected for cyan, magenta, and yellow may be used. Alternatively, a configuration in which plural kinds of dither masks corresponding to three or more kinds of nozzle jetting rates are generated and a dither mask corresponding to a color type is selected may be used. For example, a configuration in which nozzle jetting rates of respective colors of black, cyan, magenta, and yellow are different from each other may be used. In summary, a configuration in which the number of types of dither masks having different nozzle jetting rates is two or more and a dither mask corresponding to a color type is selected may be used. As described above, in the present invention, dither masks having different nozzle jetting rates realized for at least a part of a duty range are considered as different kinds of dither masks. That is, even though different dither masks are used, in a case where nozzle jetting rates to be realized are the same, the different dither masks are considered as the same kind of dither mask. For example, as described above, in a case where the dither mask corresponding to the non-uniform nozzle jetting rate is selected for only black and the dither masks corresponding to the uniform nozzle jetting rate are selected for cyan, magenta, and yellow, it is preferable that the dither masks selected for cyan, magenta, and yellow are different dither masks in order to prevent overlapping of dot dispositions of the respective colors, but since all the dither masks realize the same uniform nozzle jetting rates, the dither masks are considered as the same kind of dither mask.

Modification Example 5

Hereinabove, specific examples of four colors of CMYK have been described, but a configuration in which image data on a plurality of colors based on a combination of two or more colors is handled may be used. For example, a configuration in which only three colors of CMY in which black is removed may be used.

Modification Example 6

For each color type, in using a dither mask, how much the jetting rate of the end part nozzle is suppressed depends on a color (density, saturation, and hue) in actual printing on the recording medium with each color, but since visibility of color unevenness or banding is affected by a plurality of causes, for example, not only the color, but also a dot shape, a dot size, landing interference, and the type of penetration into the recording medium, it is preferable to experimentally determine a dither mask having an appropriate nozzle jetting rate.

For example, it is preferable to generate a plurality of kinds of dither masks corresponding to a plurality of kinds of nozzle jetting rates in advance, perform printing with primary colors, secondary colors, and tertiary colors of each color, and evaluate visibilities of color unevenness and banding to determine an appropriate mask.

For example, nozzle jetting rates of respective colors of cyan, magenta, yellow, light cyan, and light magenta are experimentally determined. Dither masks of a plurality of types of candidate nozzle jetting rates are generated in advance, test printing of primary colors, secondary colors, tertiary colors, and the like is actually performed by applying a combination of dither masks to respective colors, visibilities of color unevenness and banding are evaluated on the basis of the printing result, a combination of dither masks with favorable color unevenness and banding (that is, a nozzle jetting rate combination) is employed.

Here, the nozzle jetting rates of the respective colors are not all different, and a combination in which the same nozzle jetting rate is obtained for some colors may be employed. For example, a combination in which the same nozzle jetting rate is obtained for cyan, magenta, or light cyan and light magenta may be used. In this case, for example, it is preferable that even in a case where dither masks that realize the same nozzle jetting rate are employed for cyan and magenta, or light cyan and light magenta, the dither masks are different dither masks in order to prevent overlapping of dot dispositions of the respective colors. For this reason, it is preferable that a plurality of different dither masks having the same nozzle jetting rate are generated in advance in correspondence with each of a plurality of nozzle jetting rates that are candidates, and in applying a combination of the respective dither masks to the respective colors, the different dither masks are applied even for colors having the same nozzle jetting rate.

Modification Example 7

In the above-described embodiments, as an ink jet recording apparatus that is an example of an image recording apparatus, a wide format printer that uses an ultraviolet curable ink has been described as an example, but the invention is not limited to the ultraviolet curable ink, and may be applied to a variety of ink jet recording apparatuses for recording an image on a recording medium using various kinds of ink.

With respect to the main scan operation and the sub scan operation, it is sufficient if the relative movement of the recording medium and the recording head is performed in each of the main scan direction and the sub scan direction, and thus, the recording medium may be moved in the main scan direction to perform the main scan operation, or the recording head may be moved in the sub scan direction to perform the sub scan operation.

Hardware Configuration of Respective Processing Units and Control Sections

A hardware structure of processing units that execute a variety of processes, such as the recording medium transport control section 104, the carriage drive control section 106, the light source control section 108, the image processing section 110, the jetting control section 112, and the information storing section 124 of the control device 102 described in FIG. 5, the color converting section 204, the halftone processing unit 206, and the dither mask selecting section 208 of the image processing apparatus 200 described in FIG. 33, the nozzle jetting rate setting section 152, the nozzle pattern setting section 154, the dot priority pixel setting section 156, the threshold setting section 158, the scan pattern information acquiring section 160, the stage switching section 162, and the threshold number determining section 164 of the dither mask generating device 150 described in FIG. 41, and the first halftone processing section 221, the second halftone processing section 222, and the third halftone processing section 223 of the image processing apparatus 200A described in FIG. 42 corresponds to a variety of processors which will be described hereinafter.

The variety of processors may include a central processing unit (CPU) that is a general-purpose processor that executes a program to function as a variety of processing units, a programmable logic device (PLD) that is a processor of which a circuit configuration is changeable after manufacturing, such as a field programmable gate array (FPGA), a dedicated electric circuit that is a processor having a circuit configuration that is dedicatedly designed for executing a specific process, such as an application specific integrated circuit (ASIC), or the like.

One processing unit may be configured by one processor among the variety of processors described above, or may be configured by the same type or different types of two or more processors. For example, one processing unit may be a combination of a plurality of FPGAs, or a combination of a CPU and an FPGA. Further, a plurality of processing units may be configured by one processor. Furthermore, as an example in which a plurality of processing units are configured by one processor, first, as represented by a computer such as a client or a server, a configuration in which a combination of one or more CPUs and software forms one processor and this processor functions as a plurality of processing units may be employed. Second, as represented by a system on chip (SoC) or the like, a configuration in which a processor for realizing entire functions of a system including a plurality of processing units using one integrated circuit (IC) chip is used may be employed. In this way, the variety of processing units may be configured by using one or more of the variety of processors as the hardware structure.

Further, the hardware structure of the variety of processors is, more specifically, electric circuitry in which circuit elements such as semiconductors are combined.

Program that Causes Computer to Function as Image Processing Apparatus

A program that causes a computer to function as an image processing apparatus described in the above-described embodiment may be recorded on a computer-readable medium (a non-transitory information storage medium that is a tangible object), such as an optical disc, a magnetic disc, or the like, and the program may be provided through the information storage medium. Instead of a configuration in which the program is stored and provided in such an information storage medium, a configuration in which a program signal is provided as a download service using a communication network such as the Internet may be used.

Further, it is possible to provide a function of the image processing apparatus according to the embodiment as an application server, and to provide a service for providing the processing function through a communication network.

Further, by incorporating the program in the computer, it is possible to cause the computer to realize the functions of the image processing apparatus, to thereby realize the image processing functions described in the above-described embodiments.

In addition, a configuration in which a part or an entirety of a program for realizing print control including the image processing function described in the present embodiment is incorporated in a host control device such as a host computer or is applied as an operation program of a central processing unit (CPU) on the ink jet recording apparatus.

Terms

The term "image recording apparatus" includes a concept of a term such as a printer, a printing device, an image forming device, an image output device, or a drawing device. Further, the term "image recording apparatus" includes a concept of a printing system formed by combining a plurality of devices.

The "image" should be interpreted in a broad sense, and includes a color image, a white black image, a single color image, a gradation image, a uniform concentration (solid) image, or the like. The "image" is not limited to a photo image, and is used as a generic term including a figure, a character, a symbol, a line, a mosaic pattern, a color-filled pattern, a variety of other patterns, or an appropriate combination thereof.

In this specification, the term "perpendicular" or "vertical" includes a configuration that generates the same effects as in a case where two elements cross each other at an angle that is substantially 90°, among configurations in which two elements cross each other at an angle that is smaller than 90° or at an angle that exceeds 90°. In this specification, the term "parallel" includes a configuration in which two elements can be considered to be substantially parallel, capable of obtaining substantially the same effects as in a case where two elements are parallel, among configurations in which two elements are not strictly parallel.

Combinations of Embodiments and Modification Examples

The configurations described in the above-described embodiments or the content described in the modification examples may be appropriately combined for use, and a part thereof may be switched.

Others

In the above-described embodiment, the object is to suppress banding, streaks, or unevenness due to density change. However, banding, streaks, or unevenness due to gloss change also occurs in the ink jet recording apparatus, and the present invention is effective for this problem. Similarly, the present invention is effective for banding, streaks, or unevenness due to changes in dot pattern.

The configurations described in the above-described embodiments of the invention may include appropriate modifications, additions, or deletions in a range without departing from the concept of the invention. The invention is not limited to the above-described embodiments, and a variety of modifications may be made by those skilled in the art within the technical idea of the invention.

EXPLANATION OF REFERENCES

10: ink jet recording apparatus
12: recording medium

20: body
22: support leg
24, 24A: recording head
24C, 24M, 24Y, 24K: head module
26: platen
28: guide mechanism
30: carriage
32A, 32B: temporary curing light source
34A, 34B: main curing light source
36: ink cartridge
38: mounting section
40: nip roller
42: supply side roll
44: winding roll
46: guide
50: temperature control section
52: pre-temperature control section
54: after-temperature control section
61, 61A: nozzle row
61C, 61M, 61Y, 61K: nozzle row
62: nozzle
102: control device
104: recording medium transport control section
106: carriage drive control section
108: light source control section
110: image processing section
112: jetting control section
114: transport drive section
116: main scan drive section
118: light source drive circuit
119: light source drive circuit
120: display device
122: input device
124: information storing section
126: image input interface
128: head drive circuit
130: encoder
132: sensor
150: dither mask generating device
152: nozzle jetting rate setting section
154: nozzle pattern setting section
156: dot priority pixel setting section
158: threshold setting section
160: scan pattern information acquiring section
162: stage switching section
164: threshold number determining section
166: dither mask
168: nozzle pattern data
170: nozzle jetting rate data
200, 200A: image processing apparatus
202: image data acquiring section
204: color converting section
206: halftone processing unit
208: dither mask selecting section
210: dither mask storing section
212: data output section
221: first halftone processing section
222: second halftone processing section
223: third halftone processing section
S1 to S3: step of dither mask generation method
S12 to S30: step of threshold setting process
S102 to S108: step of image processing method
S120 to S126: step of halftone processing

What is claimed is:

1. An image processing apparatus that generates dot data indicating a disposition pattern of dots for each color for recording an image on a recording medium, while relatively moving a recording head having a nozzle row in which a plurality of nozzles that jet, for each of a plurality of colors of ink, each ink are arranged in a sub scan direction, in a main scan direction perpendicular to the sub scan direction and the sub scan direction with respect to the recording medium, comprising:
a halftone processing unit that performs halftone processing with respect to image data of a first color among the plurality of colors, in a range of at least a part of a recording duty, using a dither mask that realizes a first nozzle jetting rate in which a nozzle jetting rate of an end part nozzle located at each of both end parts of the nozzle row is suppressed to be smaller than a nozzle jetting rate of a central nozzle located at a central part of the nozzle row, and performs halftone processing with respect to image data of a second color different from the first color among the plurality of colors, in the range of the recording duty, using a dither mask that realizes a second nozzle jetting rate having smaller difference between the nozzle jetting rate of the end part nozzle and the nozzle jetting rate of the central nozzle than that in the first nozzle jetting rate.

2. The image processing apparatus according to claim 1, wherein the nozzle jetting rate of an end nozzle located at an end of the nozzle row at the first nozzle jetting rate is lower than the nozzle jetting rate of an end nozzle located at an end of the nozzle row at the second nozzle jetting rate.

3. The image processing apparatus according to claim 1, wherein the first color has higher banding visibility than that of the second color.

4. The image processing apparatus according to claim 1, wherein the first color has lower visibility of color unevenness in a case where the first color overlaps a different color than that of the second color.

5. The image processing apparatus according to claim 1, wherein the first color has higher density than that of the second color.

6. The image processing apparatus according to claim 1, wherein the first color has lower saturation than that of the second color.

7. The image processing apparatus according to claim 1, wherein the nozzle jetting rate of each nozzle of the nozzle row at the second nozzle jetting rate is constant.

8. The image processing apparatus according to claim 1, wherein the plurality of colors include four colors of cyan, magenta, yellow, and black,
wherein a dither mask that realizes the first nozzle jetting rate is used for black image data, and
wherein the dither mask that realizes the second nozzle jetting rate is used for image data of at least one of cyan, magenta, or yellow.

9. The image processing apparatus according to claim 1, wherein the plurality of colors include three colors of cyan, magenta, and yellow,
wherein the dither mask that realizes the first nozzle jetting rate is used for image data of at least one of cyan or magenta, and
wherein the dither mask that realizes the second nozzle jetting rate is used for yellow image data.

10. The image processing apparatus according to claim 1, wherein the plurality of colors include two colors of cyan and magenta,
wherein the dither mask that realizes the first nozzle jetting rate is used for image data of one color among cyan and magenta, and wherein the dither mask that realizes the second nozzle jetting rate is used for image data of the other color among cyan and magenta.

11. The image processing apparatus according to claim 1, wherein the plurality of colors include four colors of cyan, magenta, yellow, and black, and
wherein a nozzle jetting rate of each nozzle that jets black ink is set so that the nozzle jetting rate of the end nozzle located at the end of the nozzle row is lowest, compared with a nozzle jetting rate of each nozzle that jets ink of the other colors.

12. The image processing apparatus according to claim 1, wherein the plurality of colors include four colors of cyan, magenta, yellow, and black, and
wherein a nozzle jetting rate of each nozzle that jets black ink is set so that difference between the nozzle jetting rate of the end part nozzle and the nozzle jetting rate of the central nozzle is largest, compared with a nozzle jetting rate of each nozzle that jets ink of the other colors.

13. The image processing apparatus according to claim 1, wherein the plurality of colors include four colors of cyan, magenta, yellow, and black, and
wherein a nozzle jetting rate of each nozzle that jets at least one ink of cyan or magenta has a higher nozzle jetting rate of the end nozzle located at the end of the nozzle row, compared with a nozzle jetting rate of each nozzle that jets black ink.

14. The image processing apparatus according to claim 13,
wherein a nozzle jetting rate of each nozzle that jets cyan ink and a nozzle jetting rate of each nozzle that jets magenta ink are different from each other.

15. The image processing apparatus according to claim 1, wherein the plurality of colors include four colors of cyan, magenta, yellow, and black, and
wherein a nozzle jetting rate of each nozzle that jets ink of at least one of cyan or magenta is set so that difference between the nozzle jetting rate of the end part nozzle and the nozzle jetting rate of the central nozzle is smaller, compared with a nozzle jetting rate of each nozzle that jets black ink.

16. The image processing apparatus according to claim 14,
wherein a nozzle jetting rate of each nozzle that jets cyan ink and a nozzle jetting rate of each nozzle that jets magenta ink are different from each other.

17. The image processing apparatus according to claim 1, wherein the plurality of colors include yellow, and
wherein a nozzle jetting rate of each nozzle that jets yellow ink is set so that the nozzle jetting rate of the end nozzle located at the end of the nozzle row is largest, compared with a nozzle jetting rate of each nozzle that jets ink of the other colors.

18. The image processing apparatus according to claim 1, wherein the plurality of colors include yellow, and
wherein a nozzle jetting rate of each nozzle that jets yellow ink is set so that difference between the nozzle jetting rate of the end part nozzle and the nozzle jetting rate of the central nozzle is smallest, compared with a nozzle jetting rate of each nozzle that jets ink of the other colors.

19. The image processing apparatus according to claim 1, wherein the plurality of colors include yellow, and
wherein a dither mask applied to yellow image data is a dither mask that realizes a uniform nozzle jetting rate in which a nozzle jetting rate of each nozzle that jets yellow ink is constant.

20. The image processing apparatus according to claim 1, further comprising:
a dither mask storage section that stores plural kinds of dither masks including the dither mask that realizes the first nozzle jetting rate and the dither mask that realizes the second nozzle jetting rate; and
a dither mask selecting section that selects a dither mask to be used for the halftone processing from the plural kinds of dither masks, in accordance with a color type of image data that is a target of the halftone processing.

21. The image processing apparatus according to claim 1, wherein the halftone processing unit includes
a first halftone processing section that performs the halftone processing using the first dither mask that realizes the first nozzle jetting rate with respect to the image data of the first color, and
a second halftone processing section that performs the halftone processing using the second dither mask that realizes the second nozzle jetting rate with respect to the image data of the second color.

22. An image processing method for generating dot data indicating a disposition pattern of dots for each color for recording an image on a recording medium, while relatively moving a recording head having a nozzle row in which a plurality of nozzles that jet, for each of a plurality of colors of ink, each ink are arranged in a sub scan direction, in a main scan direction perpendicular to the sub scan direction and the sub scan direction with respect to the recording medium, comprising:
a halftone processing step of performing halftone processing with respect to image data of a first color among the plurality of colors, in a range of at least a part of a recording duty, using a dither mask that realizes a first nozzle jetting rate in which a nozzle jetting rate of an end part nozzle located at each of both end parts of the nozzle row is suppressed to be smaller than a nozzle jetting rate of a central nozzle located at a central part of the nozzle row, and performing halftone processing with respect to image data of a second color different from the first color among the plurality of colors, in the range of the recording duty, using a dither mask that realizes a second nozzle jetting rate having smaller difference between the nozzle jetting rate of the end part nozzle and the nozzle jetting rate of the central nozzle than that in the first nozzle jetting rate.

23. A dither mask set that is used for halftone processing for generating dot data indicating a disposition pattern of dots for each color for recording an image on a recording medium, while relatively moving a recording head having a nozzle row in which a plurality of nozzles that jet, for each of a plurality of colors of ink, each ink are arranged in a sub scan direction, in a main scan direction perpendicular to the sub scan direction and the sub scan direction with respect to the recording medium, comprising:
a dither mask that is used with respect to image data of a first color among the plurality of colors and realizes a first nozzle jetting rate in which a nozzle jetting rate of an end part nozzle located at each of both end parts of the nozzle row is suppressed to be smaller than a nozzle jetting rate of a central nozzle located at a central part of the nozzle row, in a range of at least a part of a recording duty; and a dither mask that is used with respect to image data of a second color different from the first color among the plurality of colors and realizes a second nozzle jetting rate having smaller difference between the nozzle jetting rate of the end part nozzle and the nozzle jetting rate of the central nozzle than that in the first nozzle jetting rate, in the range of the recording duty.

24. An image recording apparatus comprising:

a recording head having a nozzle row in which a plurality of nozzles that jet, for each of a plurality of colors of ink, each ink are arranged in a sub scan direction;

a halftone processing unit that performs halftone processing with respect to image data of a first color among the plurality of colors, in a range of at least a part of a recording duty, using a dither mask that realizes a first nozzle jetting rate in which a nozzle jetting rate of an end part nozzle located at each of both end parts of the nozzle row is suppressed to be smaller than a nozzle jetting rate of a central nozzle located at a central part of the nozzle row, and performs halftone processing with respect to image data of a second color different from the first color among the plurality of colors, in the range of the recording duty, using a dither mask that realizes a second nozzle jetting rate having smaller difference between the nozzle jetting rate of the end part nozzle and the nozzle jetting rate of the central nozzle than that in the first nozzle jetting rate; and a recording control section that controls the jetting of the ink from the nozzles on the basis of dot data indicating a dot disposition pattern for each color obtained through the halftone processing and performs a control for recording an image on a recording medium by repeating a main scan operation of jetting the ink from the nozzles while relatively moving the recording head with respect to the recording medium in a main scan direction that is orthogonal to the sub scan direction to perform recording and a sub scan operation of relatively moving the recording medium with respect to the recording head in the sub scan direction.

* * * * *